Sept. 4, 1951 G. V. NOLDE 2,567,120

VALUE INDEXING MECHANISM

Filed March 1, 1948 30 Sheets-Sheet 1

INVENTOR
George V. Nolde
BY
Howard M. Dustin

VALUE INDEXING MECHANISM

Filed March 1, 1948 30 Sheets-Sheet 2

INVENTOR:
George V. Nolde
BY
Howard M. Dustin

Sept. 4, 1951 G. V. NOLDE 2,567,120

VALUE INDEXING MECHANISM

Filed March 1, 1948 30 Sheets-Sheet 3

INVENTOR
George V. Nolde
BY
Howard M. Dustin

VALUE INDEXING MECHANISM

Filed March 1, 1948 30 Sheets-Sheet 4

INVENTOR
George V. Nolde
BY
Howard M. Dustin.

Sept. 4, 1951

G. V. NOLDE 2,567,120

VALUE INDEXING MECHANISM

Filed March 1, 1948

30 Sheets-Sheet 5

INVENTOR
George V. Nolde

BY
Howard M. Dustin

Sept. 4, 1951 G. V. NOLDE 2,567,120

VALUE INDEXING MECHANISM

Filed March 1, 1948 30 Sheets-Sheet 6

INVENTOR:
George V. Nolde

BY

Howard M. Dustin

Sept. 4, 1951 G. V. NOLDE 2,567,120

VALUE INDEXING MECHANISM

Filed March 1, 1948 30 Sheets-Sheet 7

INVENTOR
George V. Nolde
BY
Howard M. Dustin

Sept. 4, 1951 G. V. NOLDE 2,567,120

VALUE INDEXING MECHANISM

Filed March 1, 1948 30 Sheets-Sheet 8

INVENTOR
George V. Nolde
BY
Howard M. Dustin

INVENTOR
George V. Nolde.
BY
Howard M. Dustin.

VALUE INDEXING MECHANISM

Filed March 1, 1948

INVENTOR
George V. Nolde
BY
Howard M. Dustin

VALUE INDEXING MECHANISM

Filed March 1, 1948 30 Sheets-Sheet 11

INVENTOR
George V. Nolde
BY
Howard M. Dustin.

INVENTOR
George V. Nolde
BY
Howard M. Dustin

Sept. 4, 1951 G. V. NOLDE 2,567,120

VALUE INDEXING MECHANISM

Filed March 1, 1948 30 Sheets-Sheet 13

INVENTOR
George V. Nolde
BY
Howard M. Dustin.

VALUE INDEXING MECHANISM

Filed March 1, 1948 30 Sheets-Sheet 14

INVENTOR
George V. Nolde
BY
Howard M. Dustin

Sept. 4, 1951 G. V. NOLDE 2,567,120

VALUE INDEXING MECHANISM

Filed March 1, 1948 30 Sheets-Sheet 15

INVENTOR
George V. Nolde
BY
Howard M. Dustin

Sept. 4, 1951 G. V. NOLDE 2,567,120

VALUE INDEXING MECHANISM

Filed March 1, 1948 30 Sheets-Sheet 16

INVENTOR
George V. Nolde
BY
Howard M. Dustin

INVENTOR
George V Nolde
BY
Howard M. Dustin

Sept. 4, 1951 G. V. NOLDE 2,567,120

VALUE INDEXING MECHANISM

Filed March 1, 1948 30 Sheets-Sheet 18

INVENTOR
George V. Nolde
BY
Howard M. Dustin

VALUE INDEXING MECHANISM

INVENTOR
George V. Nolde
BY
Howard M. Dustin.

INVENTOR
George V. Nolde
BY
Howard M. Dustin

INVENTOR
George V. Nolde
BY
Howard M. Dustin

Sept. 4, 1951 G. V. NOLDE 2,567,120
VALUE INDEXING MECHANISM
Filed March 1, 1948 30 Sheets-Sheet 22
FIG. 49
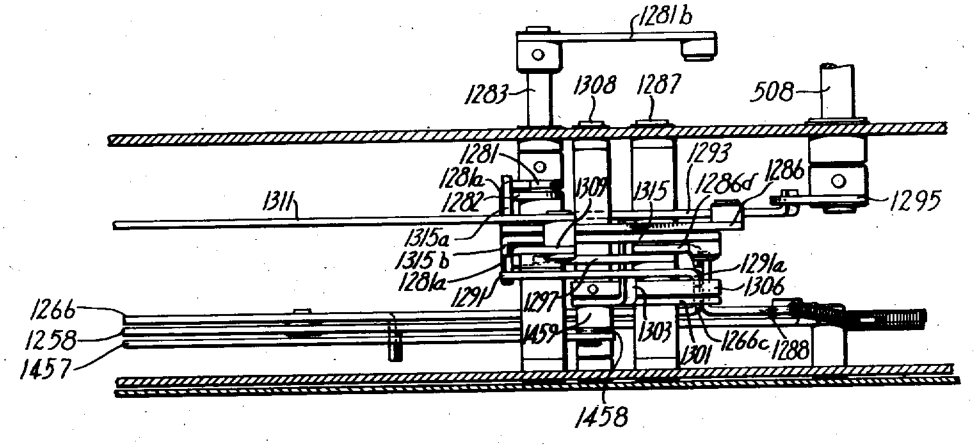
FIG. 50 FIG. 51
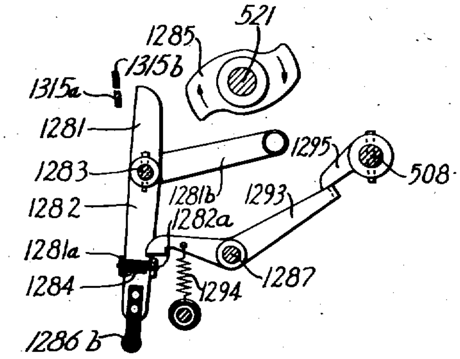
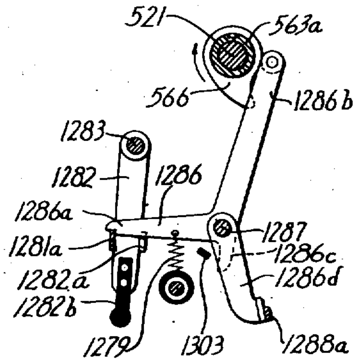
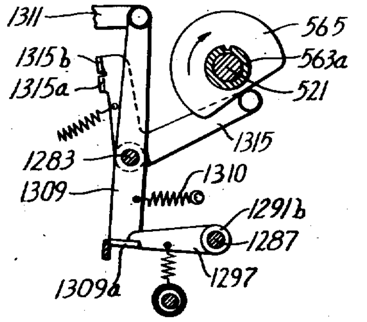
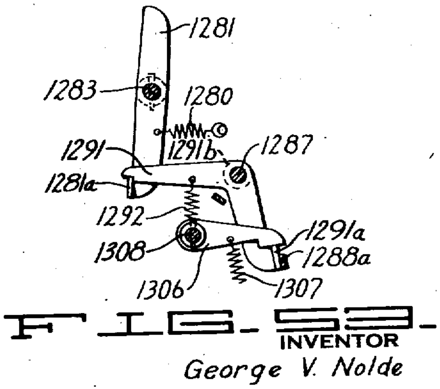
FIG. 53
FIG. 52
INVENTOR
George V. Nolde
BY
Howard M. Dustin INVENTOR
George V. Nolde
BY
Howard M. Dustin Sept. 4, 1951 G. V. NOLDE 2,567,120

VALUE INDEXING MECHANISM

Filed March 1, 1948 30 Sheets-Sheet 24

INVENTOR
George V. Nolde
BY
Howard M. Dustin

Sept. 4, 1951

G. V. NOLDE 2,567,120

VALUE INDEXING MECHANISM

Filed March 1, 1948

30 Sheets-Sheet 25

INVENTOR
George V. Nolde
BY
Howard M. Dustin.

Sept. 4, 1951 G. V. NOLDE 2,567,120

VALUE INDEXING MECHANISM

Filed March 1, 1948 30 Sheets-Sheet 26

INVENTOR:
George V. Nolde
BY
Howard W. Dustin

INVENTOR:
George V. Nolde

BY

Howard M. Dustin.

VALUE INDEXING MECHANISM

Filed March 1, 1948 30 Sheets-Sheet 28

INVENTOR
George V. Nolde
BY
Howard M. Dustin.

Sept. 4, 1951 G. V. NOLDE 2,567,120

VALUE INDEXING MECHANISM

Filed March 1, 1948 30 Sheets-Sheet 29

VALUE INDEXING MECHANISM

Filed March 1, 1948

30 Sheets-Sheet 30

INVENTOR
George V. Nolde
BY
Howard M. Dustin

Patented Sept. 4, 1951 2,567,120

UNITED STATES PATENT OFFICE 2,567,120

VALUE INDEXING MECHANISM

George V. Nolde, Berkeley, Calif., assignor to Marchant Calculating Machine Company, a corporation of California Application March 1, 1948, Serial No. 12,232

16 Claims. (Cl. 235—79)

This invention relates to calculating machines and is concerned more particularly with improved machines of this character which employ automatic mechanisms for performing multiplication and division calculations.

Machines capable of performing such calculations include a multi-order accumulator register or the equivalent for registering the products of multiplication calculations, or the dividends or remainders thereof which are registered during division calculations. Such machines also include mechanical or electrical devices for actuating the accumulator register during the registering or calculating operations. These devices are set by, or are under control of selection mechanisms, and usually possess a fewer number of orders than are included in the accumulator register so that the respective orders of the actuating devices can be associated with, or shifted relative to, the various orders of the accumulator. Heretofore it has been necessary to repeatedly interrupt the registering operations during all or a large part of such shifting operations.

The machine of the present invention includes a plurality of ordinally arranged differential actuators, one permanently associated with each respective ordinal numeral wheel of the accumulator register so that there is no need of shifting the actuating mechanism relative to the accumulator to effect the entry of values into various orders of the accumulator.

A shiftable selection storage mechanism having a lesser number of orders than there are ordinal actuators is set in accordance with the digital values selected for one factor of a calculation, and, in turn, sets the ordinal actuators aligned therewith so that the latter will drive the numeral wheels by the amounts set in the respective orders of the storage mechanism. This setting of the actuators is maintained throughout the current actuating or registering operation and during such operation the selection storage mechanism may be shifted to its next ordinal position in preparation for resetting the actuators at the beginning of the next registering operation. The shifting of the selection storage mechanism does not affect the previous setting of the actuators; therefore, a shifting operation occurs during the registering operation without delaying the successive operations of the actuating mechanism.

The present invention is based, in part, upon the principle of initiating and completing an ordinal shift during the operation of the numeral wheel actuating mechanism without interrupting or affecting said operation.

It is, therefore, a general object of the invention to initiate and complete an ordinal shifting operation during the actuating or registering operation of a calculating machine or the like.

Another object of the invention is to provide a calculating machine for performing plural order calculations in which the total elapsed time required to perform the calculation is substantially the time required for the setting and driving of the differential actuators.

Still another object of the invention is to provide a calculating machine having a non-shiftable register associated with actuating means of substantially the same number of orders together with a plural order selection mechanism which is ordinally shiftable with respect to the register and the actuating means during the operation of the latter.

Other objects and advantages of the invention will be apparent from the following description of a preferred embodiment of the invention, as illustrated in the accompanying drawings, in which.

Figure 1:
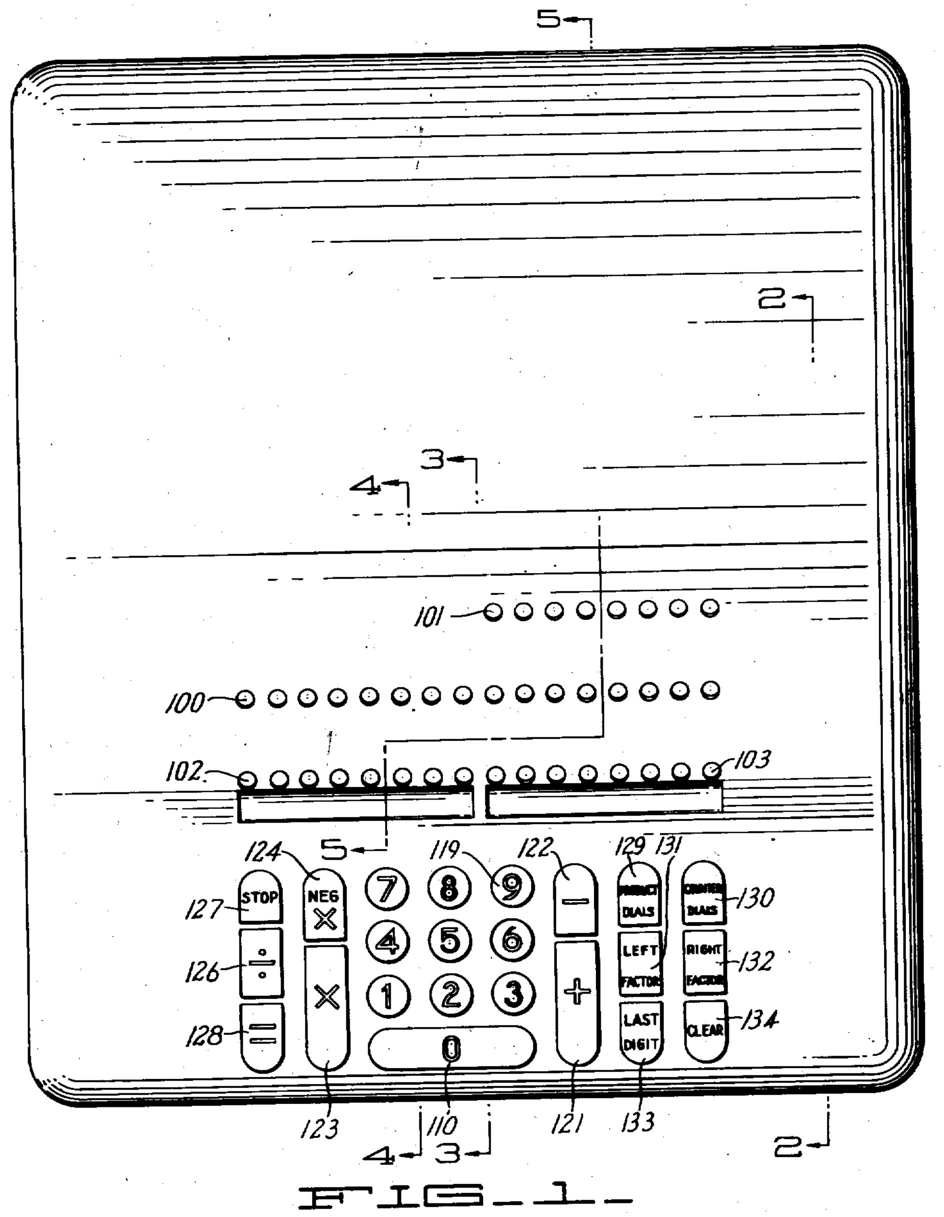
Fig. 1 is an exterior plan view of a calculating machine embodying the instant invention.
Figure 4:
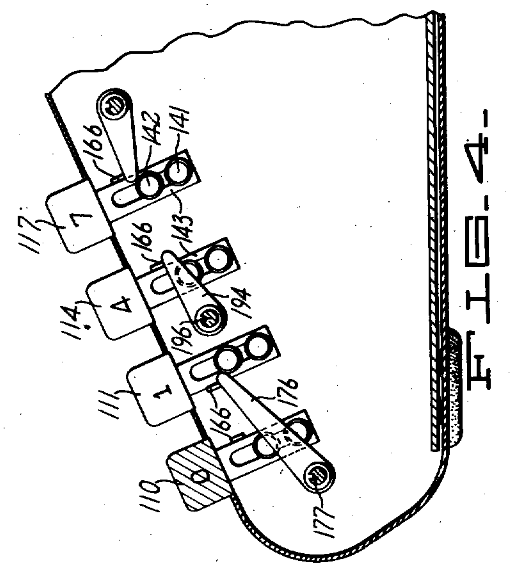
Figure 3:
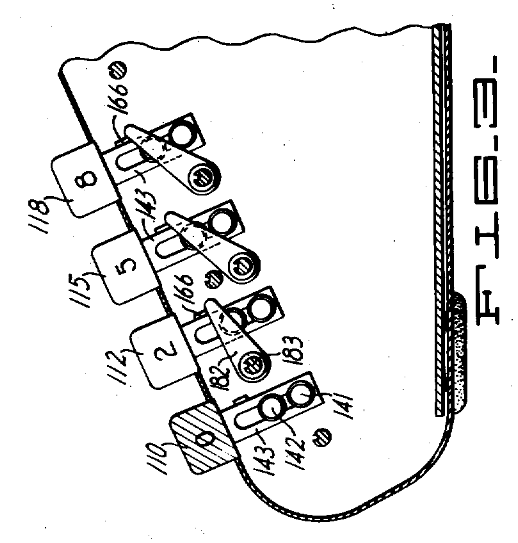

Figs. 3 and 4 are longitudinal sections taken on the lines 3—3 and 4—4 respectively of Fig. 1 showing certain of the numeral keys and related mechanism of the keyboard.

Figures 5, 5A:
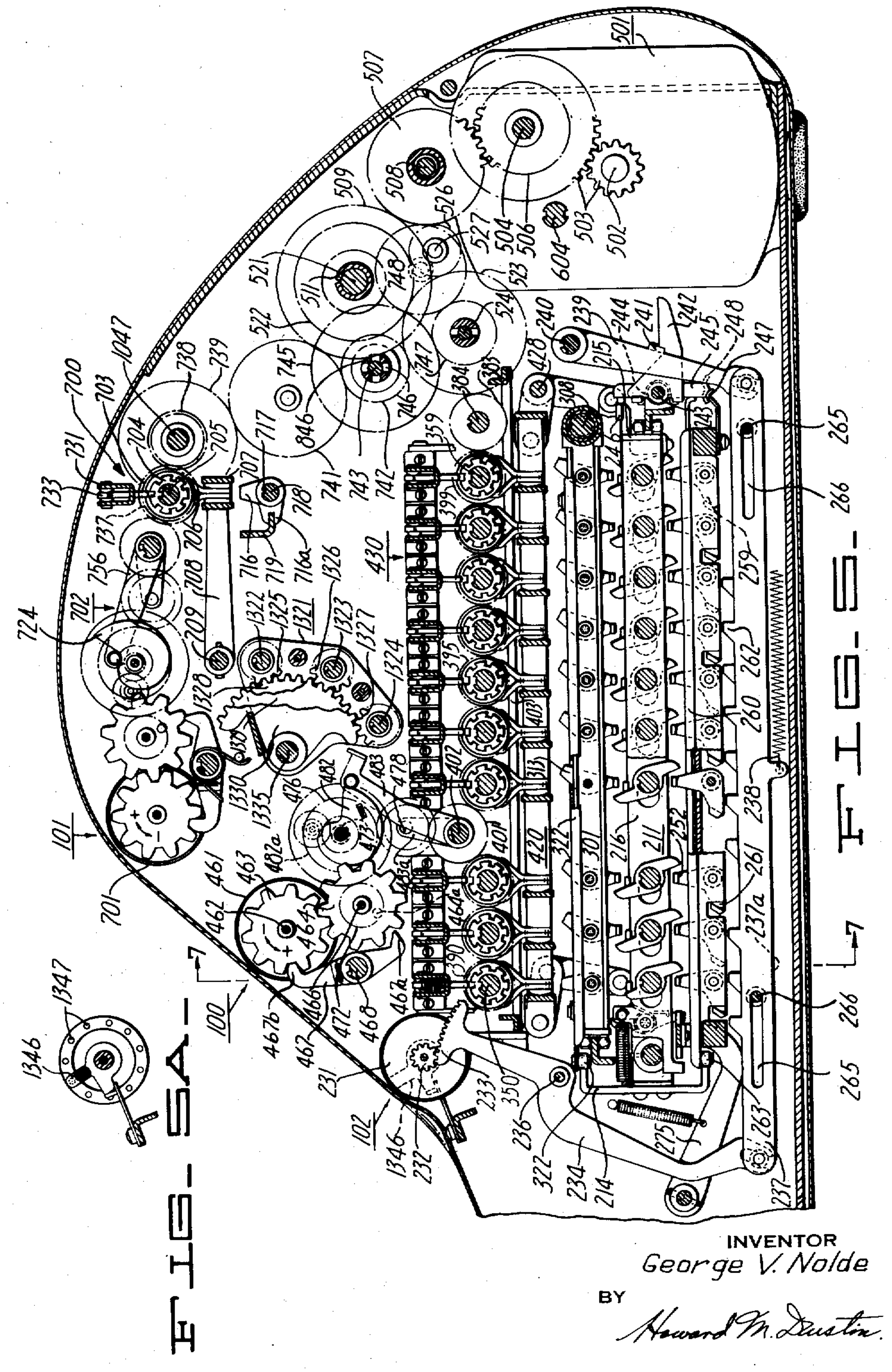

Fig. 5 is a longitudinal section taken on the line 5—5 of Fig. 1, as viewed from the right, showing the general arrangement of the machine, the keyboard being omitted.

Fig. 5A is a right side detail view of variable resistance contacts associated with a divisor check dial.

Figure 6:
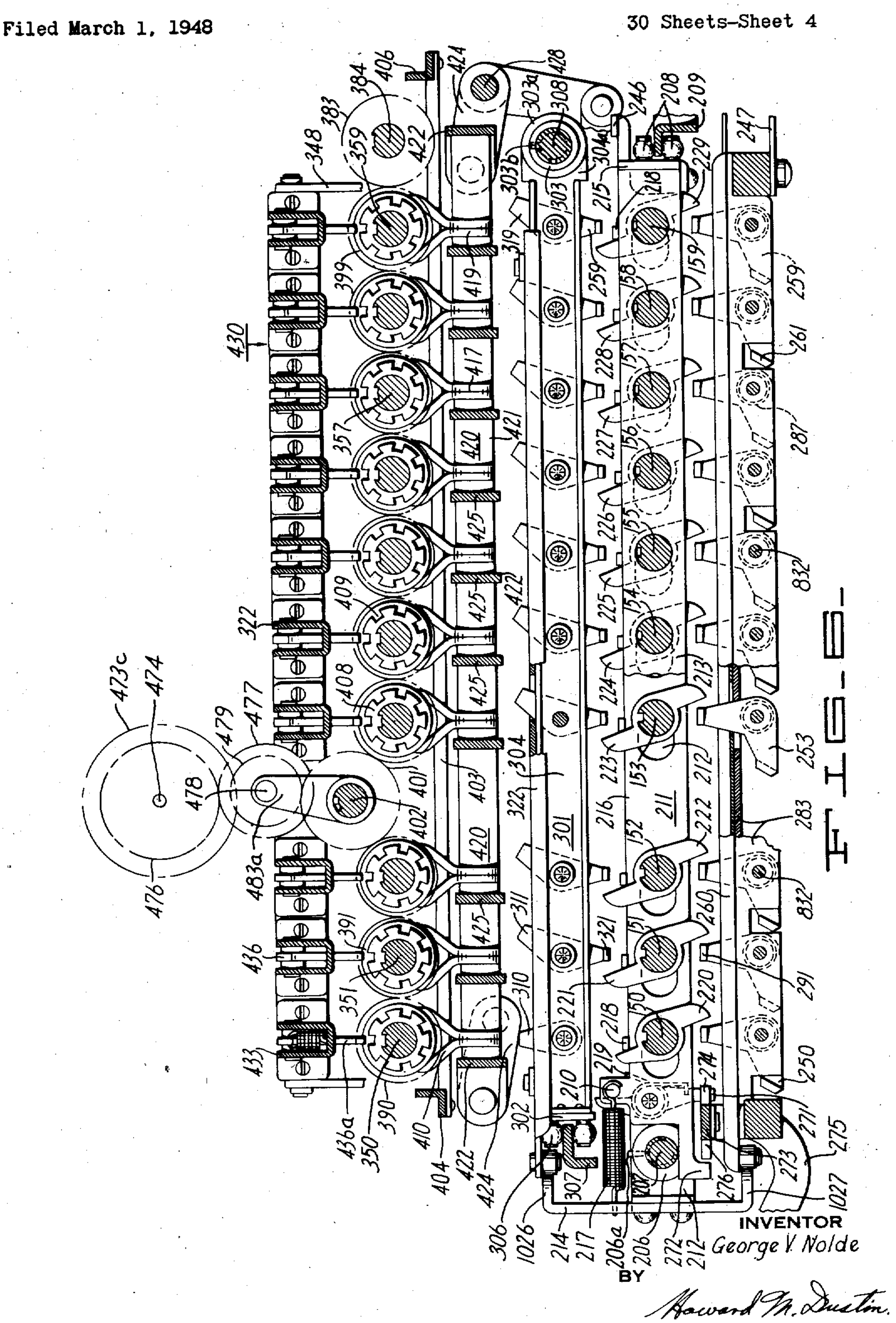

Fig. 6 is an enlarged view of a portion of Fig. 5.

Figures 7, 8:
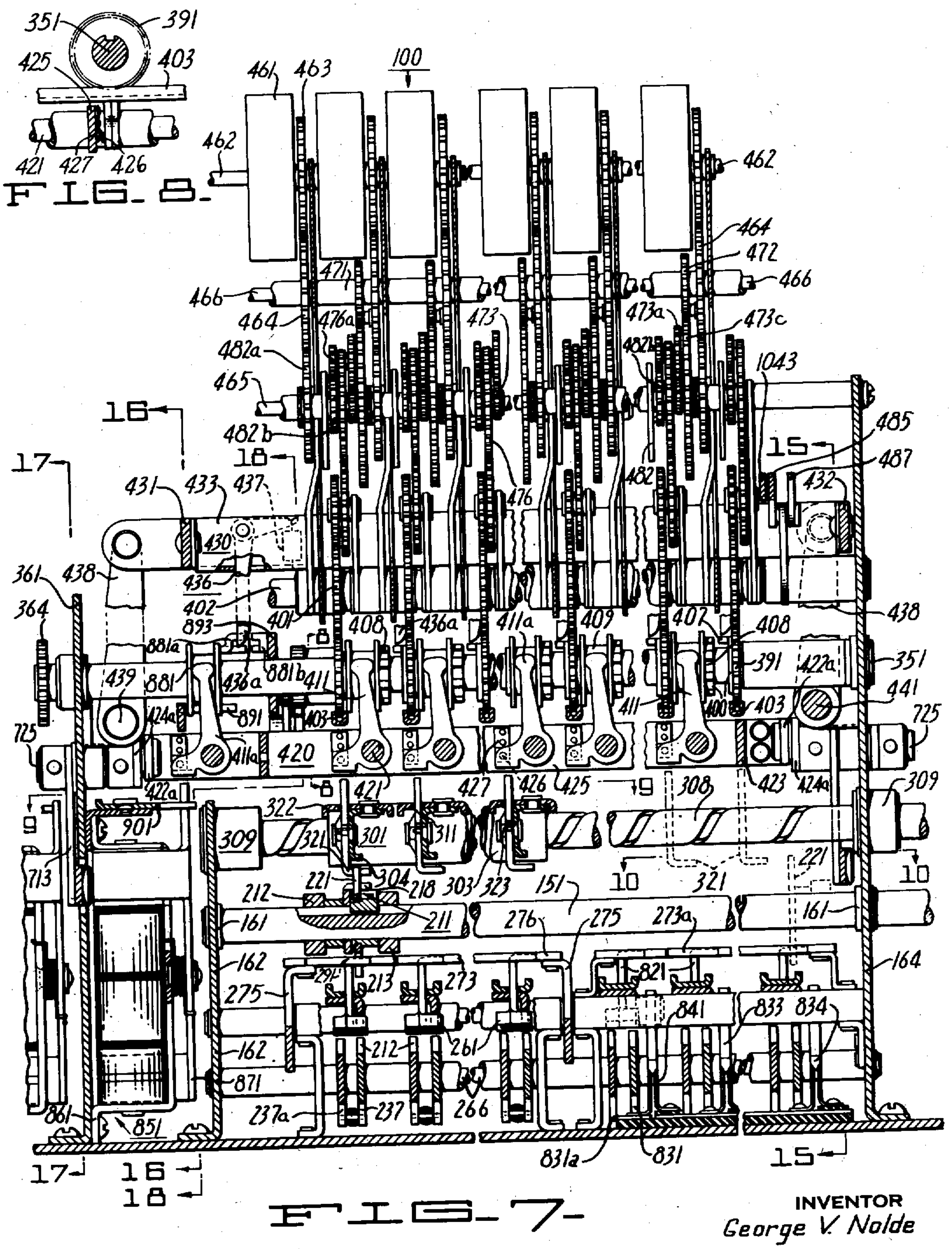

Fig. 7 is an enlarged front elevation taken in section on the line 7—7 of Fig. 5.

Figure 7A:
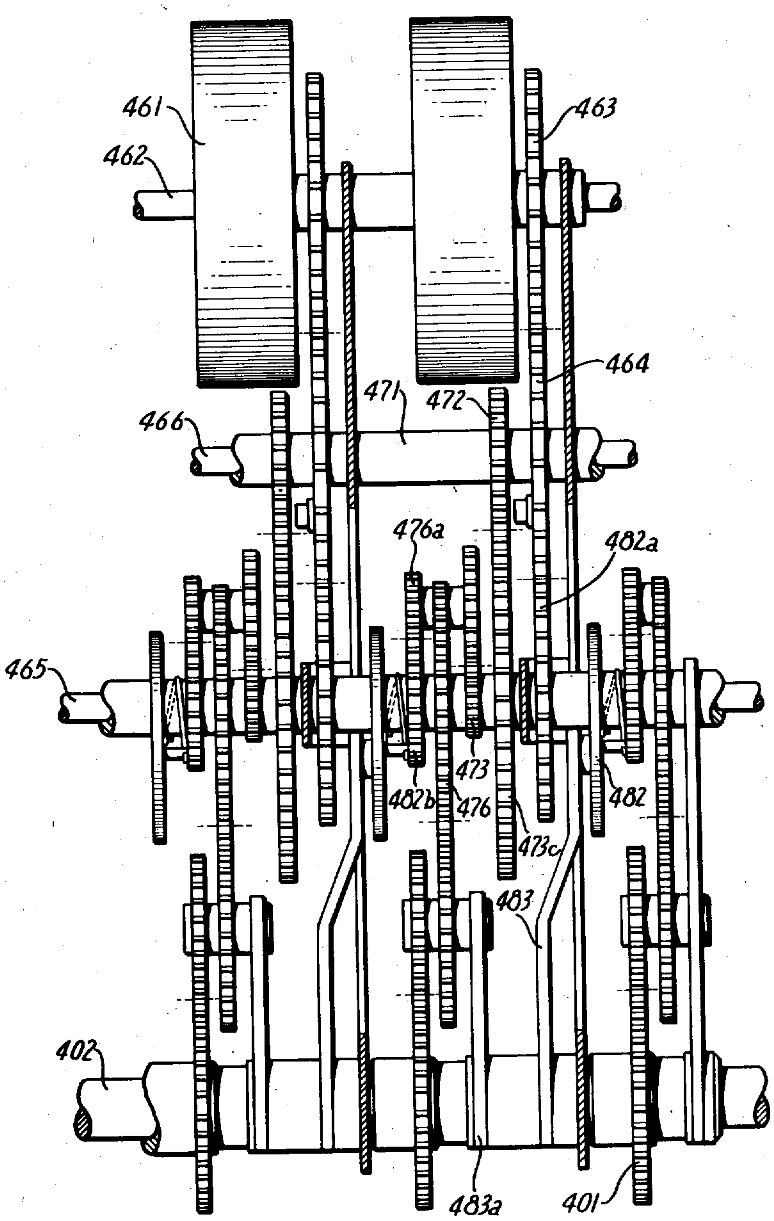

Fig. 7A is an enlarged view of a portion of Fig. 7.

Fig. 8 is a fragmentary section as seen from the left side of the machine and taken as indicated by the line 8—8 in Fig. 7.

Figure 9:
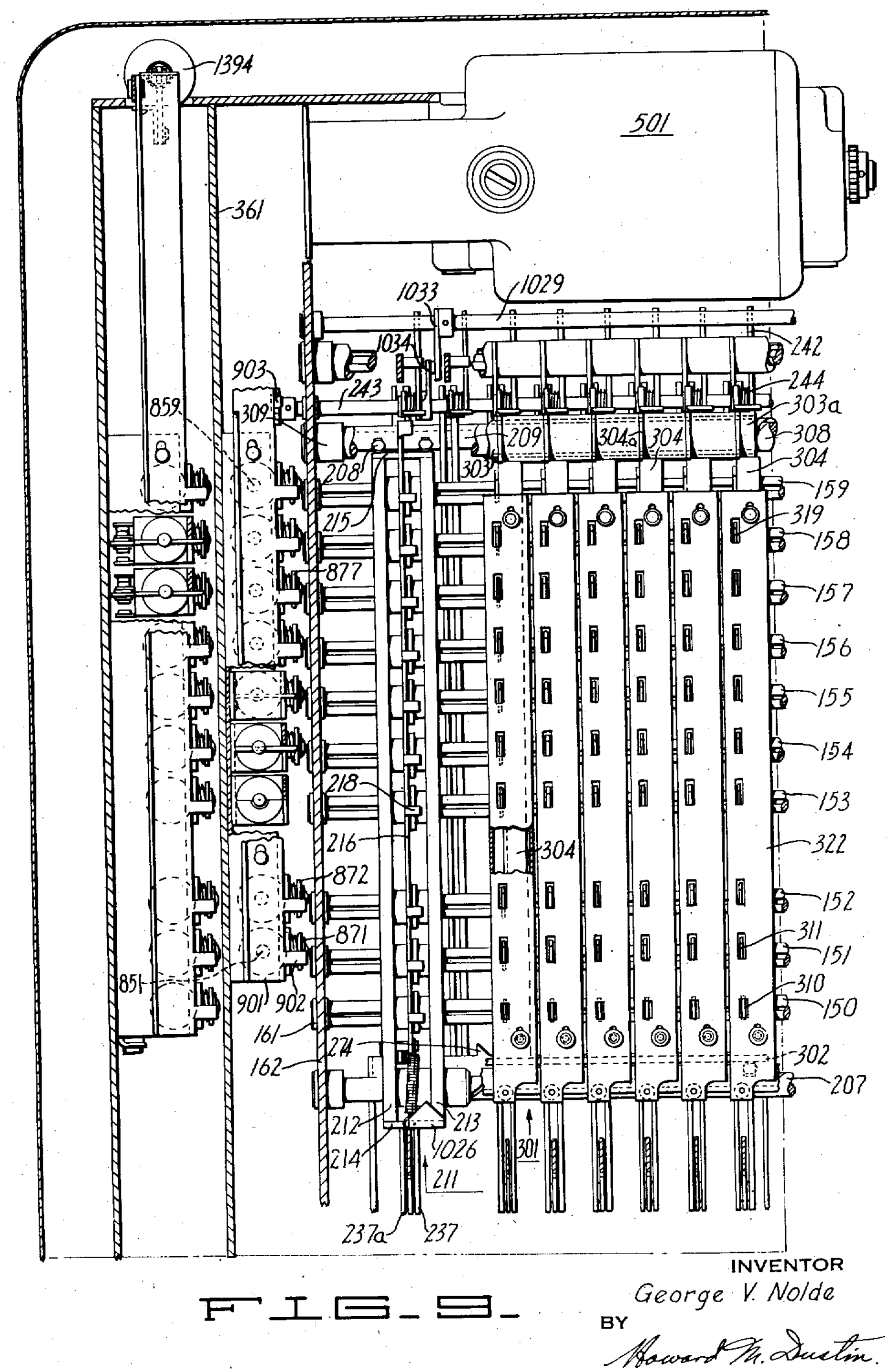
Figure 10:
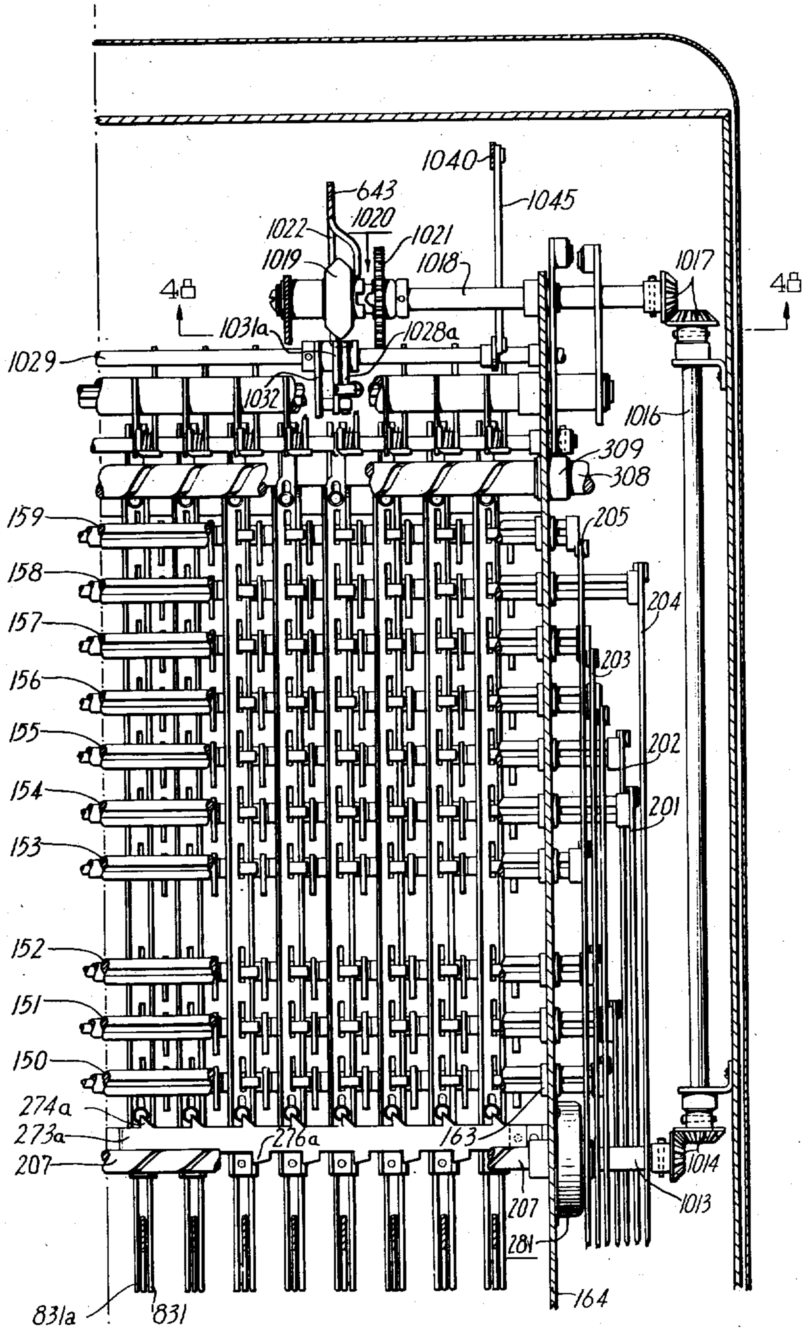

Figs. 9 and 10 taken together compose a sectional plan view of the machine, the sections being taken on horizontal planes indicated by lines 9—9 and 10—10 respectively of Fig. 7.

Figures 11, 12, 13, 14:
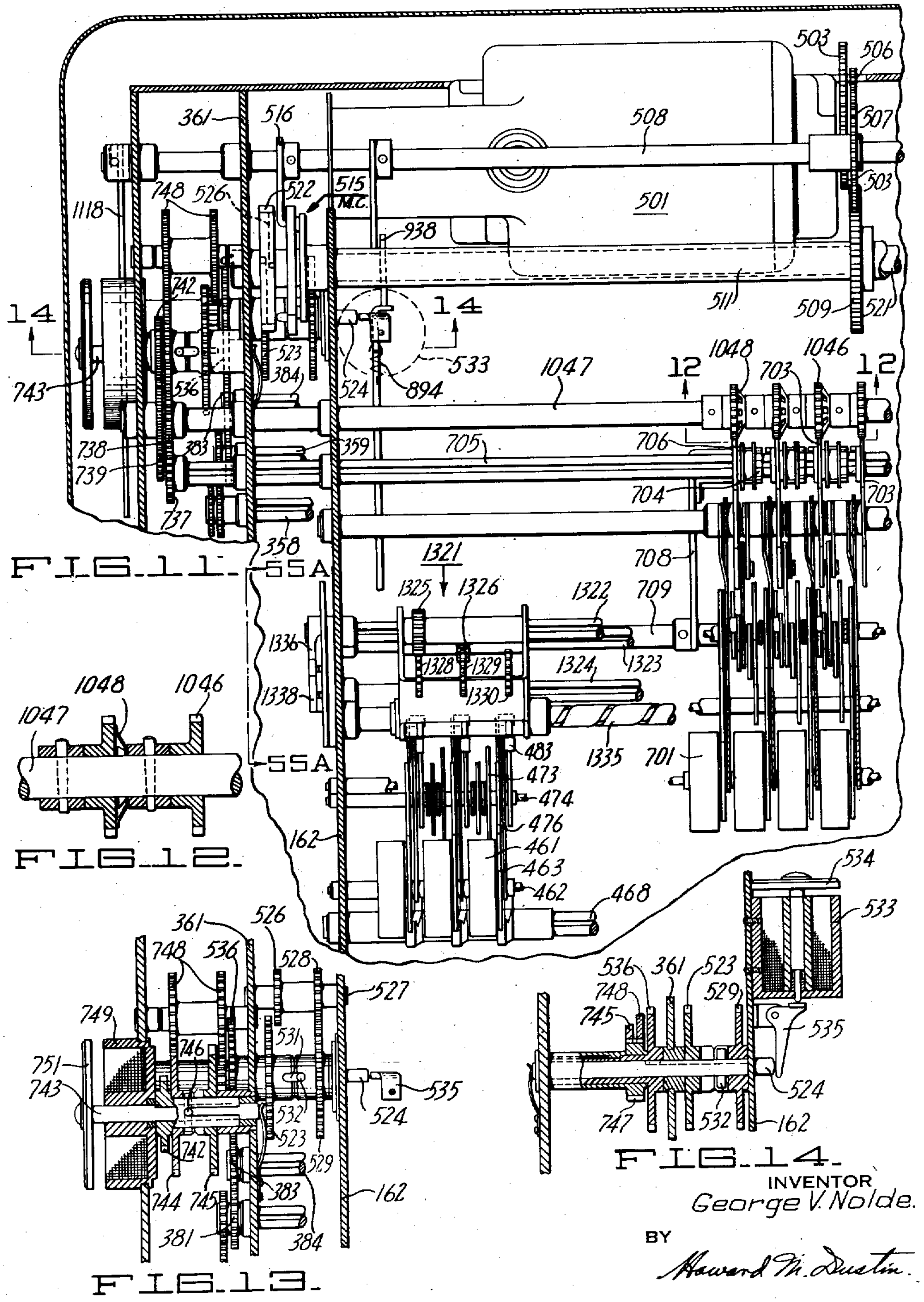

Fig. 11 is a fragmentary plan view illustrating the relation of the drive mechanism to other parts of the machine.

Fig. 12 is a fragmentary sectional view as seen from the front of the machine and taken as indicated by the line 12—12 in Fig. 11.

Fig. 13 is a fragmentary plan view partly in section, showing particularly the drive and reversing mechanism of Fig. 11.

Fig. 14 is a fragmentary section as viewed from the front of the machine showing the main reverse magnet and its associated reverse gearing, the section generally being taken on the vertical plane indicated by line 14—14 of Fig. 11.

Figure 15:
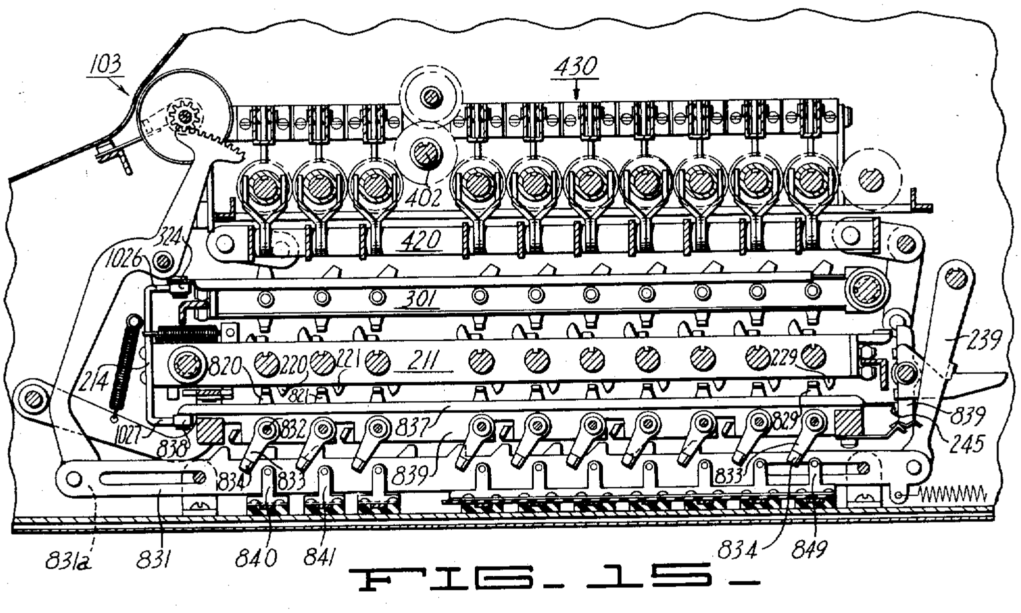

Fig. 15 is a sectional elevation, as viewed from the right, showing the multiplier selection mechanism, the section being taken on the line 15—15 in Fig. 7.

Figure 16:
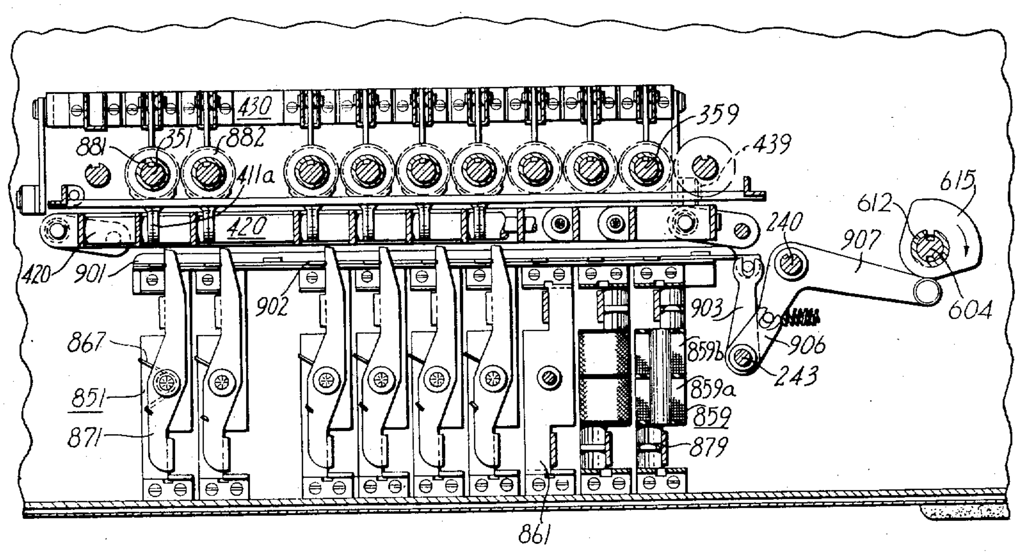

Fig. 16 is a sectional elevation, as viewed from the right, showing the multiplier magnets and associated multiplier mechanism, the section being taken on the line 16—16 in Fig. 7.

Figures 16, 17, 18:
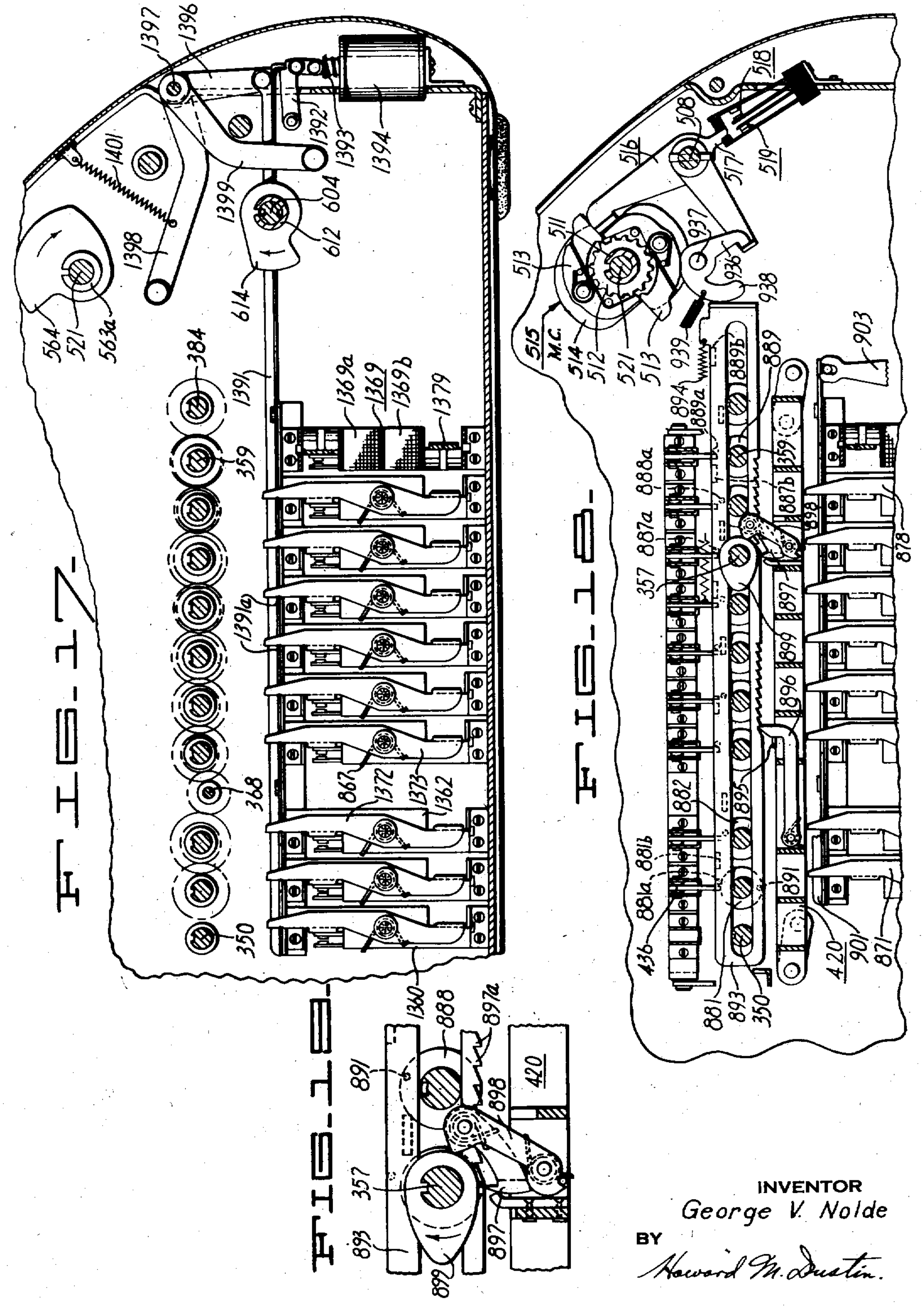

Fig. 17 is a sectional elevation, as viewed from the right, showing the division bridge magnets, the section being taken as indicated by the line 17—17 in Fig. 7.

Fig. 18 is a sectional elevation, as viewed from the right, showing a portion of the multiplier control mechanism, the section being taken on the line 18—18 in Fig. 7.

Fig. 19 is an enlarged view of a portion of the multiplier control mechanism shown in Fig. 18.

Figures 20, 21, 22:
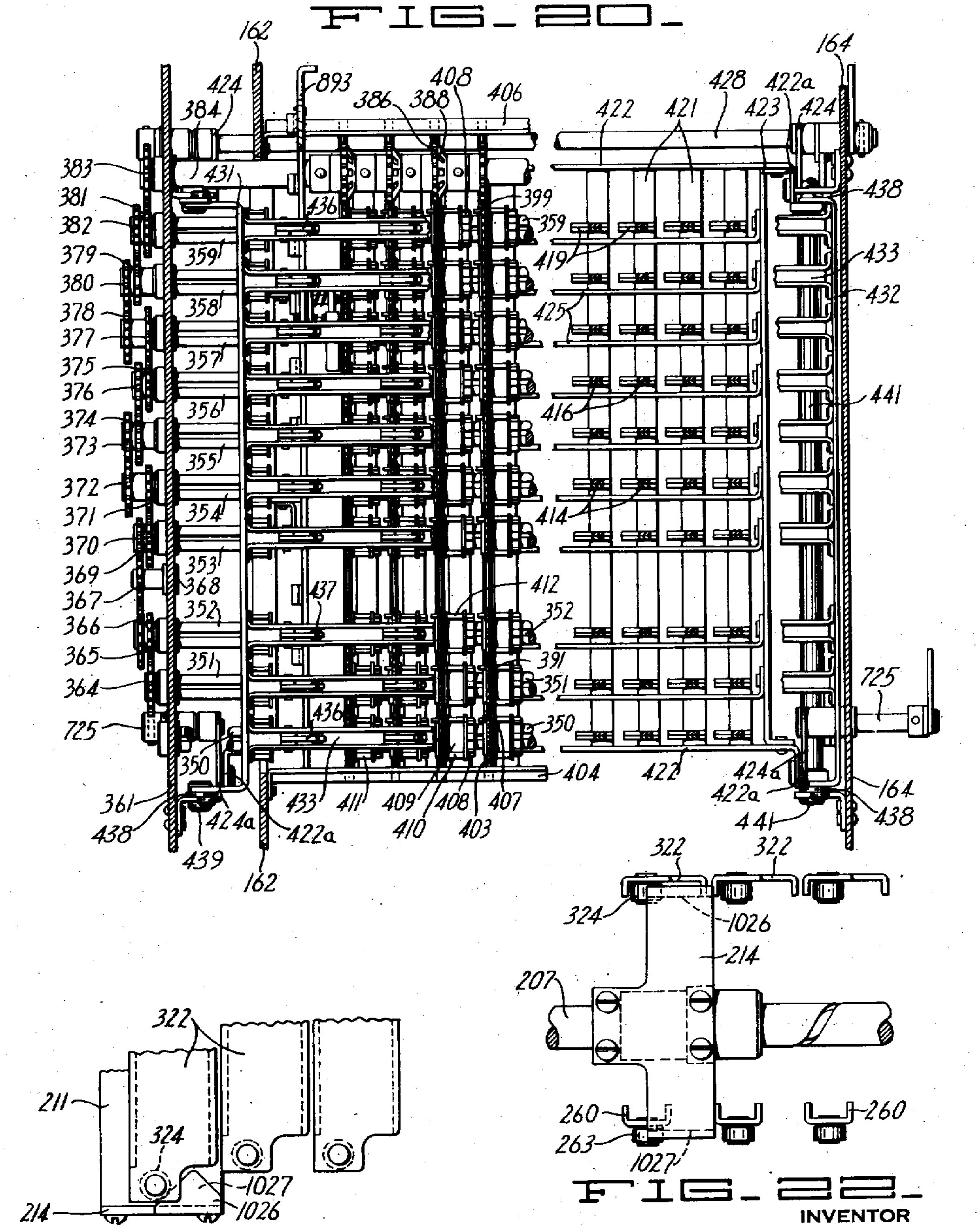

Fig. 20 is a sectional plan view of the main actuating mechanism and associated control means.

Fig. 21 is a fragmentary plan view of portions of the selection storing carriage and the selection set-up carriage.

Fig. 22 is a front view of the mechanism shown in Fig. 21.

Figures 23, 23A, 23B:
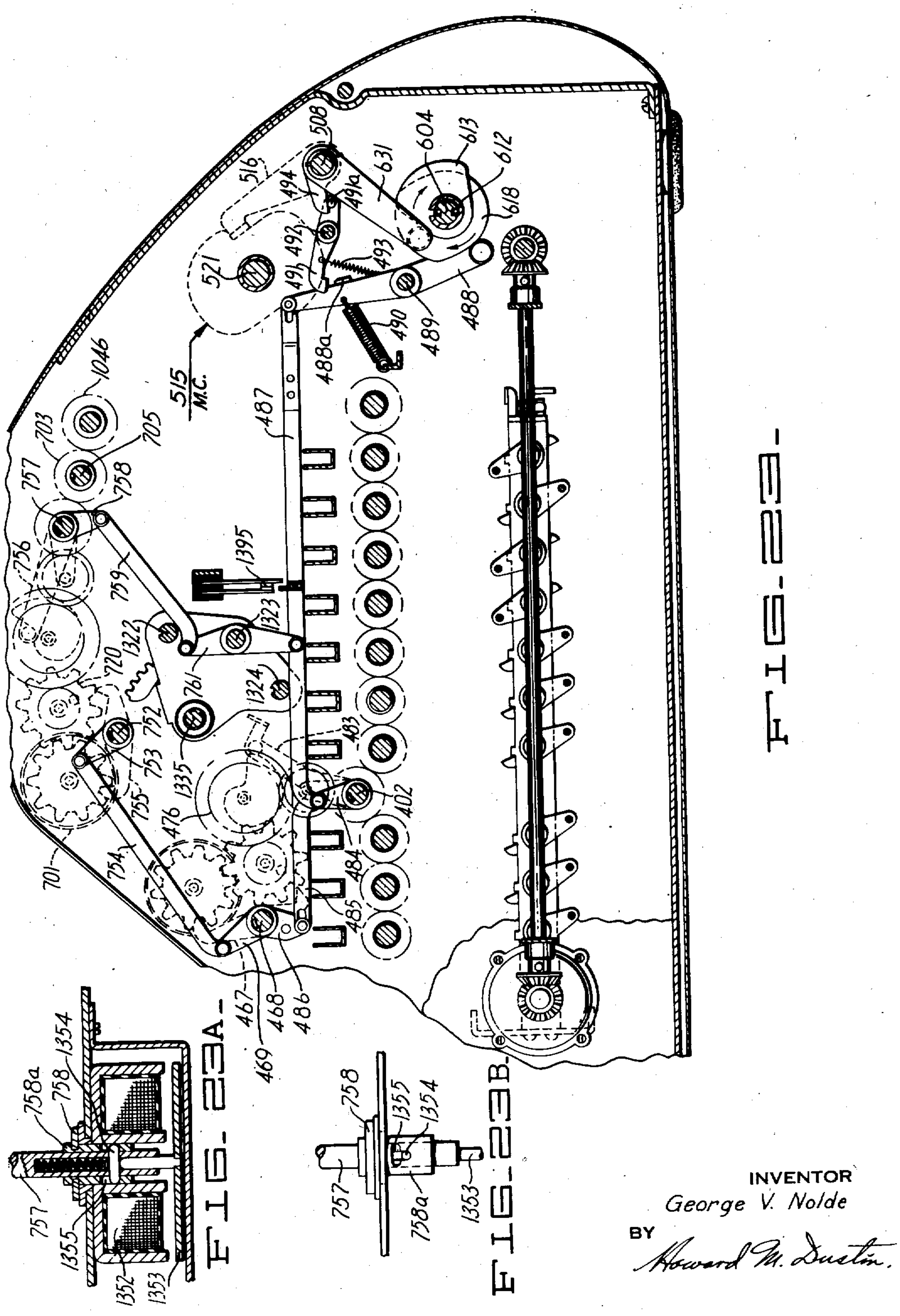

Fig. 23 is a right side view of the machine with certain parts omitted, illustrating the controls for the centralizer pawls and compensator arms of the registers.

Fig. 23A is an enlarged sectional plan view of the mechanism for disabling the control of the compensating arms of the counter register.

Fig. 23B is a detail view of a part of the mechanism shown in Fig. 23A.

Figure 24:
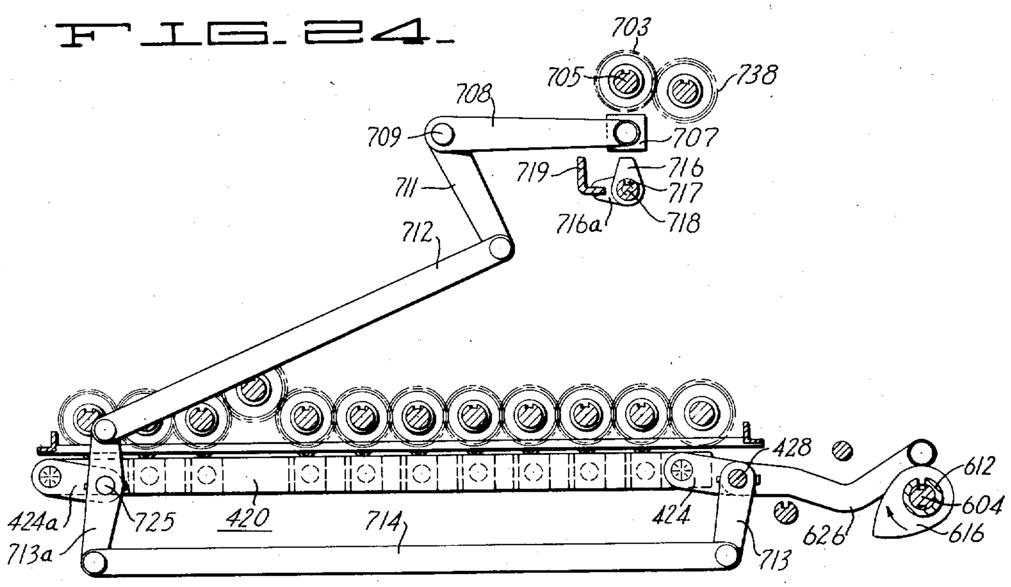

Fig. 24 is a fragmentary transverse section, as viewed from the right side of the machine, illustrating the drive establishing pawl frames for the main actuator and the counter actuator.

Figures 25, 26:
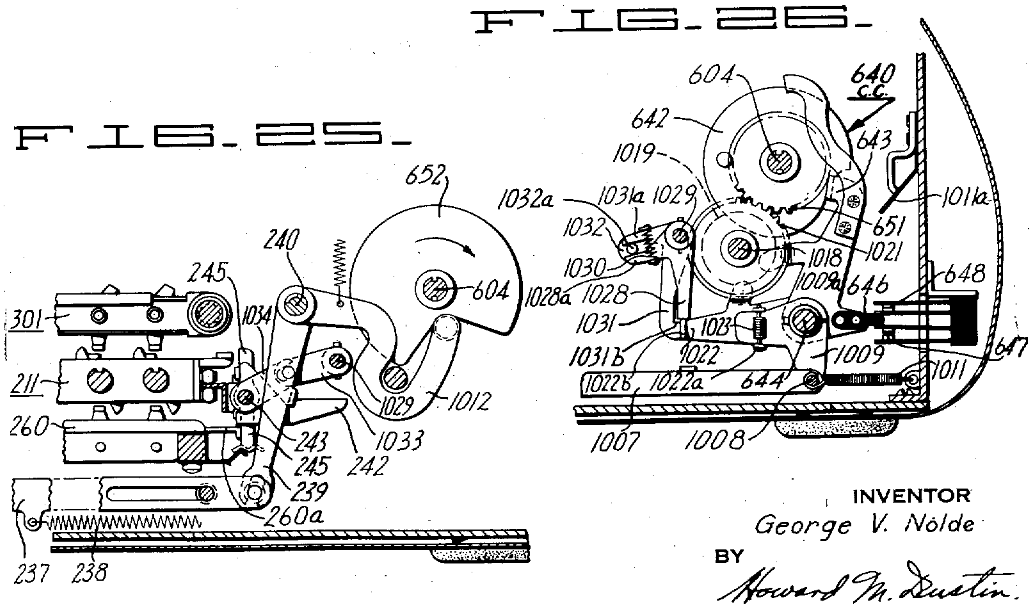

Fig. 25 is a fragmentary section, as viewed from the right, illustrating a portion of the clearance mechanism.

Fig. 26 is a fragmentary section, as viewed from the right, showing the clear clutch and related parts.

Figures 27, 28, 29, 30:
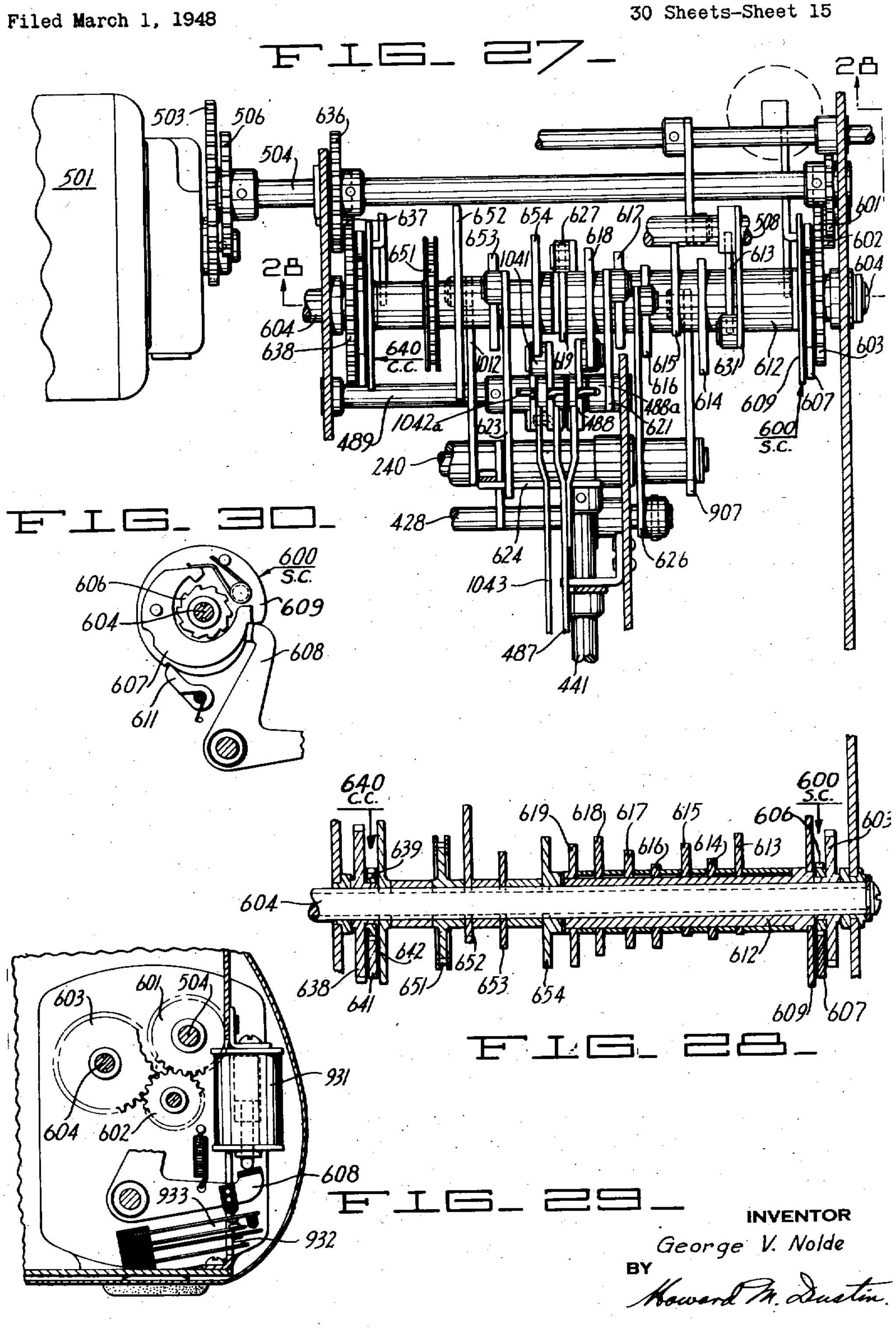

Fig. 27 is a fragmentary plan view of the clear clutch, the setting clutch, and elements driven thereby.

Fig. 28 is a sectional front view of a portion of Fig. 27 as indicated by the line 28—28 therein.

Fig. 29 is a right side view of the setting clutch control and drive means.

Fig. 30 is a right side sectional view of the setting clutch.

Figure 31:
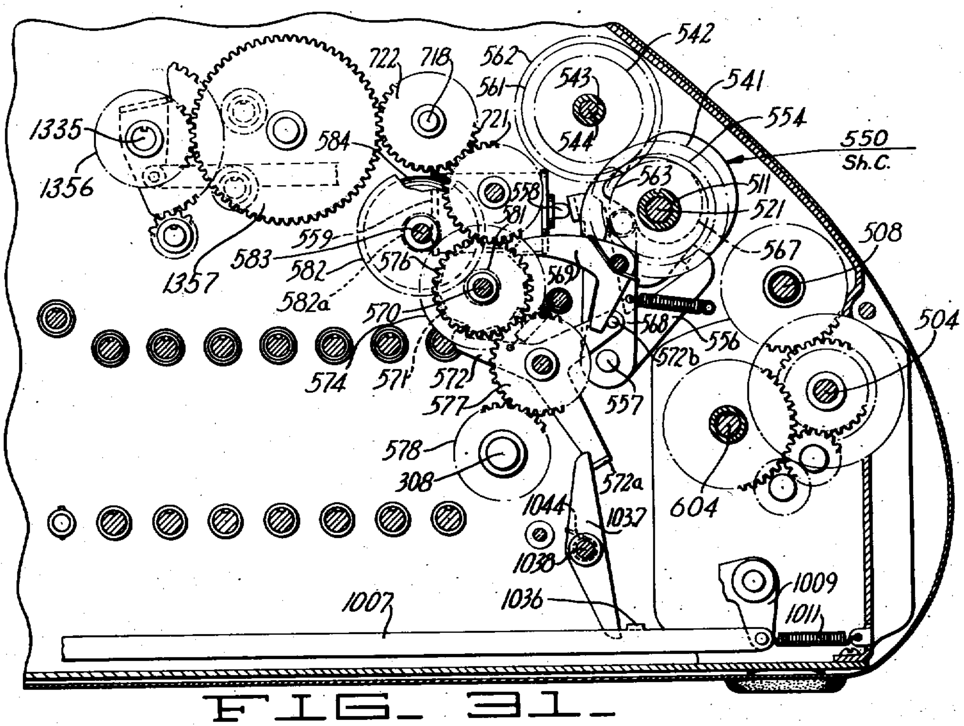

Fig. 31 is a right side sectional view of the shift clutch and associated mechanisms.

Figure 31A:
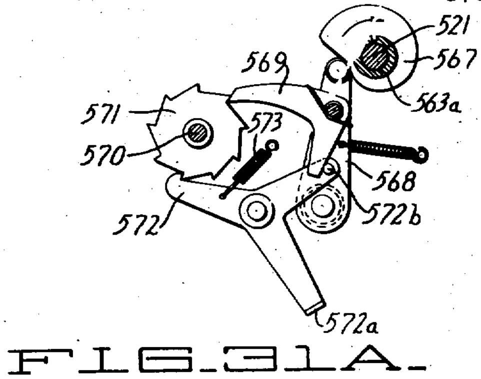

Fig. 31A is a detailed view of a portion of the shift drive mechanism shown in Fig. 31.

Figure 32:
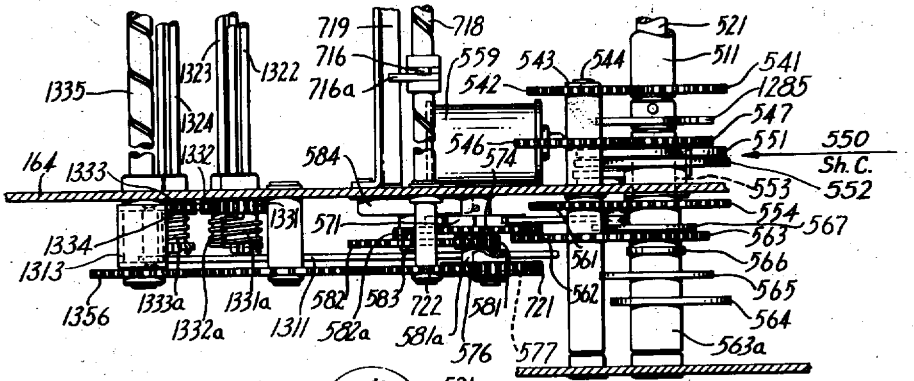

Fig. 32 is a fragmentary plan view of the shift clutch and associated mechanisms.

Figure 33:
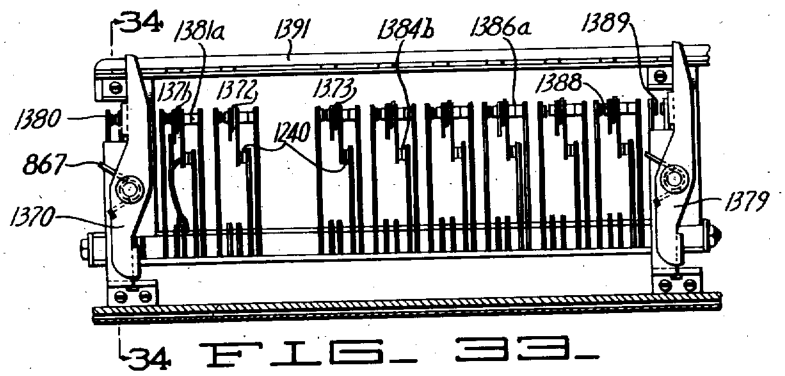

Fig. 33 is a right side view of the control switches associated with the bridge magnets of the division mechanism.

Figure 34:
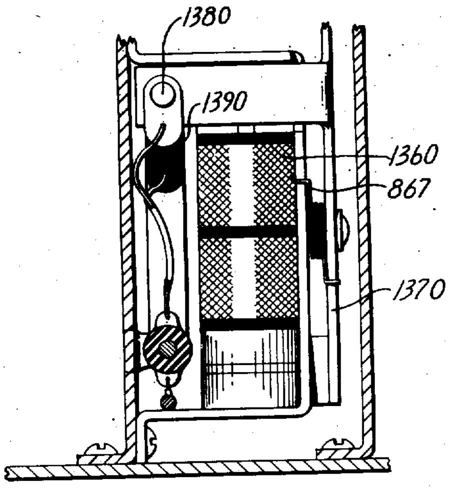

Fig. 34 is an enlarged front view of a bridge magnet taken as indicated by the line 34—34 in Fig. 33.

Figure 35:
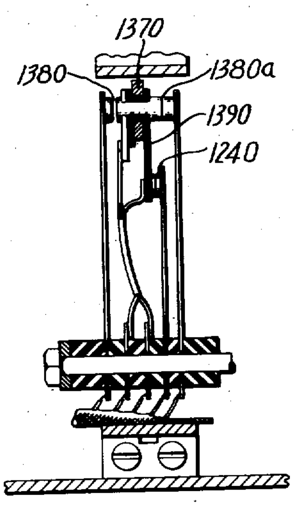

Fig. 35 is an enlarged view of a portion of the switch mechanism shown in Fig. 33.

Figure 36:
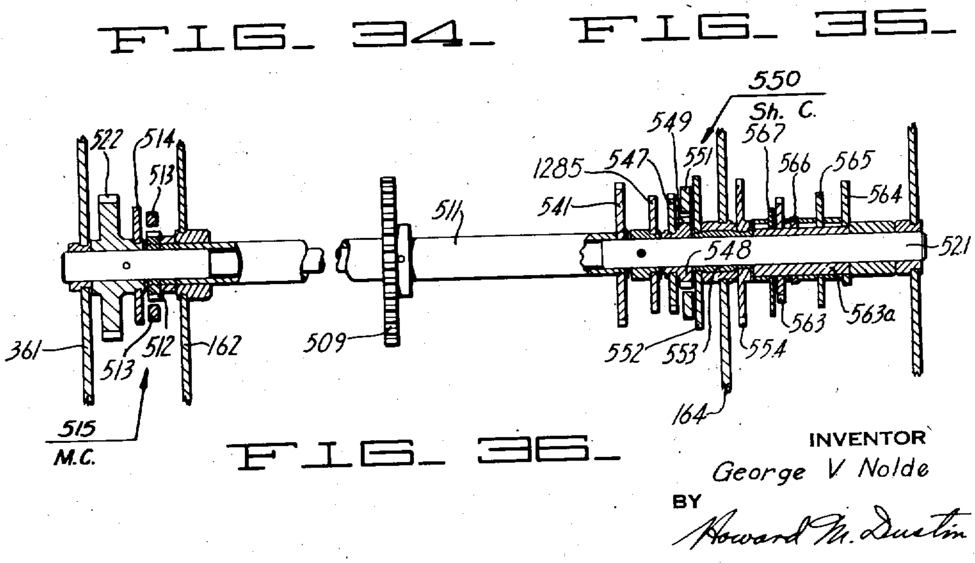

Fig. 36 is a front view, partially in section, of the main clutch, the shift clutch, and associated mechanisms.

Figure 37:
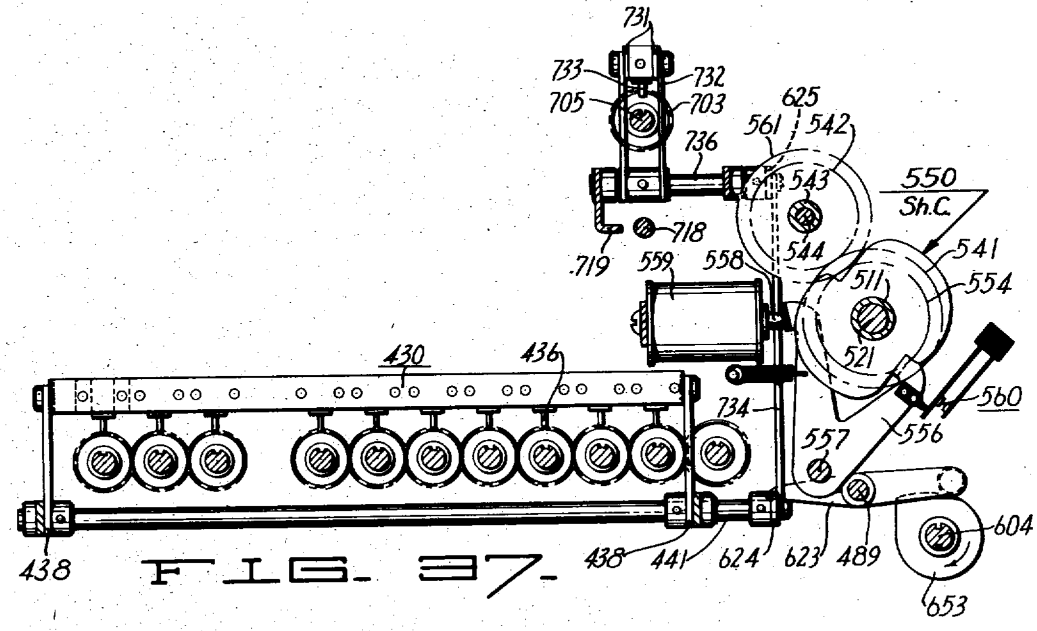

Fig. 37 is a right side view of a part of the clearance mechanism, the control mechanisms for the drive-disengaging pawl frames, and the shift clutch solenoid.

Figures 38, 38A, 39:
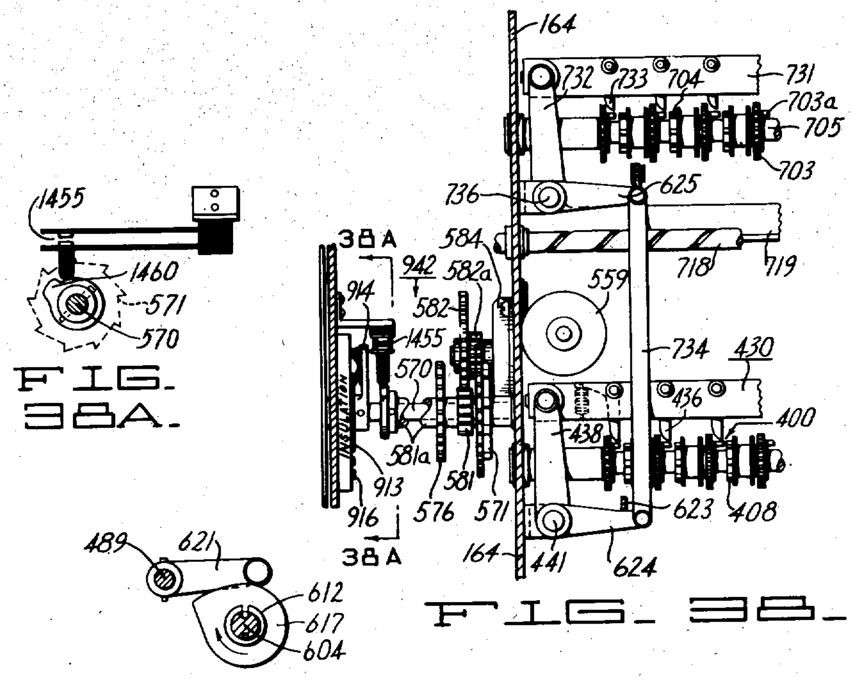

Fig. 38 is a fragmentary rear view illustrating the drive-disengaging pawl frames and a portion of the mechanisms driven by the shift clutch.

Fig. 38A is a fragmentary left side view taken as indicated by the line 38A—38A in Fig. 38.

Fig. 39 is a right side view of one of the setting clutch cams.

Figure 40:
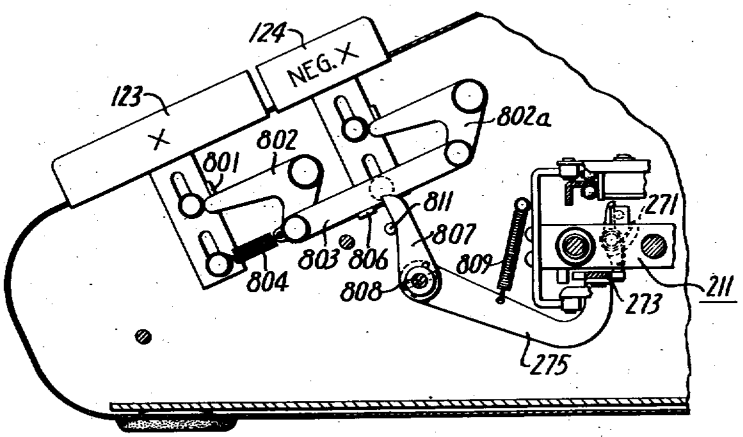

Fig. 40 is a right side view of the multiplier control keys and related selection set-up carriage escapement mechanism.

Figures 41, 42, 42A, 43:
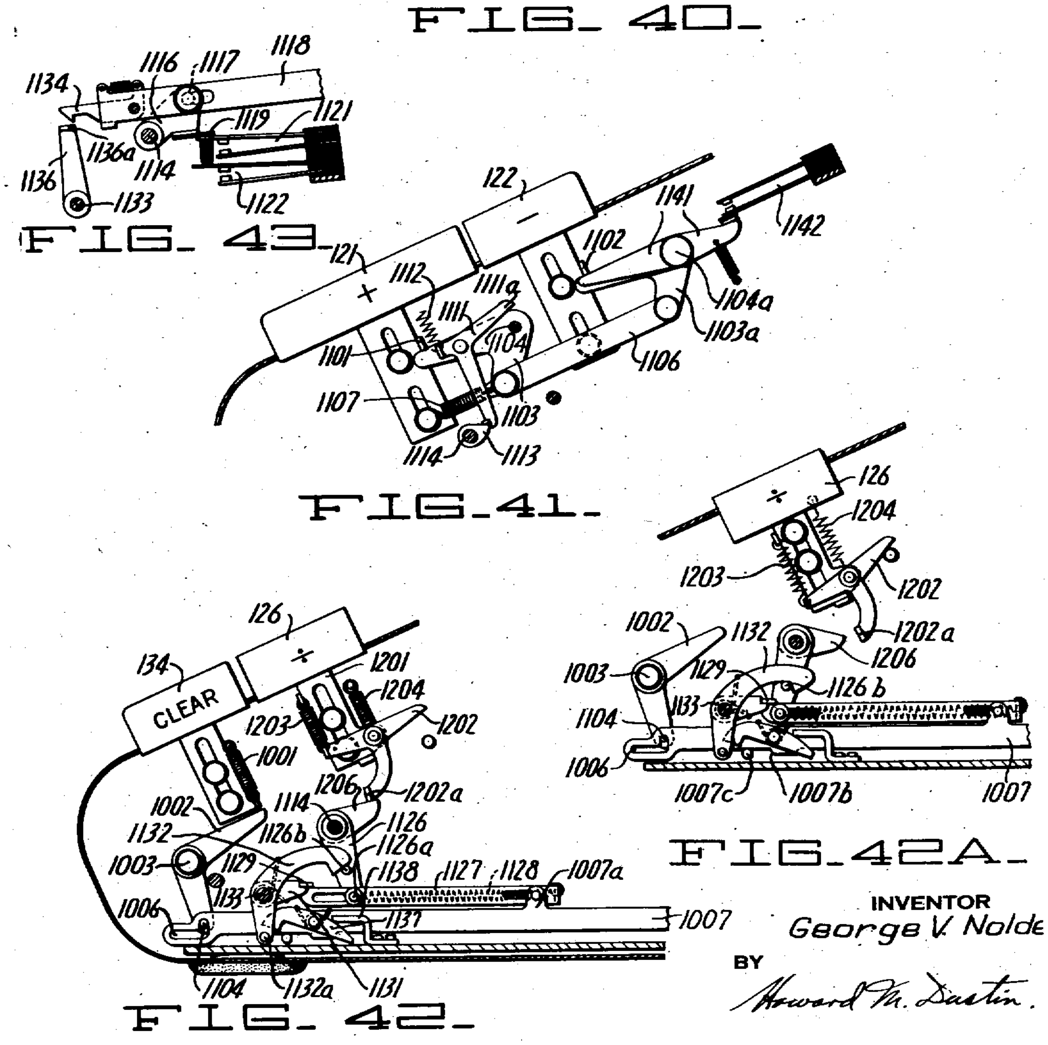

Fig. 41 is a right side view of the add and subtract keys.

Fig. 42 is a sectional elevation, as viewed from the right, showing the clear key and the dividend entry key. The parts normally obscuring the dividend entry key, as viewed from the plane of the clear key, are omitted for greater clarity.

Fig. 42A is a right side view of the dividend entry key in depressed position.

Fig. 43 is a fragmentary elevational view of a portion of the dividend entry control mechanism.

Figure 44:
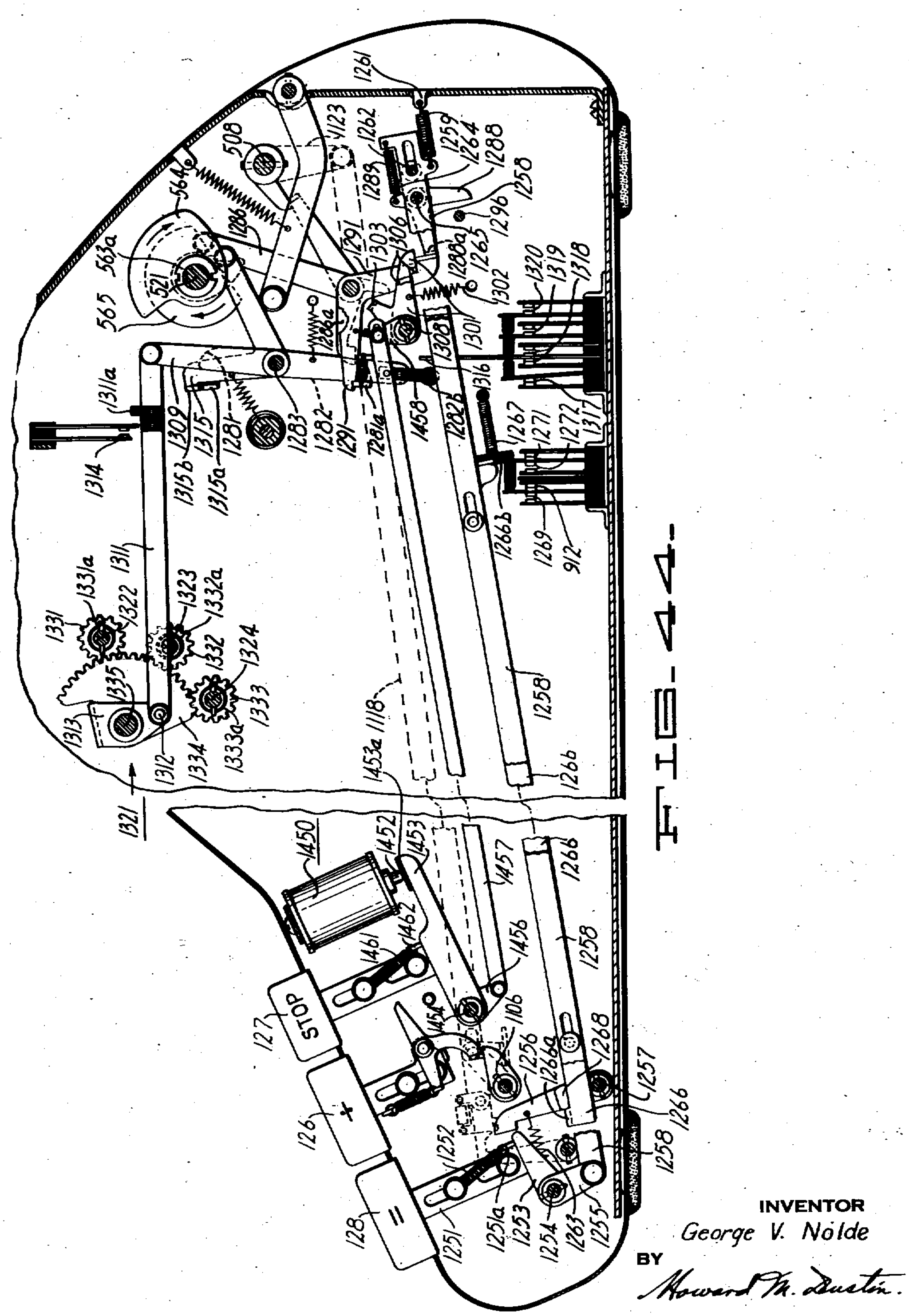

Fig. 44 is a right side view, partially in section, showing the division control keys and their related division control mechanisms.

Figure 45:
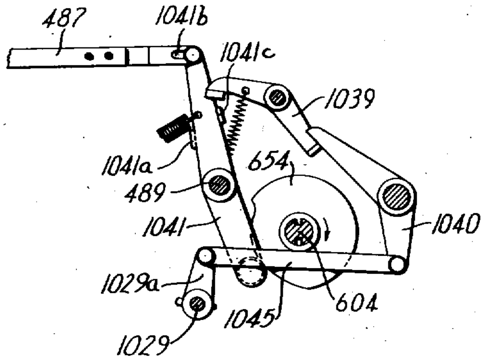

Fig. 45 is a fragmentary section, as viewed from the right, showing one of the clear clutch cams and associated mechanism.

Figure 46:
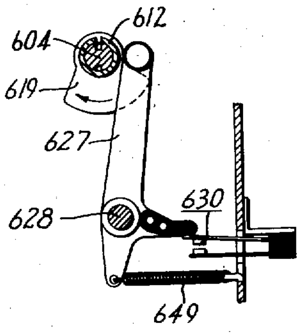

Fig. 46 is a fragmentary right side view of one of the setting clutch cams and associated mechanism.

Figures 47, 48:
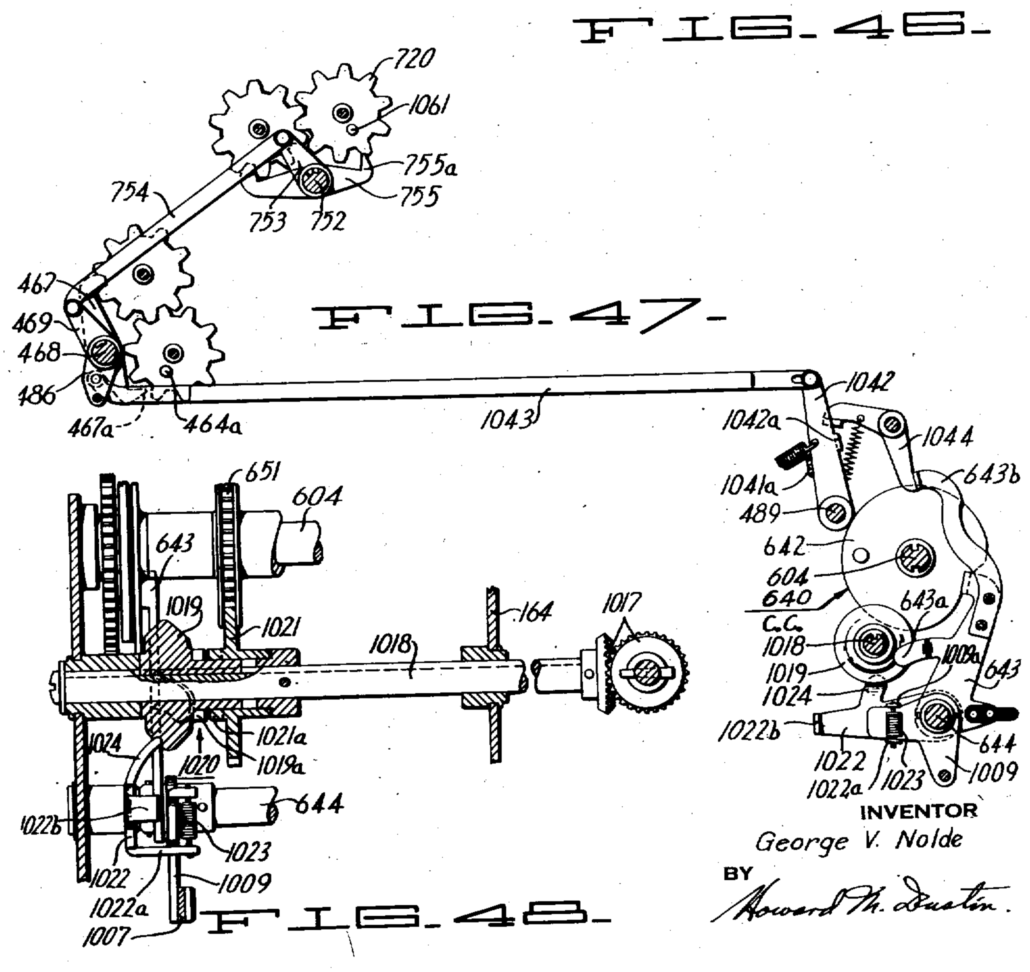

Fig. 47 is a sectional right side view of the clear clutch and related control mechanisms for the zero stops of the accumulator and counter registers.

Fig. 48 is an enlarged front sectional view of a portion of the clearance drive shown in Fig. 10, the view being indicated by the line 48—48 therein.

Fig. 49 is a fragmentary plan view of a portion of the division control mechanism.

Figs. 50 to 53 inclusive are fragmentary right side views of portions of the division control mechanism.

Figures 54, 55, 55B:
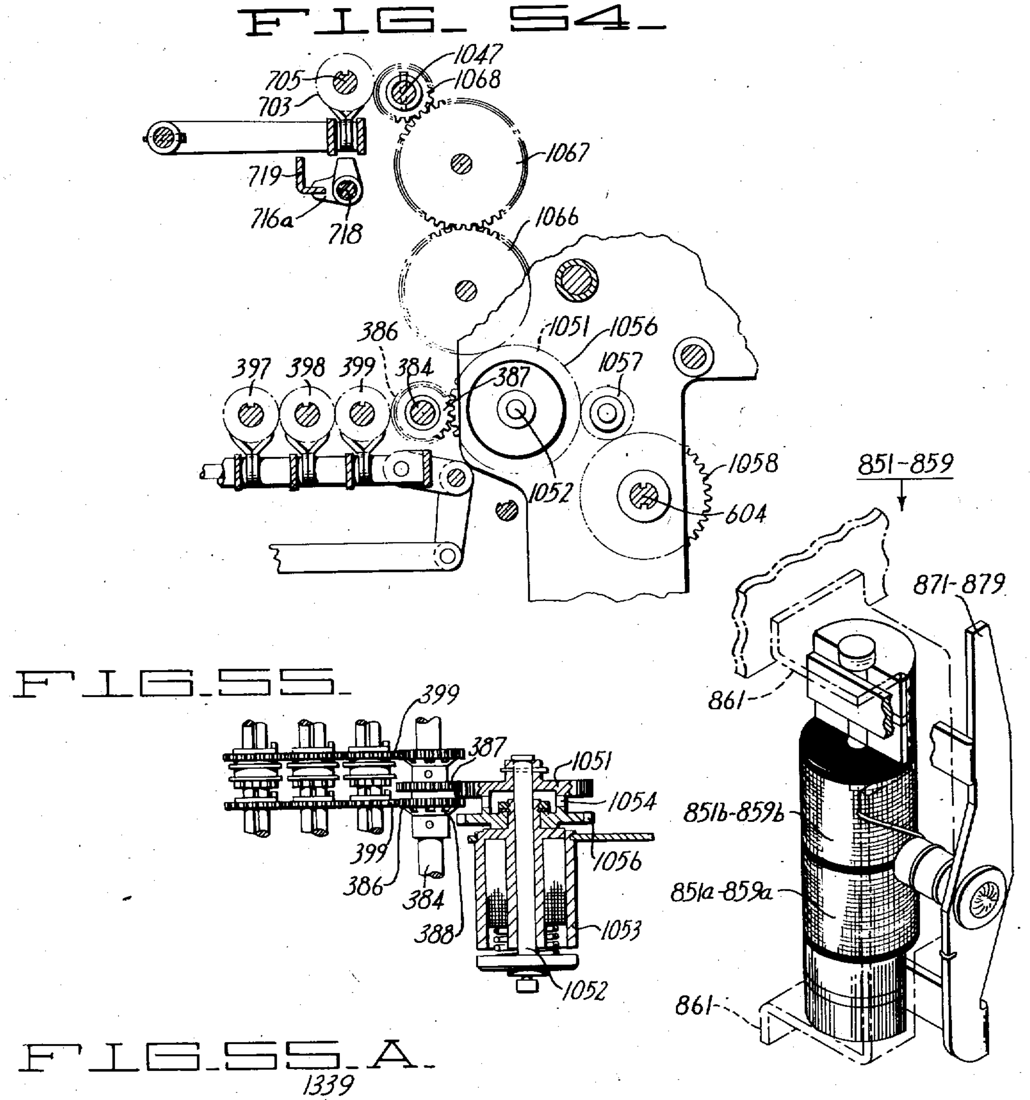

Fig. 54 is a fragmentary section, as viewed from the right, showing in part the drive train for the accumulator and counter register clearance mechanisms.

Fig. 55 is a fragmentary plan view, partially in section, showing the disabling solenoid for the accumulator clearance drive train.

Figure 55A:
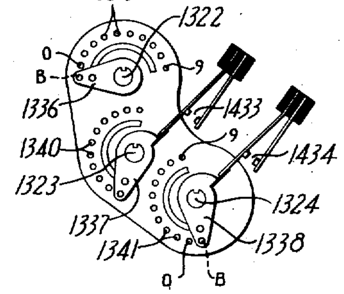

Fig. 55A is a left side view of the contact arms of the dividend sensing mechanism taken along lines 55A—55A in Fig. 11.

Fig. 55B is oblique view of one of the multiplier solenoids shown in Fig. 16.

Figure 56:
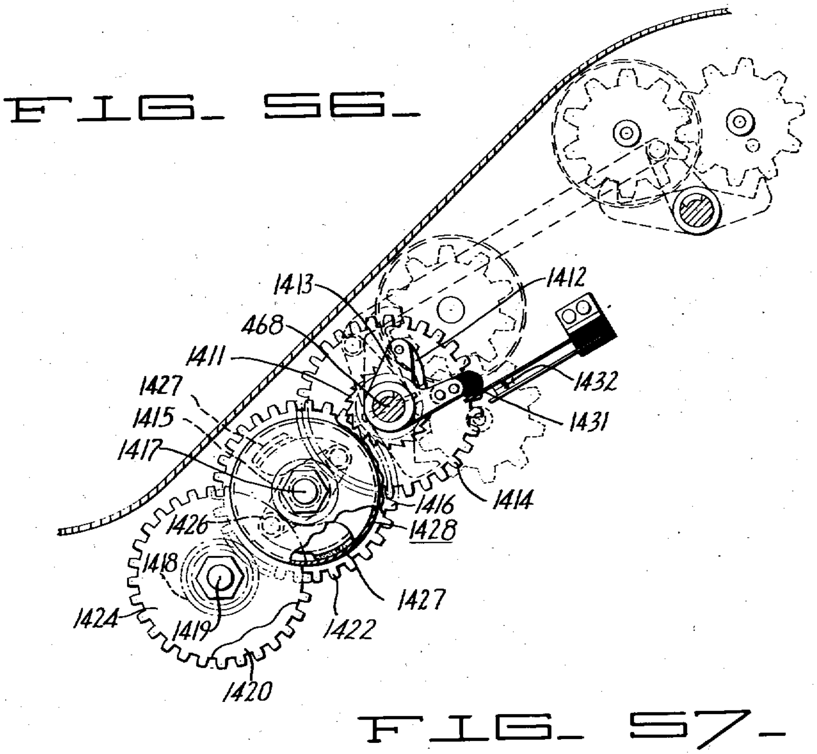

Fig. 56 is a fragmentary section, as viewed from the right, showing the control mechanism for delaying return of the centralizer pawls at the end of a digitation operation.

Figure 57:
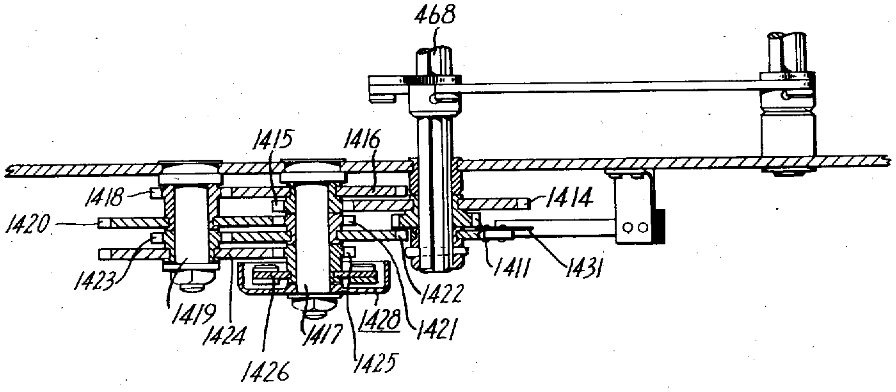

Fig. 57 is a sectional plan view of the mechanism shown in Fig. 56.

Figure 58:
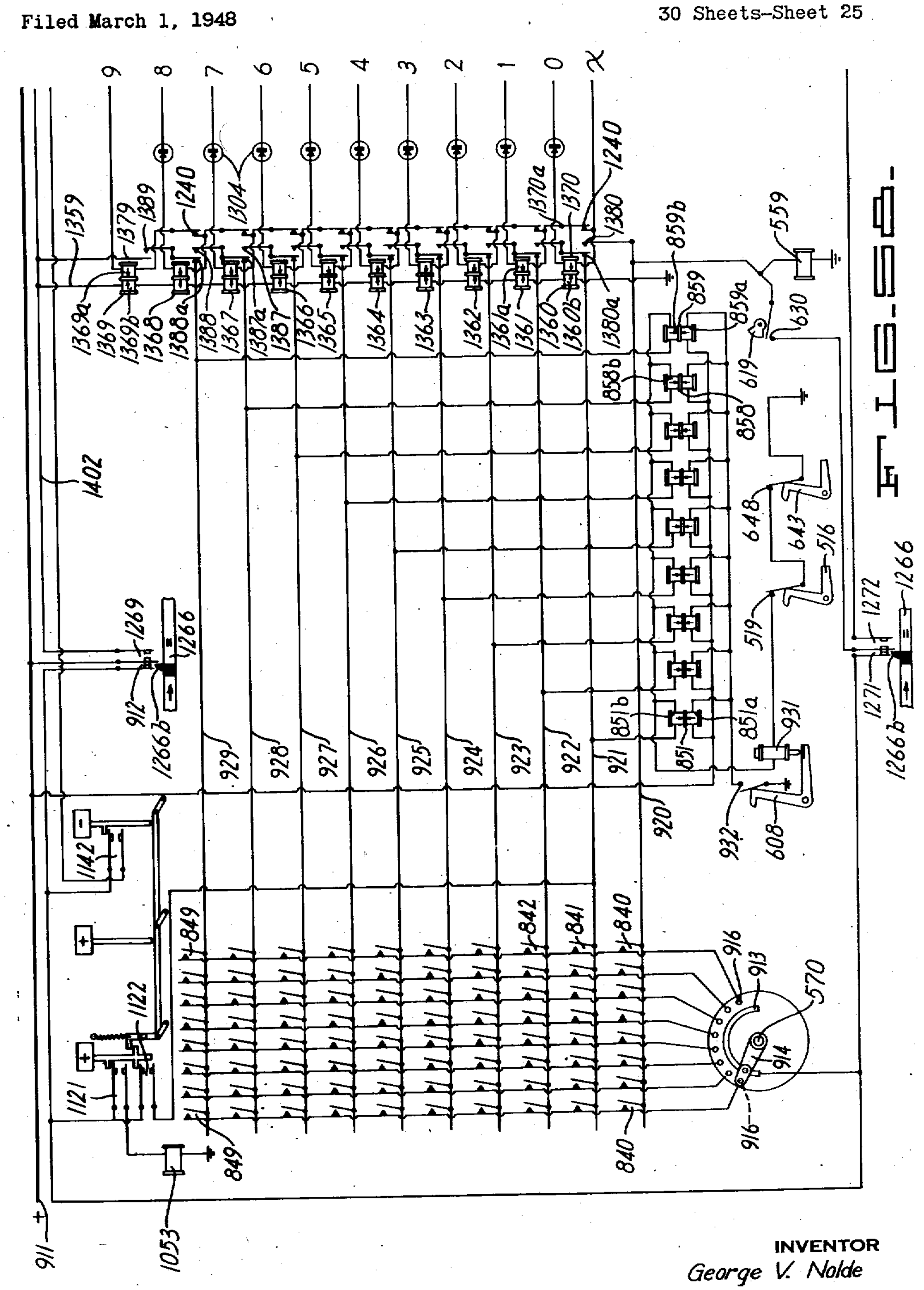
Figure 58:
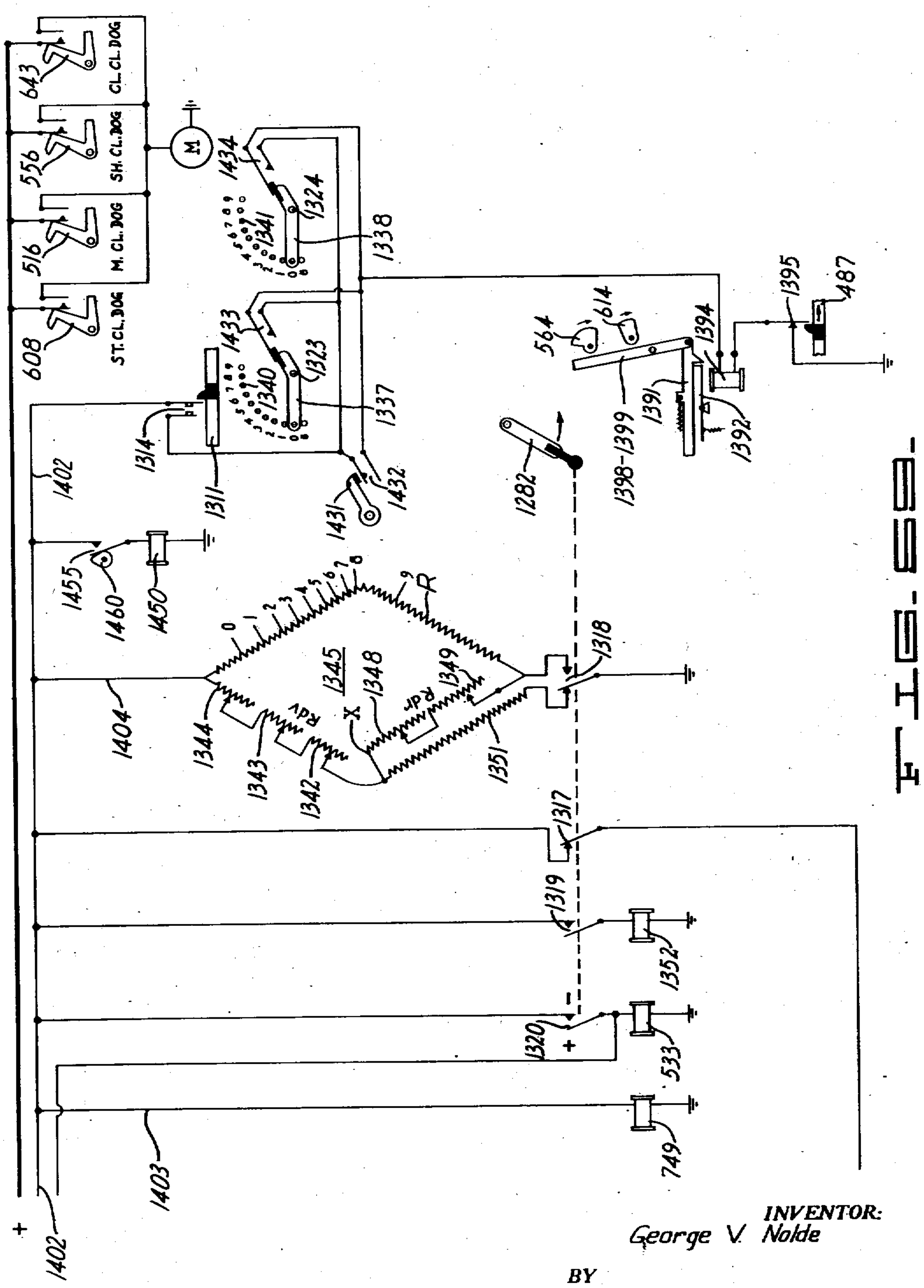

Figs. 58 and 59, taken together, form a schematic wiring diagram of the electrical controls of the calculating mechine.

Figure 60:
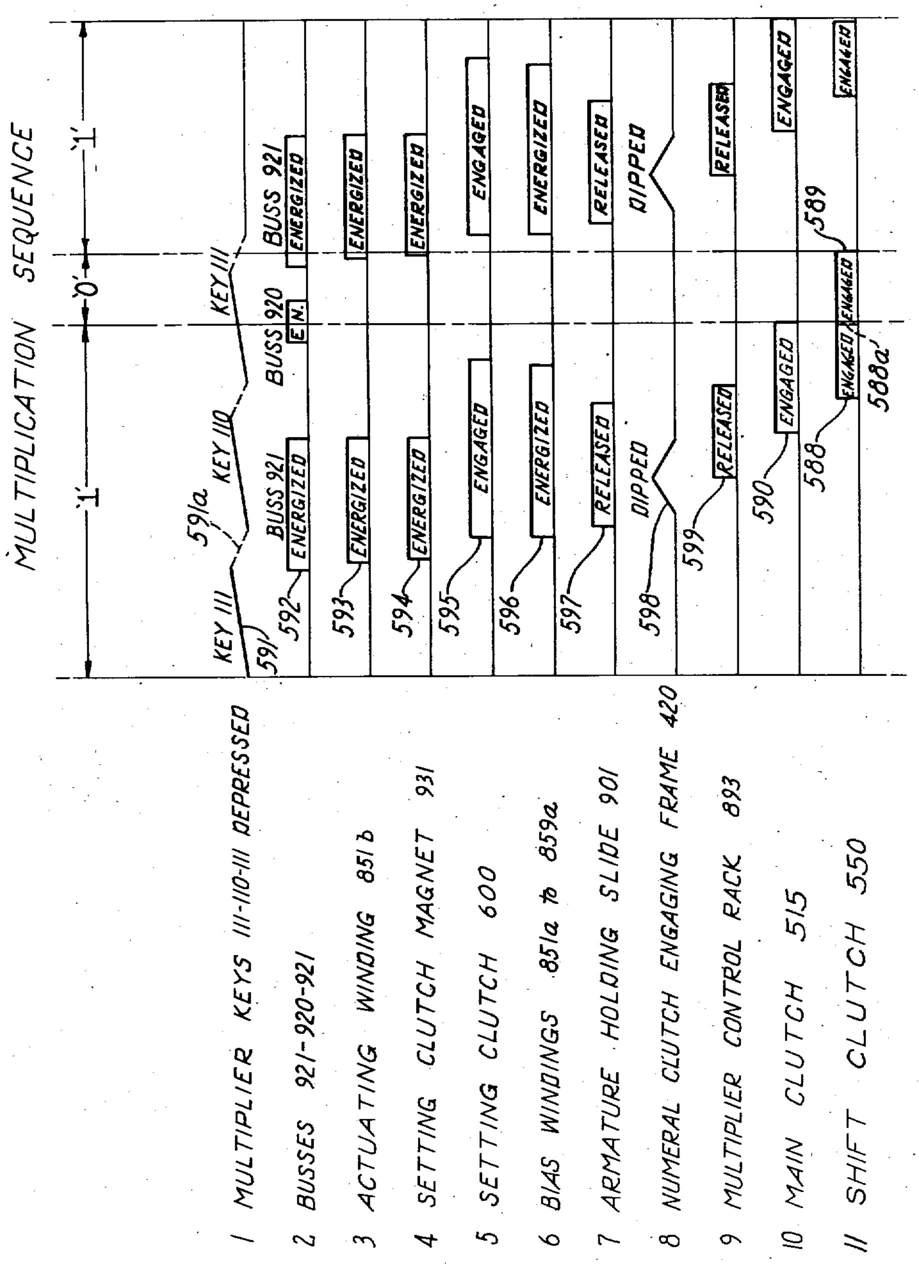

Fig. 60 is a timing diagram of a typical multiplying operation.

Figure 62:
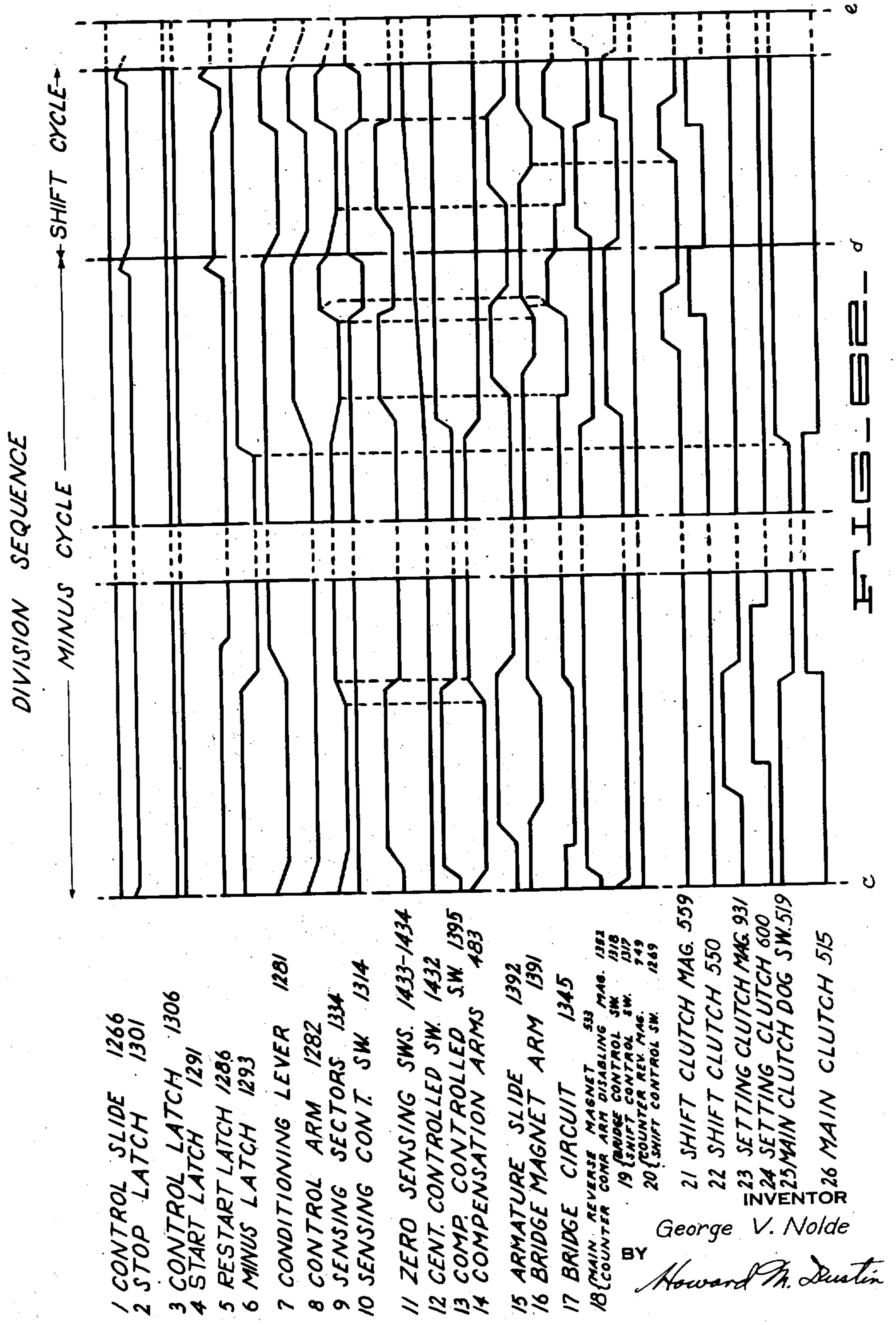
Figure 63:
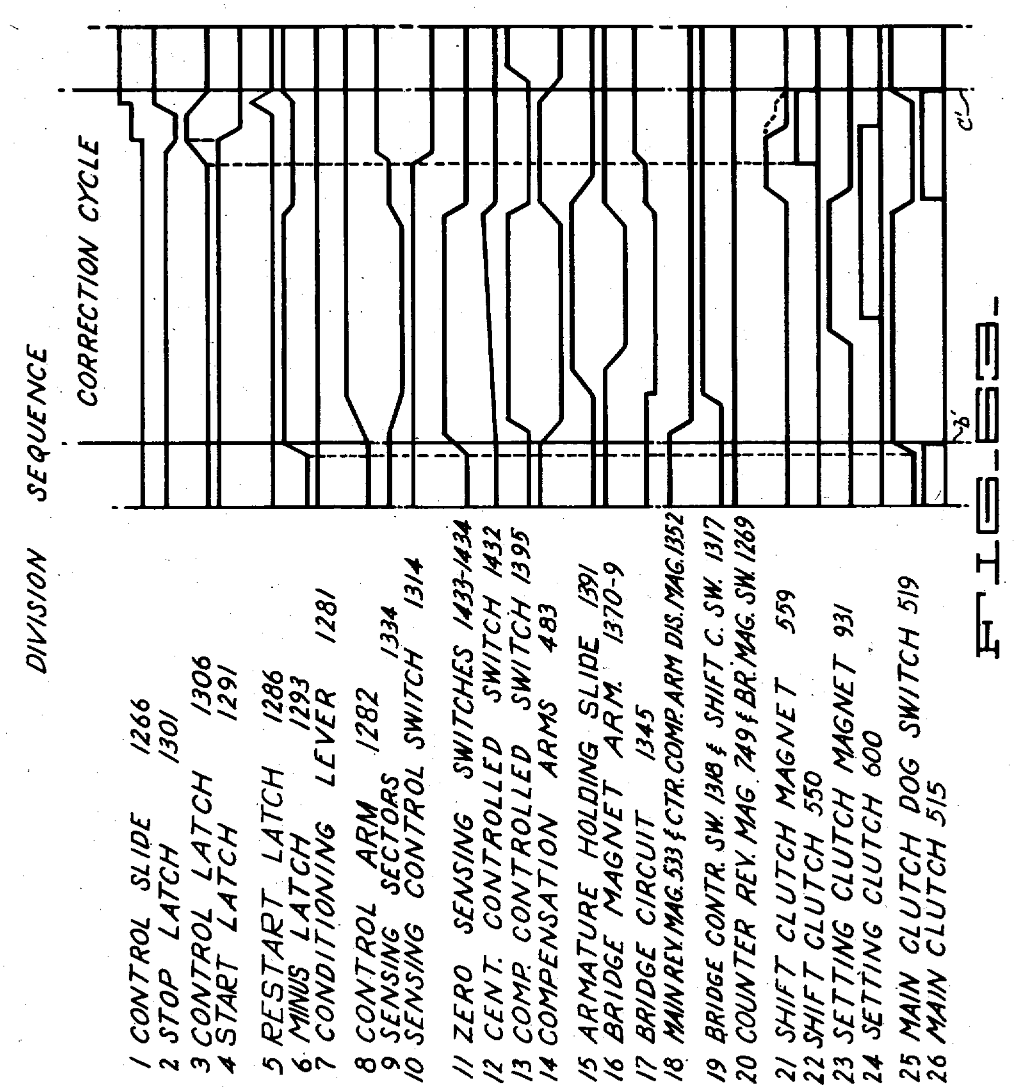

Figs. 61 to 63 inclusive, taken together, form a timing diagram of characteristic portions of a typical dividing operation.

GENERAL DESCRIPTION

Fig. 1 of the drawings illustrates a plan view of the calculating machine embodying the instant invention. A machine of the ten-key keyboard type of the general character disclosed in the Avery patent application, Serial Number 506,519, filed October 16, 1943 (issued as Patent No. 2,467,419 on April 19, 1949), has been selected for illustration of such invention.

Generally, the calculating machine includes an accumulator or product register 100, a revolutions counter register 101, and two factor indicators 102 and 103. Indicator 102 indicates the values selected in addition and subtraction, and also indicates the multiplicand in multiplication, while indicator 103 shows the multiplier values selected. In dividing operations the register 100 becomes a dividend register, the indicator 102 shows the divisor, while the register 101 is the quotient register. Values may be introduced into the indicators 102 and 103 under the control of a common ten-key keyboard comprising the keys 110 to 119, respectively.

Where single items are to be entered into the accumulator 100 as in adding and subtracting operations, the entry is effected under the control of an add key 121 or a subtract key 122. Where a multiplying operation is to be performed in a positive fashion the positive multiplication key 123 is provided to condition the machine for operation under the control of multiplier entry keys, while the negative multiplication key 124 conditions the machine for multiplication under the control of the same multiplier entry keys with subtraction of the product from the value standing in the register 100. In multiplication, the keys 110 to 119 when related to the multiplier register 103 become multiplier keys and serve to start machine operations.

Dividing operations are performed under the control of the dividend entry key 126 and the division start key 128 marked "=." A division stop key 127 is provided whereby a division operation can be terminated at the end of any desired ordinal division operation.

For effecting individual resetting or clearing of the various registers and/or indicators, a clear key 129 marked "Product Dials" is provided for the register 100, a key 130 marked "Counter Dials" for the register 101, a key 131 marked "Left Factor" for the indicator 102, a key 132 marked "Right Factor" for the indicator 103. The key 133 marked "Last Digit" is employed for clearing one or more of the last digits entered into the left or right factor indicators 102 or 103. The keys 129 through 132 and the mechanisms controlled thereby are conventional and will not be described herein. The entire machine may be restored to "zero" or normalized condition by operation of the clear key 134 as later described.

SELECTION MECHANISM

*General description*

Depression of a value key 110—119 enters the value selected into one order of a plural order selection storing mechanism through the intermediary of a single order selection set-up carriage. Release of the depressed key allows the carriage to escape to the next adjacent order of the selection storing mechanism to allow the next entry. By successive depressions of the value keys 110—119, a plural order factor may be set-up in the selection storing mechanism. The storing mechanism establishes a mechanical representation of the values selected and which mechanical representation is used to adjust the numeral wheel actuating means in accordance with the selected values. In multiplying and dividing operations the selection storing mechanism, disclosed in the form of a carriage, may be shifted relative to the actuating means in order to control the latter for entry of the stored values into any orders of the accumulator.

The selection set-up mechanism is also used as an intermediary in entering the second factor of a calculation into the machine. In multiplication, the selection setting carriage connects the keys 110—119 and the multiplier control mechanism, so that, in effect the keys become multiplier operation control keys. In division, after the dividend has been entered into the accumulator, the selection set-up carriage is used as an intermediary in setting the divisor into the selection storing carriage in the same manner as described in connection with the setting of a plural order factor in said carriage.

*Keyboard*

As previously stated, the keyboard is of the ten-key type and comprises the value keys 110 to 119, inclusive (Figs. 1 to 4), the stems of which keys may be mounted in any convenient manner for up and down sliding movement. In the present instance four pairs of transverse guide and supporting rods 141 and 142 extend between suitable supporting plates (not shown) and engage the respective slotted stems 143 of the keys. The value keys are spring-urged to their raised or uppermost positions as will be described later.

To enable control of the keyboard over the shiftable single order selection set-up carriage, the respective keys 110 to 119, which correspond to the values "0" to "9," inclusive, are connected through suitable linkages with a series of rockable selection shafts 150 through 159, respectively (Figs. 2, 6, 9, and 10), which also correspond to the values "0" to "9," inclusive. As seen in Figs. 7, 9, and 10, the shaft 151 has a bearing 161 at one end in a frame plate 162 and a bearing 163 adjacent its other end in a frame plate 164. The remaining selection shafts 151 to 159 are similarly mounted in the frame plates 162 and 164.

Figure 2:
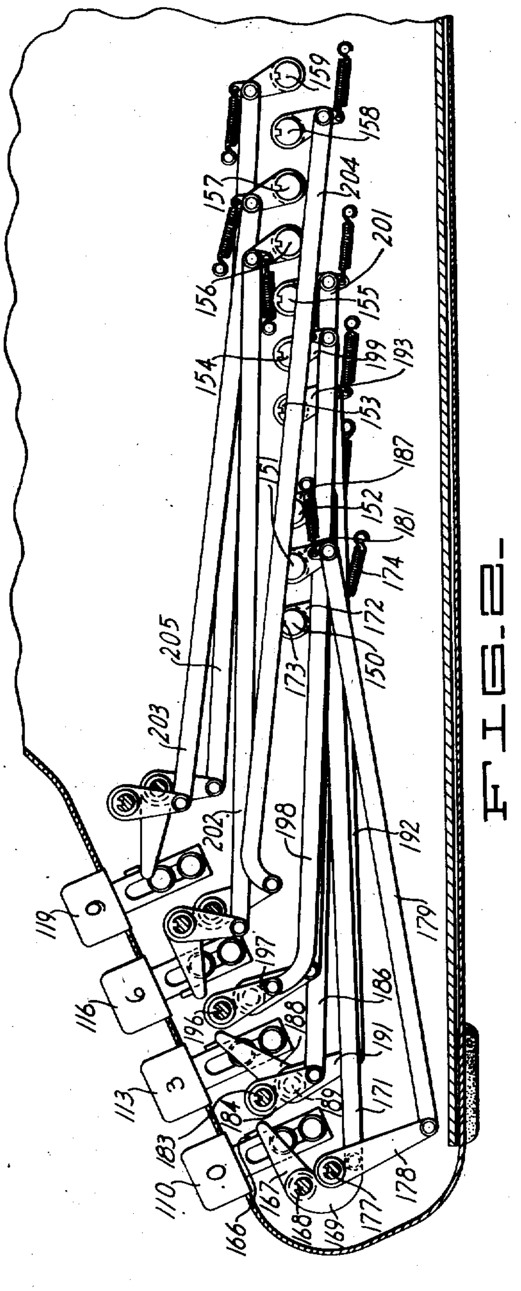
Fig. 2 is a longitudinal section taken on the line 2—2 of Fig. 1, as viewed from the right, showing the keyboard and a portion of the associated selection mechanism.

To control rocking movement of the respective shafts 150 through 159 upon depression of the corresponding keys 110 through 119, respectively, each key stem 143 (Figs. 2, 3, and 4) is provided with a laterally extending ear 166. The ear 166 of the zero key 110 overlies an arm 167 which is carried by a suitably supported stub shaft 168 also carrying a depending arm 169. The arm 169 in turn is pivoted to a link 171 the other end of which is similarly connected to an arm 172 having a keyed connection at 173 with a keyway in the shaft 150. A tension spring 174 urges the shaft 150 counter-clockwise as seen in Fig. 2, and through the link 171, the arm 169, the shaft 168, and the arm 167, the spring urges the "0" key 110 to its raised position. Through the above described linkage, depression of the key 110 will result in rocking the shaft 150 clockwise as viewed in Fig. 2. The remaining value keys 111 through 119

(Figs. 2, 3, 4, and 10) are similarly connected respectively to the remaining value shafts 151 through 159 as will now be described. The "1" key 111 has its ear 166 overlying an arm 176 secured on a stub shaft 177. The shaft 177 also carries a depending arm 178 which is connected by a link 179 to an arm 181 depending from and keyed to the "1" value shaft 151. The "2" key 112 has its ear 166 overlying an arm 182 carried by stub shaft 183 which, as shown in Fig. 2, has a depending arm 184 connected by a link 186 with an arm 187 depending from and keyed to the "2" value shaft 152. The "3" key 113 has its ear 166 overlying an arm 188 carried by a stub shaft 189 also carrying a depending arm 191 which is connected by the link 192 with an arm 193 depending from and keyed to the "3" value shaft 153. The "4" key 114 has its ear 166 overlying an arm 194 carried by a stub shaft 196 which, as seen in Fig. 2, carries a depending arm 197 connected by a link 198 with an arm 199 depending from and keyed to the "4" value shaft 154. The "5," "6," "7," "8," and "9" value keys 115 to 119, respectively, are connected by similar lever and linkage systems including the links 201, 202, 203, 204, and 205 (Figs. 2 and 10) to the corresponding value shafts 155 to 159, respectively. As these lever linkage systems are generally similar to those previously described, and have similar springs attached thereto, further description is believed unnecessary.

From the foregoing, it is seen that the depression of any of the value keys 110 through 119, respectively, will result in clockwise rocking movement of the associated value or selection shafts 150 through 159 as viewed in Fig. 2.

*Single order selection set-up carriage*

The keyboard of the instant calculator operates through the value shafts described above and also through an ordinally shiftable single order selection set-up carriage to enter values into the various orders of a multiple order selection storing carriage which is to be described hereinafter. The selection set-up carriage is shiftable both with respect to the selection storing carriage which comprises in part the multiplicand selection mechanism and with respect to the multiplier selection mechanism also to be described hereinafter. In addition to the function of entering values into the selection storing carriage which subsequently controls the actuating means, the selection set-up carriage also causes entry of the various ordinal values into the factor indicator 102 associated with the selection storing carriage and into the factor indicator 103 associated with the multiplier selection mechanism.

The selection set-up carriage is designated generally 211 (Fig. 7) and comprises a respective left and right pair of spaced-apart frame plates 212 and 213 (Figs. 6, 7, and 9) which are secured together by respective end brackets 214 and 215 (Fig. 9) to form an elongated rectangular carriage. The frame plates 212 and 213 (Fig. 6) are apertured to receive the respective shafts 150 through 159. Rollers 208 carried by end bracket 215 at the rear end of the carriage engage a suitably mounted transverse frame rail 209. At its forward end between frame plates 212, 213 the carriage 211 has a collar 206 carrying a pin 206a engaging a worm shaft 207, whereby the selection setting carriage can be shifted transversely of the machine in a manner later described.

Between the frame plates 212 and 213 of the selection set-up carriage 211, there is carried a slide 216 which has elongated openings through which openings extend the shafts 150 through 159. The slide 216 is urged to the left, as viewed in Fig. 6, by a spring 217 extending between the slide and the end bracket 214 of the carriage frame. Also mounted between the respective frame pieces 212 and 213 in adjacent relation to the slide 216 are a series of two fingered setting levers 220 through 229, respectively, representing the values from "0" to "9," and having keys engaging within the keyways of the shafts 150 through 159, respectively. Each of the levers 220 to 229 is operatively related to a respective laterally projecting ear 218 of the slide 216. In this way the slide 216 is actuated to control a one-step escapement of the carriage, as described later, each time one of the shafts 150 to 159 is operated by depression of a key 110 through 119, respectively, at the same time that a value is set by one of the aforementioned pawls 220—229.

To control entry of values into the series of dials 231, comprising the factor indicator 102, in accordance with the value of the depressed key, each dail 231 (Fig. 5) carries a gear 232 which meshes with a segment 233 carried at the upper end of a lever 234 pivotally mounted on a cross shaft 236. At its lower end, the lever 234 is slotted for pivoted connection with a pair of connected stop slides 237 and 237a (Figs. 5, 7, and 9). Slides 237 and 237a are riveted together for movement of the slides as a unit. The slides are supported by similar shafts 266 extending through slots formed in either end of the slides. Suitable spacers on shafts 266 align the slides 237 and 237a in their respective ordinal positions.

The slides are each urged rearwardly of the machine by a spring 238 (Fig. 5), but are normally restrained against such rearward movement. Each pair of slides 237—237a has a pin and slot connection with an arm 239 which is keyed for limited pivotal movement on the shaft 240 and which arm normally is latched against such movement by a latch 242 engaging ear 241 of said arm.

Latch 242 is pivoted at 243, and is urged counter-clockwise by a torsion spring 244 fastened to an ear of the latch pawl 242 and to an ear of a latch tripping lever 245 respectively. As the selection set-up carriage becomes effective relative to a given order the upper end of the tripping lever 245 for the check dial mechanism becomes aligned with an ear 246 of the slide 216.

When slide 216 moves rearwardly in response to depression of a value key 110—119, ear 246 engages the trip lever 245 and rocks it clockwise. An ear on the trip lever 245 engages and carries with it the latch 242 so as to release the slides 237—237a related to that order.

Trip lever 245 is yieldably held in either of its two positions by the engagement of the detent spring 247 with respective depressions in a latch ear 248 formed on the lower end of the tripping lever 245.

At the same time that the check dial stop slide 237—237a of an order is released by operation of one of the setting levers 220 to 229 (Fig. 6), the lower end of the actuated setting lever engages the ear 291 of one of an aligned series of blocking interponents 250—259 and rocks the interponent having a value corresponding to the value of the actuated setting lever. In this way a laterally extending ear 261 of the operative interponent is placed in the path of the related differential stop projection 262 of the slide structure 237—237a. The series of stop projections 262 (Fig. 5) from "0" to "9" are placed alternately on stop slides 237 and 237a and, correspondingly, the cooperating ears of the interponents 250 to 259 project alternately in opposite directions for cooperation therewith.

The interponents 250 to 259 (Fig. 6) are pivotally mounted on shafts 832 extending transversely of the machine. Each ordinal series of interponents lies adjacent the depending portion of a respective ordinal angle bar 283 suitably secured to cross frame members of the machine. The depending portion of bar 283 is apertured to receive shafts 832 while the horizontal portion thereof has slots cut therein to receive the upper arm of the interponents 250 to 259. The interponents are held in either adjusted position thereof by suitable friction discs 287 mounted on shaft 286 between the respective interponents and the spacers 288 (Fig. 7) which are provided to maintain proper ordinal alignment of the interponents.

Associated with each ordinal series of interponents 250—259 is a channel shaped control slide 260 (Fig. 6) having slots cut therein to receive the interponents and being mounted for endwise sliding movement on the angle bar 283. The slots cut in slide 260 are of sufficient length to permit the operation of the slide by any of the operated interponents 250—259 without moving any of the remainder of the interponents. The control slide is held in either its normal rearward or forwardly adjusted position by a spring detent not shown.

From the foregoing description it will be apparent that rocking of any of the setting levers 220 through 229 is operative to enter the corresponding value in the aligned order of the check dial indicator 102.

As will be later explained, the operation of these setting levers 220 through 229 is also effective with respect to the selection storing carriage to enter a value in the aligned order of this carriage.

*Escapement shift*

The single order selection set-up carriage 211 normally is in its leftmost position in which position it cooperates with the leftmost order of the indicator 102. When a value key 110—119 is depressed the selected value is entered into the aligned order of indicator 102 and the carriage escapes one order to the right. In this way by depressing any eight numeral keys 110—119 an eight digit number may be entered into the left factor indicator 102.

The operation of one of the setting levers 220 through 229 is effective to cause escapement of the single order selection set-up carriage 211 one order to the right from its leftmost initial position. For this purpose actuation of slide 216 is effective with respect to a conventional form of escapement mechanism to cause shifting of the set-up carriage frame. An escapement pawl 271 (Fig. 6) carried by slide 216 and a downwardly projecting ear 272 of slide 216 both cooperate with an escapement rack 273 carried by arms 275 (Figs. 5 and 6).

Escapement pawl 271 (Fig. 6) is freely mounted on a stud carried by slide 216. A torsion spring 219 urges pawl 271 clockwise into engagement with a respective tooth 274 of rack 273. An upper extension of pawl 271 engages a pin 210 extending on either side of slide 216 and which pin also serves as a connection between the previously mentioned spring 217 and said slide. Pawl 271 normally lies against pin 210 during rightward movement of slide 216 and escapement of the selection set-up carriage to the right as viewed in Figs. 9 and 10, but as explained more fully hereinafter, the pawl moves counter-clockwise away from pin 210 against the urgency of spring 219 during restoration of the selection setting carriage to its leftmost position.

Rack 273 (Fig. 6) has a series of teeth 274 for cooperation with the pawl 271 and an opposite series of teeth 276 for cooperation with the ear 272. The selection set-up carriage is driven to effect the escapement shift by means of the engagement of its collar 206 with a spring driven worm shaft 207. At its right end as seen in Fig. 10, worm shaft 207 is connected to a spring mechanism 281 which is normally under tension to drive the worm shaft in a direction to advance the selection setting carriage to the right as viewed in Figs. 9 and 10. The tensioning of the spring mechanism 281 is explained hereinafter.

When slide 216 (Fig. 6) is moved to the right by one of the setting levers 221—229, the pawl 271 moves out of engagement with an associated tooth 274 of rack 273 and the escapement ear 272 of slide 216 moves into the path of the next adjacent tooth 276 of rack 273. The movement of pawl 271 out of engagement with tooth 274 releases the selection setting carriage 211 to advance a portion of its full ordinal step as limited by the engagement of escapement ear 272 with tooth 276. This advance of carriage 211 permits the pawl 271 to move to the right of the tooth 274 (Fig. 9) with which it was engaged so that when the slide 216 is released by release of the operated key of the keyboard, the slide 216 and pawl 271 can snap back under the influence of spring 217 into a position to engage the next tooth 274 before the escapement ear 272 is disengaged from its cooperating tooth 276. In this way, upon release of the key controlling the set-up train, the remaining fractional part of the escapement of the selection setting carriage is effected and the carriage is in alignment with the next lower order of both the factor indicator mechanism and the selection storing carriage.

*Selection storing carriage*

As previously stated, the values entered in the check dial indicator 102 by the selection setting carriage are also entered into a plural order shiftable selection storing carriage indicated generally at 301 in Figs. 5, 6, 7, and 9. The selection storing carriage 301 includes in general a plurality of orders corresponding to the number of desired total orders of the first factor of a calculation and comprising in each order ten settable blocking levers 310—319 representing the values from "0" to "9," respectively. Each order or row of these levers is adapted to cooperate with an aligned row of selectively settable clutch engaging fingers 411 (Fig. 7) of the actuating mechanism as later described.

The actuating mechanism is capable of retaining a given factor as entered therein by the selection storing carriage, and by virtue of this fact, the selection storing carriage, after such an entering operation in one ordinal position with respect to the numeral wheel actuating machanism is free for ordinal shifting to another desired position while the actuation means is carrying out its function of entering values into the accumulator register 100.

In the present instance, the selection storing carriage 301 (Fig. 6) includes a frame comprising a front transverse frame bar 302 and a rear transverse sleeve 303 mounted on a worm shaft 308.

Worm shaft 308 (Figs. 9 & 10) extends transversely of the machine and is mounted for free rotation is respective bearings 309 carried by side frame plates 162 and 164. The front transverse bar 302 and the rear transverse sleeve 303 are connected by a plurality of members 304. Members 304 (Fig. 6) are generally channel shaped except at their rearward ends where the flanges terminate and the members are formed as the flat vertical extensions 304*a*. Extensions 304*a* are mounted on sleeve 303 and are maintained in ordinal alignment as seen in Fig. 9 by the spacers 303*a*. At their forward ends members 304 are riveted to front transverse bar 302 (Fig. 6). The latter is supported by two pairs of rollers 306 which embrace either side of the horizontal portion of an angle bar 307 suitably mounted on the side frame plates 162 and 164 and extending transversely of the machine.

The aforementioned transverse sleeve 303 has driving connection with worm shaft 308 by means of a pin 303*b* carried by the sleeve and extending into the worm shaft keyway. The selection storing carriage is shifted from order to order when the worm shaft is rotated by a shift clutch described hereinafter.

Each of the frame channels 304 (Figs. 6, 7, and 9) carries an ordinal series of settable blocking levers 310 to 319, respectively, the representing the values from "0" to "9." The "0" blocking lever 310 is normally in upright position as shown in Figs. 6 which is its operative position as will later appear. The levers 311 through 319 representing the values from "1" to "9" are normally in inoperative position, as seen in Fig. 6, as will also later appear. Each of the levers 311 through 319 of an ordinal series is provided with a lower arm carrying a lateral ear 321 lying in the path of the top arm of the respective setting levers 221 through 229, respectively, so that upon rocking movement of one of the selection setting levers, one of the blocking levers 311 through 319 of the aligned ordinal series will be rocked counterclockwise as viewed in Fig. 6, to place its upper arm in upright or active position.

It will be recalled that clockwise movement of a setting lever 220—229 not only effects setting of an associated blocking lever 311—319 and an associated blocking interponent 220—229 but also causes release of the selection set-up carriage 211 to advance or escape the first portion of its full ordinal step; therefore, the ears 321 and 291 of the blocking levers and the blocking interponents, respectively, have been made of sufficient length to remain in contact with the arms of the operated setting lever during such portion of advance of the lever and thereby insure the complete setting of the aforementioned blocking lever and blocking interponent even though the levers 220—229 are escaped during such setting.

The blocking levers 310—319 are held in either of their two positions by respective friction discs 323 (Fig. 7) mounted adjacent each pawl.

Associated with the blocking levers 310 through 319 (Figs. 5, 6, 7, and 9) is a control slide 322 mounted for endwise sliding movement on the associated frame channel 304 and adapted to remain in either its normal rearward position or in a forward adjusted end position. The slide 322 has a slotted portion engaging each of the pawls 310 through 319. The slot engaging the lever 310 is of limited length so that the lever 310 must in all cases follow the movement of the slide 322 when it is actuated by one of the levers 311 through 319. However, the slot for each of the levers 311—319 is of sufficient length that any one of these levers can be operated without affecting the position of the others.

From the foregoing description, it will appear that the various orders of the selection storing carriage 301 can be set to the desired values from the highest through the lower orders thereof by operation of the selection set-up carriage under control of the value keys 110 through 119, respectively. The control exerted by the selection storing carriage over the numeral wheel actuating means is described in a later section of the specification.

NUMERAL WHEEL ACTUATING MECHANISM

In general, the numeral wheel actuating mechanism comprises ordinal rows of selective clutch controlled gear drives by means of which the values from "1" to "9" may be selectively entered in the respective orders of the accumulator or product register 100 in accordance with the value of the factor set into the selection storing carriage. The number of cycles of entry into the accumulator is controlled in a manner later described. The actuating means has the same number of orders as the number of orders in the register 100 with the exception that one or two overflow dials or numeral wheels may be provided on the left side of the register. This arrangement enables selective operation of the actuating means in any ordinally shifted position of the plural order selection storing carriage previously described.

To provide a differential drive for each of the values "0" to "9," the actuating means is provided with a fixed or "0" shaft 350 and a series of differential operable drive shafts 351 through 359 (Figs. 6 and 20) which are journaled by suitable bearings in frame plates 361 and 164 of the machine. At their left ends the shafts 351 through 359 (Fig. 20) are interconnected by a gear train for simultaneous rotation including the gear 364 on shaft 351, the gears 365 and 366 on shaft 352, a gear 367 on drive transmitting idler shaft 368, and later referred to, the gears 369 and 370 on the shaft 353, gears 371 and 372 on the shaft 354, the gears 373 and 374 on the shaft 355, the gears 375 and 376 on the shaft 356, the gears 377 and 378 on the shaft 357, the gears 379 and 380 on the shaft 358, and the gears 381 and 382 on the shaft 359. The gear 381 of the shaft 359 meshes with an idler gear 383 (Fig. 11) journaled on a transverse shaft 384 referred to hereinafter in connection with the clear drive. The gear 383 meshes with the gear 536 which is driven from the main clutch in a manner later described, to provide a reversible cyclic drive for the gear train referred to above. The gear train is such that a proportional movement is provided to the respective shafts 351 through 359 in ratios according to the values "1" to "9" so that when one of these drives is transmitted, in a manner later described, to an aligned numeral wheel of the register 100 there will be produced from .1 to .9 rotation of that numeral wheel in accordance with the digital value to be entered in that order.

The gears of the gear train 364 to 383 (Fig. 20) are provided with a suitable number of teeth each to drive the shafts 351 to 359 in the proportional amounts mentioned above. In the present invention shaft 357 is driven one complete revolution in order to advance a given accumulator numeral wheel 0.7 of a revolution. Shaft 357 has been selected to be driven a complete revolution during each cycle of the actuating means in order that this shaft may also be used as a part of a cyclic control for the multiplier mechanism. Any other suitable drive arrangements for the shafts 351 to 359 could be provided, however, were the control for said multiplying mechanism taken from one of the other shafts, in which case the drive train from the shafts 351 to 359 to the numeral wheels could be correspondingly altered to permit the same amount of advance of a numeral wheel as described above.

The shafts 350 through 359 extend transversely of the machine through all the orders of the actuating mechanism and in each order each shaft has associated therewith a selective drive connection for controlling transmission of the differential drive to the respective aligned order of the accumulator. For this purpose, in each order of the actuating means there is provided for each of the shafts 350 through 359 a numeral value clutch designated generally at 400 (Fig. 7) which is engaged under the control of the selection storing carriage 301. With regard to the fixed shaft 350, the "0" value clutch serves as a lock for the gear train 390—399.

Those orders of the numeral wheel actuating mechanism which are not under the control of the selection storing carriage 301 will have none of their respective clutches 407—408 engaged, and in order to prevent rotation of the gears 390 to 399 in response to the frictional drag of the respective shafts 351—359 during rotation thereof, friction clutches elements 388 (Fig. 20) are provided which normally prevent the gear train 390—399 from rotating. Those orders of the numeral wheel actuating mechanism which are under the control of the selection storing carriage 301 will have their associated gears 390—399 driven against the drag of these aforementioned frictional clutches.

Referring to Figs. 6 and 7, each order of the actuating mechanism is provided with a series of idler gears 390 through 399 which mesh with each other and a drive receiving gear 401 (Fig. 5 and 6) journaled on a control shaft 402.

These idler gears 390—399 are journaled on the respective shafts 350—359 and are held in the desired lateral position on the shafts 350 to 359 by a channel 403 (Figs. 6 and 7) in each order extending between respective front and rear supporting brackets 404 and 406. The channels 403 in each order receive the lower portions of a respective series of gears 390 through 399. Each of the gears 390 through 399 carries a single tooth clutch element 407 (Fig. 7) for engagement with a multi-toothed clutch element 408 including a drive collar 409 slidably keyed on the associated shaft of the shaft series 350 through 359 to be driven thereby. The series of collars 409 in each order is engaged by a corresponding series of clutch engaging forks 410 through 419, respectively, (Figs. 6 and 7) corresponding to the values "0" to "9." Each ordinal series of clutch engaging forks 410 to 419 is pivotally mounted on a respective shaft 421 extending between the cross bars 422 (Figs. 6 and 20) of a rectangular numeral clutch engaging frame indicated generally at 420 and which bars 422 are connected by side frame members 423 (Fig. 7 and 20). A plurality of intermediate cross pieces 425 extend between side members 423. The respective forward and rearward bent ends 422$a$ of the bars 422 have pivotal connections to respective parallel supporting arms 424 (Figs. 7 and 20) which are generally horizontally disposed with reference to their support shafts 725 and 428 so that substantially vertical movement of the frame 420 can be obtained by pivotal movement of the supporting arms 424; thus, the clutch engaging frame and the entire rectangular arrangement of clutch engaging forks 410 through 419 carried thereby is adapted to be dipped vertically.

As seen in Fig. 7, the collar embracing portions 411$a$ of these forks are disposed above the axis of the associated actuator shafts 350—359 so that cooperative relation between the forks 410—419 and their respective shiftable clutch elements 408 is maintained in either the normal or dipped position of the forks. Each of the forks 410 through 419 has a laterally extending ear carrying a stud 426 which is associated with a bent retaining spring 427 (Fig. 8) on the adjacent cross piece 425 so that each fork and its respective numeral value clutch is resiliently held in either adjusted position thereof.

From an inspection of Figs. 6 and 7, it will be apparent that if the clutch engaging frame 420 is dipped and one of the blocking levers 310 through 319 aligned therewith is in upright position, the aligned fork 411, for example, will be rocked clockwise from the position shown in Fig. 7, to engage its respective shiftable clutch element 408 with the aligned clutch element 407 of the gear train 391 through 399 so that the selected differential drive will be transmitted to the gear 401 (Fig. 6) of this order and, as later described, to the aligned order of the register or accumulator 100 during each cycle of operation of the main clutch.

The dipping of the clutch engaging frame 420 is effected at the beginning of each operation of the machine by the setting clutch in a manner later described.

In order to provide for automatic restoration of any engaged numeral value clutches 400 to disengaged position after a desired ordinal entry into the accumulator is completed, and to enable simultaneous entry of another set of values into the various orders of the actuating means, a clutch disengaging means is provided and which means is operable under control of the setting clutch for operation thereof simultaneous with the dipping of the clutch engaging frame 420. This clutch disengaging means comprises a rectangular array or grid of ordinally arranged clutch disengaging fingers carried by a frame designed generally at 430 (Fig. 7) including respective end frame members 431—432 (Figs. 7 and 20) which are connected by a plurality of channel frame members 433 in alignment with each of the actuator shafts 350 through 359. Each channel member 433 carries a series of pivotally mounted fingers 436 each of which has a depending nose 436$a$ extending through a slotted portion of the associated channel 433 for cooperation with the aligned slidably mounted clutch member 408 (Fig. 7). The horizontal arm of each finger 436 is connected to a spring 437 which holds the associated finger 436 in the position illustrated and resists counter-clockwise movement of the same.

The leftmost finger 436 as seen in Fig. 7 is associated with a collar 881 which is a part of the multiplier control mechanism, described later, and is not to be confused with similar fingers 436 cooperating with the clutches 400; however, the general outline of the leftmost finger 436 is the same as that of the other above-mentioned fingers 436, and its operation of restoring a multiplier control collar is similar to that of the drive disengaging fingers for the clutches 400 as is explained more fully hereinafter.

The clutch disengaging frame 430 is carried by four upright arms 438, two of which are shown in Fig. 7. The two lefthand arms 438 (Fig. 20) are pivoted in a suitable manner on stub shafts 439, while the two right-hand arms 438 are secured on a shaft 441 the rocking of which operates the clutch disengaging grid. Thus, the clutch disengaging frame 430 is capable of movement generally axially of the drive shafts 350 through 359, and specifically this frame is moved to the left and then back to the right as viewed in Fig. 7 at the beginning of each calculating operation under control of the setting clutch as later described. Normally, the depending noses 436a of the fingers 436 are in their rightmost position as shown in Fig. 7 out of engagement with the respective shiftable clutch elements 408 which may be engaged with the teeth 407 of the gears 391 through 399. Upon operation of the setting clutch these fingers are moved to the left as viewed in Fig. 7 to disengage any engaged clutches 400. During such leftward movement, however, the clutch engaging frame 420 starts to dip to engage the clutches 400 for the next ordinal actuating operation. In this way any drive connection which has been previously employed in a calculating operation and which is not a part of the new setting to be entered in the actuator will be restored to inactive position by the associated disengaging finger 436. On the other hand, in any case where a clutch engaging fork 410—419 has been engaged by one of the blocking levers 310 through 319, the engaging fork will hold its associated clutch elements 407, 408 engaged and the disengaging finger pawl will yield as permitted by the slot in the associated channel 433.

The timing of the operation of the two frames 430, 420 is such that the drive disengaging frame 430 will have completed its return to normal rightward position before frame 420 starts to rise out of its dipped clutch engaging position. Such return of frame 430 before frame 420 starts to rise is necessary to insure that the new setting of clutches 400 will not be affected by the disengaging fingers 436 during the current setting clutch cycle.

From the above description it will be apparent that the provision of the same or substantially the same number of orders in the actuating mechanism as in the accumulator together with the provision of a multiple order selection storing carriage which can be used to enter a multiple order factor in various relative ordinal positions of the selectively settable numeral wheel actuating means enables the setting of a factor into said actuating means by the selection storing carriage previous to a given number of cycles of operation of the numeral wheel actuating means.

After such a factor setting operation and during the operation of the actuating means the selection storing carriage is shifted to the next order of the actuating means with the values previously entered into the actuating means being maintained. In this way a substantial saving in the over-all operating time of the machine in performing a calculation is effected.

ACCUMULATOR OR PRODUCT REGISTER

The register 100 may be of any desired conventional construction but in the present machine it is preferred to employ a register of the general duplexing type such as that disclosed in a Patent No. 2,221,164, issued to Harold T. Avery, November 19, 1940, wherein the tens carrying operation is performed simultaneously with the digitation operation by means of a "crawl" type tens carrying mechanism. Partial tens carry is backed out of the numeral wheels upon completion of digitation by means of a "correction at entry" mechanism such as that disclosed in a Patent No. 2,089,682, issued August 10, 1937 to Geo. C. Chase.

Referring to Figs. 5, 7 and 7a the register 100 includes an ordinal series of dial members or numeral wheels 461 journaled on a transverse shaft 462 and each dial 461 is connected to a respective gear 463 also on the shaft 462. A centralizer pawl 467 (Fig. 5) is keyed for limited pivotal movement on a transverse shaft 468 and is normally spring-urged into engagement with the gear 463 but is disengaged therefrom during digitation operation in a manner later described.

Each numeral wheel and gear 463 (Fig. 7a) is advanced by a planetary gear drive, the three legs of which may be termed as follows: (1) digitation input leg, (2) the tens carry input leg, and (3) "output" or "summation" leg. The digitation input leg is gear 476 which is driven through idler gears by gear 401. The latter gear is driven by the differentially driven series of gears 390—399 (Fig. 5). The tens carry input leg is gear 473 (Fig. 7a) which is integral with gear 473c. The latter is driven by gear 472 integral with idler gear 464 of the next lower order. The "output" leg is gear 482b which is driven by amounts representative of a summation of both digitation and tens carry. Gear 482b is integral with gear 482a, the latter gear driving numeral wheel gear 463 through idler 464.

The crawl carry mechanism is of conventional type and further description is not believed necessary.

In order that the numeral wheels 231 will be properly aligned with the sight openings in the cover of the machine upon the completion of numeral wheel digitation, the partial tens carry transmitted between adjacent numeral wheels is backed out by a "correction at entry" type of compensation mechanism.

With this type of tens carry compensation mechanism the partial tens transfer between adjacent dials is backed out by means responsive to the position of snail cams 482 integral with respective summation gears 482b of the next lower order, the amount of rotation of each snail cam being indicative of the value standing in its related numeral wheel. A snail cam follower or "compensator arm" 483 (Fig. 5) has a hub carrying an arm 483a which arm serves as a support for two idler gears between gear 401 and digitation input gear 476 of the next higher order. At the conclusion of a digitation operation the compensation arms 483 move into engagement with respective snail cams 482, and at the same time arms 483a "walk" the two idler gears about the gear 401, such "walking" causing both the digitation input gear 476 and the summation gear 482b of the next higher order to be backed up by an amount equal to the partial tens carry transmitted to the summation gear during digitation. This form of compensation at entry is conventional and further description is believed unnecessary.

The compensator arm 483 of each order is keyed on the shaft 402 with a limited amount of relative movement with respect thereto so that the arm normally can follow the snail cam without restraint but can be rocked out of engagement with the snail cam by shaft 402 during actual calculating operations in the usual manner in this type of accumulator. At the same time that the compensator arms are rocked out the centralizer pawls 467 are also moved to inactive position.

To effect movement of the compensator arms to inactive position, the shaft 402 (Fig. 23) carries an arm 484 keyed thereto and pivoted to a link 485 having a slotted connection with a lever 486 secured on shaft 468 for the centralizer pawls 467. The arm 484 is also connected to a link 487 (Figs. 23 and 27) provided with a forked end, one branch of which has a slotted connection with a cam follower 488. The follower 488 is journaled at 489 and is urged counter-clockwise by a spring 490 to engage a cam 618 operated by the setting clutch as described hereinafter.

When the centralizer pawls 467 and the compensator arms 483 are rocked to inactive position by cam 618, a latch becomes effective which maintains the pawls and the arms in inactive position during operation of the main clutch. For this purpose, the cam follower 488 (Fig. 23) has a latch ear 488*a* for cooperation with a latch lever 491 pivoted at 492 and urged counter-clockwise by a spring 493. The latch lever 491 normally is restrained from latching engagement with the latch ear 488*a* by an arm 494 on the rock shaft 508 for the main clutch dog 516. A pin 491*a* on the latch lever 491 is engaged by arm 494 so that the latch lever 491 can move to active position only when the shaft 508 is rocked to engage the main clutch as more fully explained hereinafter.

In this manner the compensator arms and the centralizer pawls are rocked to their respective inoperative positions by the setting clutch prior to numeral wheel actuation, and are latched in inoperative position until the main clutch is disengaged and digitation is completed at which time the compensator arms are released to back out partial tens carry as described above and the centralizer pawls are released to centralize the numeral wheels.

MOTOR DRIVE MECHANISM

In general, the drive mechanism of the present machine includes an electric motor from which four separate drive trains are provided through a setting clutch, a main clutch, a shift clutch and clear clutch to respective mechanism driven by these clutches. Enabling of these different clutches under control of various manual and automatic means will be described later in connection with mechanisms which exercise control over the respective clutches.

*Main Clutch*

The electric motor drive shaft 502 (Figs. 5 and 11) is connected by reducing gearing 503 to an idler drive shaft 504. The shaft 504 also carries a gear 506 which meshes with an idler gear 507 freely journaled on a control shaft 508 and enmeshed with a gear 509 on a main tubular drive shaft or sleeve 511 which provides the drive to the main clutch. Sleeve 511 is freely mounted on shaft 521 and is suitably supported within bearings in side plates of the machine. As seen in Fig. 18, the sleeve 511 carries a ratchet 512 keyed thereto and which is adapted for engagement by either of a pair of spring-urged clutch pawls 513 pivoted on a driven disc 514 of the main clutch 515 to provide a cyclic half-revolution clutch under control of a clutch control dog 516 pinned to the control shaft 508 previously referred to.

When the clutch dog 516 is rocked clockwise as viewed in Fig. 18 out of engagement with the clutch pawls 513 the latter respond to respective torsion springs and rock clockwise into engagement with the ratchet 512 so that a drive is transmitted from the drive sleeve 511 to the driven disc 514. The shaft 521 upon which disc 514 is secured is driven for one or more cycles or half-revolutions of the shaft 521 as controlled by the clutch dog 516. The clutch dog 516 is provided with a depending portion 517 which closes switch 518 of the motor circuit and opens switch 519 to prevent re-engagement of the setting clutch, as described hereinafter, when the clutch dog 516 is moved to clutch engaging position.

*Main reversing mechanism*

The shaft 521 which is driven cyclically by the main clutch, carries a wide gear 522 (Figs. 5 and 11) which meshes with a gear 523 having its hub journaled on an endwise shiftable reversing control shaft 524 (Figs. 13 and 14) and also meshes with a gear 526 (Figs. 11 and 13) having its hub journaled on a stub shaft 527 (Fig. 13). The hub of the gear 526 carries a gear 528 meshing with a gear 529 also having its hub journaled on the control shaft 524. The gears 523 and 529 have the same number of teeth as wide gear 522. This gearing forms part of a reversing control for the main actuator drive. It will be apparent from the above gearing arrangement that the gears 523 and 529 rotate oppositely on the control shaft 524 one-half revolution for each one-half revolution of the main clutch. The respective hubs of the gears 523, and 529 have drive notches 531 cut therein for cooperation with a pin 532 carried by the reversing control shaft 524. Pin 532 (Fig. 13) transmits the drive either from the gear 529 to the shaft 524 or from the gear 523 to the shaft 524. The shaft, in turn transmits the drive to gear 536 slidably keyed to shaft 524 (Fig. 14).

Gear 536 (Fig. 13) meshes with gear 383 of the gear train to the main actuator drive previously referred to and shown in Figs. 11, 13, and 20.

The endwise shifting of the shaft 524 to effect engagement of pin 532 with one of the reverse gears 523 or 529 is under control of a main reverse solenoid 533 (Fig. 14) having its armature 534 overlying a lever 535, through which lever the solenoid, when energized, controls the leftward endwise displacement of shaft 524.

As will be later described, the shaft 524 also serves as the drive shaft for the revolutions counter actuator.

*Shift clutch*

The shift clutch is of the same detailed construction as the main clutch described hereinbefore and operates to effect ordinal shifting movement of some of the component parts of the machine including the selection storing carriage and an ordinal control interponent of the revolutions counter, as well as various elements of the multiplier and division mechanisms. Also, the operation of the shift clutch energizes a spring drive for returning these elements to their respective initial positions during normalizing or clearing of the machine.

The drive from the motor for the shift clutch is obtained from a gear 541 (Figs. 31, 32, and 36) keyed to the main drive sleeve 511. The gear 541 meshes with a gear 542 carried by a hub 543 journaled on a stub shaft 544. The hub 543 carries a second gear 546 (Fig. 32) which meshes with a gear 547 secured on a hub 548 journaled on the shaft 521 (see also Fig. 36). The hub 548 carries the drive ratchet 549 of the shift clutch 550 by means of which a drive can be transmitted through the clutch pawls 551 to the driven disc 552 of the shift clutch. The drive disc 552 is carried by a sleeve 553 which is journaled in a bearing in the side frame plate 164 and said sleeve also carries a gear 554. The gear 554 transmits a cyclic shift drive from the shift clutch as will be described later.

The engagement of the shift clutch 550 is under control of a clutch control dog 556 (Fig. 31), secured on the shaft 557 and having an arm operatively related to the armature 558 of the shift control solenoid 559 which is referred to hereinafter. As seen in Fig. 37, clockwise movement of the clutch dog 556 closes a switch 560 of the motor circuit.

The shift drive when enabled is transmitted from the gear 554 (Figs. 32 and 36) to a gear 561 on the shaft 544 the hub of which gear also carries a gear 562 which meshes with a gear 563 keyed to a sleeve 563$a$. The latter is journaled on the shaft 521.

The gear train from the shift clutch to gear 563 is so arranged as to drive the gear 563 (Figs. 32 and 36) one revolution for each half revolution of the shift clutch. Gear 563 forms part of the driven assembly of the shift mechanism which includes a cam 564, a cam 565, a cam 566, and a snail cam 567. The operation of the mechanism in cooperation with the cams 564 through 566 will be described in greater detail hereinafter in conjunction with the associated mechanisms with which they cooperate.

The snail cam 567 forms a part of the general shift drive of the machine, and with its associated mechanism, which will now be described, serves to advance certain of the shiftable parts of the machine one step for each cycle of movement of the shift clutch, and at the same time serves to store power in a spring mechanism which operates in conjunction with the clearing mechanism as later described.

Associated with the snail cam 567 (Figs. 31$a$ and 32) is a spring-urged cam follower 568 carrying a spring-urged ratchet-actuating pawl 569. The pawl 569 forms part of a ratchet drive mechanism including: (1) a ratchet 571 fixed to the shaft 570 and, (2) a bell crank holding pawl 572 for the ratchet. One arm of the bell crank 572 engages the ratchet 571 under the influence of the spring 573, another arm of the bell crank 572 carries a stop pin 572$b$ for the pawl 569, and the third arm of the bell crank carries an ear 572$a$ which is engaged by a lever 1037 of the clear mechanism later described.

In order to transmit the shift drive to the various ordinally shiftable elements of the machine, the ratchet 571 (Fig. 31) is advanced step by step by the actuating pawl 569 upon each cycle of movement of the half-revolution shift clutch.

Each time the ratchet 571 (Fig. 31) is advanced one step by the actuating pawl 569 various ordinally shiftable elements of the machine are shifted one order. These elements include the selection storing carriage 301 (Fig. 5) shiftable by means of worm shaft 309, and a counter actuating means interponent 716 shiftable by means of a worm shaft 718. The shift drive to the worm shaft 308 is transmitted from ratchet 571 by means of the following gear train. The hub of ratchet 571 carries gear 574 (Figs. 31 and 32). Gear 574 meshes with gear 582$a$, the hub of which gear carries gear 582, the two gears being secured to shaft 583. Gear 582 meshes with gear 581, secured to a sleeve 581$a$, which sleeve is freely mounted upon shaft 570. Gear 576 is also carried by sleeve 581$a$ and meshes with idler gear 577. Gear 577 meshes with gear 578 secured to shaft 308 which shaft controls the shifting movement of the selection storing carriage as previously described. Gear 576 also drives idler gear 721 which, in turn, drives gear 722 secured to worm shaft 718, which shaft controls the shifting movement of the counter actuating means interponent 716 (Fig. 32) as is more fully described hereinafter. A clock spring mechanism 584, one element of which is secured to shaft 583, is wound when shaft 583 is rotated.

This clock spring mechanism forms a part of the return drive for the various shifted elements during the clearing operation, as will be described hereinafter.

The drive from the above described pawl and ratchet mechanism is also transmitted through means hereinafter described to effect shifting of the division sensing carriage and the multiplier shift switch.

*Setting clutch*

The operation of the setting clutch effects conditioning of the machine for subsequent operation under control of the main clutch drive. The setting clutch is engaged upon operation of any of the control keys causing digitation operations in the machine. The drive for the setting clutch is taken from the motor driven shaft 504 (Figs. 27 and 29) through a gear train including the gear 601 on the shaft 504, a wide idler gear 602 and a gear 603 journaled on the shaft 604. The hub of gear 603 carries a ratchet 606 (Fig. 30) which forms the driving element of the single revolution setting clutch 600. The driven element of the clutch includes the spring-urged clutch pawl 607 which is controlled by the clutch dog 608 in the usual fashion and which pawl is mounted on a driven disc 609 having a full cycle pawl 611 associated therewith which cooperates with the clutch dog 608 in maintaining the driven element of the clutch in full cycle position. The driven disc 609 of the setting clutch 600 (Figs. 27 and 28) is secured on a sleeve 612 which is journaled on the shaft 604 and which sleeve is provided with a keyway to receive various operating cams including the cams 613, 614, 615, 616, 617, 618, and 619.

The cam 617 (Figs. 27 and 39) is provided with a cam follower 621 which is pinned to the shaft 489. The latter carries a lever 623 (Fig. 37) which overlies an arm 624 carried by the shaft 441. As seen in Fig. 38, clockwise rocking of shaft 441, serves, through arms 438 to move the clutch disengaging frame 430, previously described, so that at the beginning of the setting clutch operation any engaged numeral clutches 400 may be disengaged by fingers 436 as previously explained.

To move or dip the clutch engaging frame 420 during the operational movement of the clutch disengaging frame 430, the cam 616 (Figs. 24 and 27) is provided with a cam follower 626 pinned to a support shaft 428. Shaft 428 extends transversely of the machine and carries two support arms 424 for the clutch engaging frame 420, one of the two arms 424 being shown in Fig. 24. The frame 420 is supported at its forward end by two arms 424a which arms are pinned to similar stub shafts 725. Shafts 725 and shaft 428 have respective depending arms 713a and 713 which are connected by a link 714 provided for parallel dipping of the frame 420 by the arms 424 and 424a upon rocking of the shaft 428 by cam 616. Thus, upon operation of the setting clutch any values previously entered into the selection storing carriage will cause selective engagement of the ordinal clutches 400 as previously described.

The cam 613 (Figs. 23 and 27), also driven by the setting clutch, is provided with a follower 631 pinned to the shaft 508 which carries the main clutch dog 516, so that this cam and cam follower arrangement will engage the main clutch toward the end of the cycle of the setting clutch as will be more apparent hereinafter.

The cam 619 (Figs. 27 and 46) has a follower 627 journaled on a shaft 628 and urged counterclockwise by a spring 649. The follower 627 is adapted to close a switch 630 (Figs. 46 and 58) for the shift clutch solenoid 559 during the cycle of rotation of the setting clutch.

The cam 618 (Figs. 23 and 27) operates the follower 488 therefor to rock the centralizer pawls 467 and the compensator arms 483 of the accumulator to respective inactive positions in which position said pawls and arms are latched during operation of the main clutch as previously described. With regard to the centralizer pawls 467 it will be noted that these pawls are also under the control of the clear clutch as described hereinafter to further rock the pawls 467 to a second rocked position in which position the lower end of the pawl acts as a zero stop during zeroizing of the numeral wheels. The cam 618 is also effective similarly with reference to the centralizer pawls and compensator arms of the revolutions counter as will appear later.

Cam 614 (Fig. 17) and cam 615 (Fig. 16), both of which are driven by the setting clutch through sleeve 612, are used for returning the division control magnet armatures and the multipler control magnet armatures, respectively to their inactive positions as is more fully explained in the descriptions of the division and multiplication mechanisms.

*Clear clutch*

Generally, the clear clutch serves to control or drive various elements of the machine to effect complete normalizing or clearing of the machine as described hereinafter in the description of the clearance mechanism per se.

The drive for the clear clutch includes the gear 636 (Fig. 27) on the shaft 504, the wide idler 637 and a gear 638 journaled on the shaft 604. Gear 638 carries a ratchet 639 (Fig. 28) which is the drive ratchet of a one revolution clear clutch 640 similar to the setting clutch previously described in detail. The drive from the ratchet 639 may be transmitted through a clutch pawl 641 to a driven disc 642 of the clutch and which disc is keyed to the shaft 604. The operation of the clear clutch is controlled by means including a clutch dog 643 (Fig. 26), which is secured to the shaft 644 and carries an insulated extension 646 which is associated with the normally open switch 647 of the motor circuit and a normally closed switch 648 which is in the circuit of a control solenoid 931 for the setting clutch. The clear clutch driven shaft 604 (Fig. 27) carries a plurality of cams including the cams 652, 653, and 654 and also a gear 651 which are associated with various mechanisms described hereinafter. The cam 653 has as its follower the lever 623 (Fig. 37) previously referred to, which operates the clutch-disengaging frame 430 for the numeral wheel actuator clutches and, as explained hereinafter, also operates a clutch disengaging frame for the counter actuator so that these mechanisms are normalized whenever the clear clutch is operated.

The cam 652 (Figs. 25, 27, and 28) cooperates with a cam follower 1012 to restore the numeral wheels of the factor indicators 102 and 103 to zero. Cam 654 (Figs. 27 and 45) cooperates with a cam follower 1041 to effect the rocking of the centralizer pawls 467 to their zero stop position and also to move the compensator arms 483 to inactive position during the clearance operation. The flange gear 651 (Fig. 48) is one element of a gear train, the operation of which by the clear clutch, restores the selection setting carriage to its leftmost position and also re-energizes a spring drive for the escapement shift used with the selection set-up carriage. The operation of the above mentioned gear 651 and cams 652, 653, and 654 will be described in greater detail hereinafter in connection with the respective mechanisms associated therewith.

REVOLUTIONS COUNTER

The revolutions counter disclosed herein as the register 101 is of conventional crawl carry type and with the exception of the specific manner in which the numeral wheels are aligned is generally similar to the accumulator of product register 100.

The register 101 (Fig. 5) includes the numeral wheels or dials 701 each of which is driven through a respective differential gear train indicated generally at 702 by a respective drive gear 703. Each gear 703 (Fig. 38) has a single tooth clutch element 703a similar to the single tooth elements 407 carried by gears 390—399 of the accumulator actuating mechanism. The tooth element 703a cooperates with a multi-tooth clutch element 704 having a forked pawl 706 (Fig. 5) associated therewith and carried in a clutch engaging frame 707. The latter is carried by respective arms 708 on a rock shaft 709. The shaft 709 (Fig. 24) carries a depending arm 711 which is connected by a link 712 to an arm 713a forming part of the control linkage including the typing link 714 of the clutch engaging grid or frame 420 of the accumulator actuator clutches so that the counter actuator engaging frame 707 is operated simultaneously with the accumulator engaging frame.

Associated with the counter frame 707 (Figs. 5 and 24) is a shiftable clutch engaging interponent 716 which has a tooth 717 engaging the thread of a worm shaft 718. The upright position of the interponent 716 is maintained by the engagement of a lateral slotted extension 716a thereof with a suitably mounted angle-shaped guide rail 719. The drive for the worm shaft 718 is effected from the gear 576 (Figs. 31 and 32) of the shift mechanism through the intermediary of gears 721 and 722 so that the counter actuator clutch control or interponent 716 is shifted simultaneously with the rotation of worm shaft 308 and the shifting of the selection storing carriage 301 for the accumulator actuator clutches.

Referring to Figs. 5, 37, and 38 the counter is also provided with a clutch disengaging frame 731 which is carried by respective pairs of parallel support arms 732 and is provided with clutch disengaging fingers 733 similar to the fingers 436 previously described in connection with the accumulator actuator clutches. One of the two pairs of the support arms 732 (Fig. 37) for the counter clutch disengaging frame is fixed to a shaft 736 which also carries arm 625 (Fig. 38) fixed thereto. The latter is connected by a link 734 with an arm 624 fixed to the shaft 441 of the accumulator actuator control so that the counter clutch disengaging frame 731 is operated simultaneously with the clutch disengaging frame of the accumulator actuator.

The drive for the shaft 705 (Fig. 5) which carries the driving clutch elements 704 of the counter actuator is provided through a gear 737 (Figs. 5 and 11) fixed to the shaft 705 and meshing with a gear train including gears 738, 739, and 741 (Fig. 5). The latter gear meshes with gear 742 (Figs. 5, 11 and 13) slidably keyed to an endwise shiftable shaft 743. The shaft 743 is adapted to be selectively driven through either of gears 744 or 745 (Fig. 13) which are journaled for rotation in opposite directions on the hub of the gear 742. The gears 744 and 745 are adapted to be selectively keyed to the shaft 743 by the four-pronged shiftable key 746 carried by the shaft 743. The gear 745 (Fig. 14) is driven directly from control shaft 524 through the wide gear 747 keyed to the hub of gear 536 which is keyed to shaft 524, while the gear 744 (Fig. 13) is driven from the wide gear 747 through the intermediate idler gears 748. From the above described reverse gearing for the counter numeral wheel drive train it will be seen that these wheels may be driven in the same direction or in an opposite direction to that of the accumulator actuator drive depending on whether the counter drive is taken through gear 744 or 745 as determined by the energization of counter reverse solenoid 749 and the shifting of the four pronged drive transmitting key 746. The shifting of the key 746 and the shaft 743 is controlled by a counter reverse magnet 749 having its armature 751 mounted on the shaft 743. The control of the counter reverse solenoid 749 will be described in greater detail hereinafter.

With the provision of the proper gear ratios for the aforementioned gear train to the counter numeral wheels it will be apparent that for each operative cycle of the accumulator actuating means, a single increment or count will be entered either positively or negatively in the order of the revolutions counter in which the shiftable interponent 716 is positioned, i. e., in the proper ordinal relation with respect to the ordinal position of the entry of values into the accumulator by the accumulator actuating means.

Referring to Fig. 23, it will be seen that each dial 701 of the revolutions counter has associated therewith a centralizer and zero stop pawl 755 keyed on a shaft 752. The shaft 752 carries an arm 753 which is connected by a link 754 to the lever 469 of the accumulator centralizer control linkage previously described so that the centralizer pawls of both registers are controlled simultaneously.

As stated hereinbefore, the product and counter registers are generally similar.

Also, as described hereinbefore, the compensator arms 483 of the accumulator register are held away from their cams during all actuating operations and are let in against their cams at the end of such operations to back out the partial carry increments transmitted by the differential gearing between numeral wheels to bring them to full digital display positions. Conversely, the arms 756 of the counter register are let in against their cams during all division operations except the corrective plus stroke so that the numeral wheels will be in their display positions at all times during division except at the time specified, thus enabling the operator to copy the quotient digits as each is displayed on successive numeral wheels.

In order to permit of this difference in the operation of the two similar registers, each counter compensator arm 756 is on the low periphery of its cam while each arm 483 is each on the high of its cam when the numeral wheels of the registers are in their zero positions in which they are shown in Fig. 5. In division the counter numeral wheels rotate clockwise to add the number of subtractive cycles of operation of the accumulator actuator. In this way the roller of arm 756, in effect, rides up the gradual rise of the cam 724, backing out the carry increments concurrently with the entry thereof by the differential gearing between the numeral wheels. When and if a counter numeral wheel passes from 9 to 0, the roller drops from the high to the low of the cam 724 causing a full digital movement of the next higher order numeral wheel.

Since numeral wheel alignment during machine operations in multiplication, addition, and subtraction is immaterial, the arms 756 are held out during these operations and let in at the end thereof in the same way and for the same reasons the accumulator register is so controlled.

The compensator arms 756 of the counter mechanism (referred to above) are keyed to a shaft 757 (Fig. 23). The shaft 757 carries a control arm 758 which is connected by a link 759 to a lever 761 pivoted on shaft 1323 and also pivotally connected to the link 487. The latter link is a part of the control mechanism for the accumulator compensation arms, and in this way, the arms of both registers are controlled simultaneously except in division operations during which time the movement of the counter compensator arms is disabled by mechanism described later.

MULTIPLICATION

In general, the operation of the multiplying mechanism of the present invention involves a differential electrical control over a multi-cyclic latch for holding out the main actuator clutch dog for a given number of cycles of operation of the actuating mechanism. The differential electrical control comprises nine magnets representing the values of one to nine. When the value entry keys 111—119 and the selection set-up carriage are related to the right factor indicator 103, the energization of a given magnet is under the selective control of said keys. Thus, when the machine is adjusted for multiplication, the ten key keyboard is converted in its character from value setting keys to multiplier selection control and start keys.

*Multiplier selection mechanism*

After a multiplicand value has been entered into the selection storing carriage, the multiplication key 123 (Fig. 40) is depressed to shift or escape the selection set-up carriage from operative relation with the selection storing carriage into operative relation with a multiplier selection mechanism. This key 123 operates through an ear 801 to rock a bell crank 802 which is connected by a link 803 with a parallel bell crank 802a associated with the negative multiplication key 124. The link 803 has connected thereto a spring 804 which urges the bell cranks 802 and 802a and the keys 123 and 124 to the position shown in Fig. 40. The link 803 carries an ear 805 which is adapted to engage an arm 807 carried by a shaft 808 which carries the support arms 275 of the escapement rack 273 for the selection setting carriage. The rack 273 is normally held in active position by the spring 809 which urges the arm 807 against a stop pin 811. Upon depression of either of multiplication keys 123 or 124, the escapement rack 273 is lowered out of engagement with the escapement pawl 271 of the selection setting carriage 211 so that this carriage can move to the right through the unset orders of multiplicand selection mechanism until it becomes engaged with the first tooth 274a (Fig. 10) of the rack 273a of the multiplier selection mechanism. The rack 273a is similar to the rack 273 of the multiplicand selection mechanism so that depression of any key 110—119 causes a one order escapement of the selection set-up carriage along this escapement rack 273a.

In the highest order position relative to the multiplier selection mechanism, the set-up carriage 211 is to the right of the multiplicand selection storing carriage 301 so that no setting of the latter will occur during further operation of the selection set-up carriage in setting up the multiplier. Also, the setting levers 220 through 229 (Fig. 15) have their lower ends operatively related to the highest order of the multiplier selection mechanism including blocking interponents 820 through 829 similar to the levers 250 through 259 of the multiplicand selection mechanism.

The interponents 820 through 829 are mounted adjacent respective angle bars 839 similar to the bars 283 of the multiplicand selection mechanism, and associated with each series of interponents is a control slide 837 similar to the control slide 260 described hereinbefore. These interponents 820 through 829 cooperate with the stop slides 831—831a (similar to the differentially settable slides 231—231a previously described) and operate through a similar linkage to set the numeral wheels of the right factor indicator 103.

Also each ordinal series of blocking interponents 820 through 829 (Figs. 7 and 15) carry on their respective pivot shafts 832 each a depending arm 833 of insulating material which has a metal tip 834 adapted to be placed between an associated pair of an ordinal series of spring contacts 840 through 849, respectively. These sets of contacts which are located in each order of the multiplier selection mechanism are shown schematically in Fig. 58. Upon the setting of any multiplier digit, a corresponding pair of contacts of a series 840 through 849, will be closed by the metal tip 834 of the associated multiplier selection arm 833 and this circuit closing is utilized to start the operation cycle of the machine and to select the number of cycles of operation of the machine.

The circuit established by the above described circuit control is utilized to energize the setting clutch solenoid to cause operation of the setting clutch and also to energize a selected corresponding multiplier buss which will control a multiplier magnet to cause adjustment of a multiplier rack 893 (Fig. 18) to a position corresponding to the value of the depressed key. When the multiplier rack is displaced from its normal position, the latch 936 (Fig. 18) is conditioned to engage and hold out the main clutch dog upon the operation thereof regardless of whether the rack be displaced one or nine increments.

Referring to Figs. 7, 9 and 16, there is provided a series of nine multiplier magnets 851 through 859 which are mounted by a bracket 861 on the frame plate 361. The multiplier magnets 851—859 are of the double winding type having both actuating windings 851b—859b (Figs. 16 and 59) and bias windings 851a—859a respectively.

The control of the operation of the multiplier magnets by the circuit connections therefor is shown in Fig. 58. Upon closing of a contact 840 to 849, a circuit is made from one side of the line 911 through a normally closed set of contacts 912 to the commutator strip 913 for the switch arm 914. The switch arm 914 is engaged with one of a series of contacts 916 associated with the ordinal sets of switches 840 through 849 in accordance with the ordinal position of the multiplicand entry as later described. The switches 840 through 849 are associated with the "0" to "9" busses 920 through 929 and each of these "1" to "9" busses is in turn connected with the actuating winding 851b through 859b of the magnets 851 through 859. From these magnets, the circuit is connected through the setting clutch start solenoid 931 (Fig. 29) associated with the clutch dog 608 of the setting clutch. From the magnet 931 (Fig. 58) the circuit continues through normally closed contacts 519 associated with the main clutch dog 516 and normally closed contacts 648 associated with the clear clutch dog 643 to ground.

At the same time that the setting clutch solenoid 931 (Figs. 29 and 58) is energized the setting clutch dog closes a switch 932 which places the bias windings 851a through 859a of the multiplier magnets in circuit so that these are energized while the setting clutch is being operated.

The magnets 851 through 859 (Fig. 16) have respective double ended spring-urged armature levers 871 through 879 associated therewith, and the upper ends of these levers 871 through 879 are normally held in an inoperative position as shown by respective ears 902 on an armature holding slide 901 more fully described hereinafter.

The above described energization of the bias windings 851a—859a creates magnetic fields which hold the armatures associated therewith against the cores of the magnets except the magnet which had its actuation winding selectively energized. In the latter case the energization of the actuating winding neutralizes the effect of energization of the bias winding and when the armature holding slide 901 is moved to the left as described below the armature associated with the neutralized magnet will move counter-clockwise to follow the slide under the urgency of a torsion spring 867.

At its right end, as viewed in Fig. 16, slide 901 has a pin which is embraced by a fork of an arm 903 fixed to shaft 243. The latter carries a second arm 906 having a bifurcated tip engaged with a pin on the bell crank 907 keyed for limited rotation on the shaft 240 and providing a cam follower for the cam 615 (Figs. 16, 27 and 28) operated by the setting clutch. During operation of the setting clutch the slide 901 will be moved to its leftmost position (Fig. 16) and the selected armature 871—879 will move counter-clockwise as described above.

Associated with the armature levers 871 to 879 are a series of setting forks 411*a* to 419*a* (Figs. 7 and 16) carried by the clutch engaging frame 420 of the multiplicand selection mechanism. The forks 411*a* to 419*a* are operative with respect to a series of settable collars 881 through 889 which are free on the shafts 351 through 359 and each collar is held against rotation by slidable engagement of each with a pin 891. The collars 881 through 889 carry respective stop projections 881*a* through 889*a* for engagement with a series of ears 881*b*—889*b* on the control rack 893 (Fig. 18).

Starting with the number "1" stop projection 881*a* and progressing toward the number "9" projection 889*a* the spacing between a given projection 881*a*—889*a* and its respective ear 881*b*—889*b* becomes progressively greater. It will be noted that in some cases a given ear, the "7" ear 887*b*, for example, does not lie adjacent its respective projection 887*a* but lies beyond the next projection 888*a*; therefore, the projections and ears are so arranged as to provide a clearance between a projection of one value with an ear of another value. Alternate projections 881*a*—889*a* are offset vertically as are their respective ears 881*b*—889*b*; thus, ear 887*b* may slide over and past projection 888*a* to be engaged by projection 887*a*, and in all other cases where an interference would otherwise be possible the same provision exists.

The rack 893 is slidable on the shafts 350 through 359, and is urged to the left by a spring 894. The rack is normally held against such movement by a holding pawl 896 carried by the frame 420. The latter carries an ear 895 which, upon dipping of frame 420, withdraws pawl 896 from engagement with rack 893, the arrangement being that frame 420 will have been dipped sufficiently to effect the setting of a stop collar 881—889 before the ear 895 engages the pawl to effect the release of rack 893.

It will be noted that the leftmost series of disengaging fingers 436 (Fig. 7) carried by the clutch disengaging frame 430 will serve upon movement of this frame to restore any set stop collar of the series 881 through 889 in the same manner that the selection for accumulator actuator clutches are restored.

It will be recalled that the operation of the setting clutch causes engagement of the main clutch after the various control functions of the setting clutch are performed, and when the main clutch starts to operate by virtue of the rocking of its clutch dog 516 (Fig. 23) by setting clutch cam 613 as explained hereinbefore, the switch 519 (Figs. 18 and 58) is operated to open the circuit of the setting clutch solenoid. Also, the latch lever 936 (Fig. 18) on the shaft 937 is free to latch the main clutch dog 516 in clutch engaging position. This latching operation can occur because the arm 938 on lever 936 has been able to rock clockwise under the influence of the spring 939 due to the setting of the multiplier control rack 893.

The rack 893 is returned to its normal rightmost position during the operation of the main clutch by means including a feed pawl 897 (Figs. 18 and 19) carried by an arm 898 pivoted on the frame 420 and spring-urged against a cam 899 on the shaft 357. When cam 899 rotates, feed pawl 897 engages successive teeth 897*a* on the multiplier control rack 893 and the latter will be returned step by step to the position shown in Fig. 18, the holding pawl 896 yielding during such return movement. In this connection the geared drive of the actuator shafts 351—359 is such that the shaft 357 carrying the cam 899 is rotated once during each cycle of operation of the accumulator actuating means. When the control rack 893 is returned to the position shown in Fig. 18, it will rock the arms 938 and 936 counter-clockwise to the position shown in Fig. 18 to release the main clutch dog. This release of the main clutch dog occurs during the last cycle or step of movement of the rack 893.

It will be noted that the operation of entering the multiplier digits in the multiplier selection mechanism can proceed independently of the machine operation without affecting the current ordinal multiplication because the multiplier switch arm 914 (Fig. 58) must be advanced one step by the shift clutch before the next ordinal multiplying control circuit can be enabled, as explained hereinafter, and also because the switch 519 of the multiplier magnet control circuit is open while the main clutch is engaged. From the foregoing explanation it will be seen that either the entire multiplier figure can be entered in rapid succession and the machine will multiply by one digit after another, or if there is a delay between entry of digits, the machine will stop at the end of any ordinal multiplication and wait for entry of the next multiplier digit.

As previously stated, the various orders of the multiplier selection mechanism are brought into play sequentially from the highest order through the lowest order, and to effect the sequential control of the various orders of the multiplier control switches or contacts 840 through 849, the switch arm 914 (Figs. 38 and 58) pinned to shaft 570 is operated by the step by step advance of the shift ratchet 571 one step for each ordinal multiplication so that the ordinal series of contacts 840 through 849 become effective from the highest through the lowest orders.

Referring again to Fig. 58, it will be noted that the "0" bus 920 is connected through the shift clutch control solenoid 559 to ground so that any time a "0" multiplier setting becomes effective an automatic operation of the shift mechanism is determined.

MULTIPLICATION OPERATION

In conditioning the machine for a multiplying operation, the first step is to enter the multiplicand into the selection storing carriage 301 which will be briefly reviewed. At the beginning of an operation the selection storing carriage is in its leftmost position, as illustrated in Fig. 7, and the selection set-up carriage 211 is also in its leftmost position in alignment with the highest order of the selection storing carriage.

The multiplicand is entered by depression of the appropriate keys 110—119 (Fig. 1) of the keyboard and as the first key is depressed the appropriate setting lever 220—229 (Fig. 6) of the selection set-up carriage is operated to set the associated blocking lever 311—319 in the aligned order of the selection storing carriage to active position. Also, the active lever of the series 220—229 will move the associated blocking interponent of the series 250—259 (Figs. 6 and 7) into position to act as a stop for the factor indicator setting slide 237—237*a*. At the same time, the movement of the slide 216 by one of the levers 220 to 229 on the selection setting carriage will be effective to release the indicator setting slide 237—237a and also to cause a one-step escapement of the selection set-up carriage to the right so that the set-up carriage will be aligned with the second highest order of the selection storing carriage. If the "0" key 110 is operated, the zero setting of the aligned order of the selection storing carriage 301 is unchanged, and the selection set-up carriage is shifted to the next order. In this connection, it may be noted that suitable full stroke mechanism may be employed in connection with the keys 110—119 so that the functions of these keys to set one of the blocking levers 310—319 and an interponent 250—259 must all be completed after initial depression of the keys has started. The above sequence of operations occur in each ordinal position of the selection set-up carriage until the various ordinal values of the multiplicand are represented in the selection storing carriage by the adjusted positions of the respective series of blocking levers 310—319 in the various orders, and the multiplicand is displayed in the left factor indicator 102.

After the multiplicand has been entered in the selection storing carriage, as described above, multiply key 123 (Fig. 1) is operated to rock the support arms 275 (Figs. 5 and 40) for the selection set-up carriage escapement rack 273 so that the selection set-up carriage is free to escape to the right through any unset orders of the selection storing carriage and stop in the highest order position of the multiplier selection mechanism where it engages the highest order tooth of the fixed escapement rack 273a (Figs. 7 and 10).

It is to be noted that the entire multiplier setting mechanism as seen in Fig. 7 (and with particular reference to the rightmost pair of multiplicand stop slides 237—237a and the leftmost pair of multiplier stop slides 831—831a) is spaced 1½ ordinal increments to the right of the multiplicand setting mechanism. This spacing between the multiplicand factor setting mechanism and the multiplier factor setting mechanism is provided so that even though an operator holds a multiplier entry key 110—119 in depressed position, thus preventing the full escapement of the selection carriage 211 to the next lower order of the multiplier mechanism, no interference can result between that carriage and the selection storing carriage 301 when the latter is automatically shifted to the next adjacent lower order during numeral wheel actuation.

The internal controls for the numeral wheels of the right factor indicator 103 have been off-set one-half an order to the left to afford alignment thereof with registers 100 and 101 (Fig. 1).

It is also to be noted that as seen in Fig. 7 the selection set-up carriage 211, after effecting the entry of the eighth multiplier value, escapes to a blank position in which it is ineffective to interfere with the selection storing carriage when the latter is shifted during actuation in the eighth order. The relative positions of the setting lever 221 and the ear 321 of lowest order blocking lever at the termination of an eight factor multiplying operation are indicated in dotted lines at the extreme right of Fig. 7.

The extra-ordinal spacing between the multiplicand setting mechanism and the multiplier setting mechanism does not effect the ordinal spacing of the various elements in the selection storing carriage 301, the clutch engaging frame 420, the clutches 400 and the gear trains to the accumulator. In this manner the same ordinal spacing is provided between adjacent orders of the accumulator 100 as seen in Figs. 1 and 7.

Fig. 60 is a timing chart illustrating the sequence of operation of various mechanisms as caused by the sequential depression of multiplier keys 111, 110 and 111 representing a multiplier value of 101. The depression of a key is indicated in solid lines as at 591 of line 1, and the release of a key is indicated by dotted lines as at 591a of line 1.

It will be noted that the multiplier keys 111, 110 and 111, are depressed in rapid succession so that the machine is conditioned to operate continuously from order to order.

The depression of the "1" key rocks the "1" setting lever 221 (Fig. 15) to operate the blocking interponent 821 associated therewith and to release the right factor indicator setting slide 831—831a so that the value "1" appears in the highest order of the multiplier factor indicator 103. At the same time the arm 833 connected with the interponent 821 moves its metal tip 834 to close the circuit through the contacts 841 (Figs. 15 and 58) of the multiplier circuit, so that the "1" bus 921 of this circuit is energized as indicated at 592 of line 2 (Fig. 60) and correspondingly energizes the actuating winding 851b of the "1" multiplying magnet 851 as illustrated at 593 of line 3. Also, the closing of this circuit energizes the setting clutch engaging solenoid 931 (Fig. 58) so that this clutch is engaged and its cycle of control operations will commence as shown at 595 of line 5 (Fig. 60).

As previously described, the operation of the setting clutch dog 608 (Fig. 29) closes the switch 933 in the motor circuit and also closes the switch 932 (Figs. 29 and 58) which energizes the bias windings 851a—859a of the multiplier magnets 851 through 859 as shown at 596, line 6 (Fig. 60); thus, when the engagement of the setting clutch is first initiated, the multiplier control circuit is properly conditioned for operation in accordance with the value of the depressed multiplier key.

The operation of the setting clutch during its cycle of movement performs several control operations in effecting the calculating operation. The setting clutch operates through the cam 616 (Fig. 24) and the cam 617 (Fig. 39) to operate the differential clutch engaging disengaging frames 420 and 430, respectively, to enter the multiplicand value set in the selection storing carriage into the aligned orders of the actuating mechanism, and the timing of this operation is such that it occurs early in the cycle of the setting clutch, as indicated at 598 of line "8" (Fig. 60).

The setting clutch operates through the cam 618 (Fig. 23) both to move the centralizers for the accumulator register 100 and the revolutions counter 101, as well as the compensator arms for these registers to ineffective position so that these registers are free to operate without interference.

A further step in conditioning the machine for the multiplying operation is the setting of the multiplier control rack 893 (Fig. 18) to the value represented by the depressed multiplier key.

This setting is controlled in part by the energization of the bias winding 851a to 859a (Fig. 58), the energization of a selected actuating winding 859b, and by the dipping of the clutch engaging frame 420 (Fig. 16). In the present example, the energization of the above windings controls the movement of the multiplier armature 871 which moves counter-clockwise and underlies the engaging fork 411a of the stop collar 881 when the cam 615 moves the control slide 901 to its leftmost or armature release position; thus, when the drive engaging frame 420 is dipped the stop collar 881 is moved to active position by armature 871 and also the multiplier control rack or slide 893 (Fig. 18) is released as indicated at 599 of line 9 (Fig. 60) by this dipping. Stop collar 881 limits the movement of the multiplier control slide 893 by a differential amount according to the multiplier value previously selected. As illustrated at 593 and 594 of lines 3 and 4 (Fig. 60) the selected actuating winding and the bias windings are energized before the slide 901 is moved to its armature release position, illustrated at 597, line 7. Slide 901 is moved to this release position to release a selected armature before the numeral clutch engaging frame 420 is dipped as indicated at 598, (Fig. 60).

After the setting clutch operates to control the adjustment of the multiplier control rack 893, it operates through the cam 613 (Fig. 23) to rock the main clutch dog 516 and engage the main clutch as indicated at 590 of line 10 (Fig. 60). The movement of the clutch dog 516 (Fig. 58) not only starts the drive of the actuating means, but also interrupts the circuit of the setting clutch magnet 931 so that the setting clutch cannot be engaged again while the main clutch is operating. The main clutch dog 516, (Fig. 18) when rocked to clutch engaging position, is latched in this position by the latch arm 936 and will remain so latched until the multiplier control slide 893 is returned to its normal inactive position as shown in Fig. 18 through the operation of the pawl 897 and the cam 899. In the instant case, one cycle of operation of the actuating means is determined by the positioning of the slide 893.

After engagement of the main clutch, the setting clutch continues to operate until it completes its current cycle and operates through the cam 619 (Figs. 46 and 58) to close the switch 630 and energize the shift clutch control magnet 559 so that the shifting mechanism is brought into operation as indicated at 588 of line 11 (Fig. 60) at the same time that the actuating means is effecting a digitation operation. It should be noted that the shifting operation is completed during the first cycle of operation of the main clutch (line 10) regardless of whether the main clutch is engaged for one or nine cycles. The one-cycle operation of the shift clutch serves through the cam 567 (Fig. 31*a*) to drive the ratchet 571 one step, and through the gears 574, 582*a*, 582, 581, 576, 577, and 578 (Figs. 31 and 32) drives the worm shaft 308 for the selection storing carriage so that this carriage is moved to the next lower ordinal position where its highest order is aligned with the second highest order of the actuating mechanism. Also, the ratchet 571 operates through the gears 574, 582*a*, 582, 581, 576, 721, and 722 to rotate the worm shaft 718 for the revolutions counter interponent 716 so that this interponent is similarly shifted during the time that a count is being entered in the highest order of the revolutions counter. During the cycling of the product register actuating means, the product will be entered into the register 100 in either a positive or negative fashion in accordance with the setting of the control shaft 52A (Figs. 13 and 14) which, as shown, is set for positive operation when the reverse magnet 533 is not energized. If the negative multiply key 124 had been operated, the solenoid 533 (Fig. 14) would be energized as explained hereinafter, and the drive key 532 would be in engagement with the gear 523, so that negative entry of the selected values would be effected. Similarly, the sign character of the entry of the multiplier in the revolutions counter 101 is controlled by the selective energizations of the main reverse magnet 533 and the counter reverse magnet 749 (Fig. 13).

During the first cycle of operation of the actuating means, which in the case of the present example is by a multiplier of "1," the multiplier control slide 893 is returned to the position shown in Fig. 18 after one cycle and operates through the arm 938 to move the latch 936 to ineffective position so that the main clutch dog 516 is free to move to clutch disengaging position at the end of the first cycle. While the machine is multiplying by a "1," a cycle of the shift clutch is completed as indicated between the solid line 588 (line 11, Fig. 60) and the dotted line 588*a*, and during such shifting the shift switch arm 914 (Fig. 58) is moved clockwise on to the second contact 916. The widths of contacts 916 and the brush on arm 914 are such that contact is made and in the case of the present example the "0" buss 920 is energized to cause operation of the shift clutch solenoid 599 while the shift clutch is still operating. In this manner the shift clutch dog is rocked to and held in clutch engaging position at the time the first shift clutch cycle normally would end and the shift clutch therefore continues to operate and complete two cycles of operation without interruption thereof. If more than one zero were to appear between the two significant digits "1" and "1" then the shifting of the switch arm 914 would cause continuous operation of the shift clutch for as many cycles as there were zeros. It will be noted that in all cases where the higher order significant digit is approximately as great or greater than the number of zeros following it, that the plurality of shifting operations would be completed concurrent with or prior to the completion of the higher order multiplication and there is no delay between the higher and lower order multiplying operations. With regard to the foregoing example of multiplying by a value of "101," and the shifting operation caused by the multiplier setting of "0," which is indicated between dotted line 588*a* and solid line 589 on line 11 (Fig. 60) such shifting causes the shift arm 914 to be shifted clockwise to the third contact 916 (Fig. 58). This causes energization of the "1" buss 921 during the latter part of the shift cycle and starts a sequence of operations identical to that started by the previous energization of buss 921.

It will be recalled that if the main clutch is still operating at the time the arm 914 is shifted onto a contact 916 in the circuit of a significant multiplier buss 921—929 that the next ordinal multiplying operation is delayed until the main clutch dog 516 rocks to clutch disengaging position to close the switch 519 in the circuit of the setting clutch magnet 931.

From the above description it will be seen that the multiplier control system, as disclosed herein, provides for continuous operation of the machine as long as multiplier digits are set into the machine and when the number of ordinal multiplications corresponds to the number of set multiplier digits the operation of the machine will stop. It will further be observed that no extra time is required between successive ordinal multiplying operations for the relative ordinal shifting between the parts, such shifting being effected simultaneously with a product entering operation.

CLEARANCE

The clear key 134 (Figs. 1 and 42) is utilized to restore all parts of the machine to a normalized or cleared position ready to receive the factors of a new calculation. This normalizing function includes the clearance of all the registers and the clearance of the multiplicand and multiplier selection mechanisms under control of the clear clutch previously described in connection with the drive arrangement therefor.

*Clear clutch control*

The clear key 134 (Fig. 42) is mounted for up and down sliding movement in a conventional manner and is normally maintained in raised position by a spring 1001. An ear on the lower end of the clear key engages one arm of a bell crank 1002 which is pivoted on a stud 1003. At its lower end the bell crank carries a pin 1004 which is disposed normally in the upper leg of an L-shaped slot 1006 in a clearance link 1007 so that the clearance link will be moved to the left as viewed in Fig. 42 upon depression of the key 134.

The right or rearward end of the link 1007 (Fig. 26) is connected to the bell crank 1009 by a stud 1008 and the leftward movement of link 1007 rocks bell crank 1009 clockwise against the tension of a spring 1011. The hub of the bell crank 1009 is pinned to shaft 644, as is the hub of the clear clutch dog 643 so that upon clockwise movement of the bell crank 1009, the dog 643 will be rocked clockwise to cause engagement of the clear clutch 642.

When the clear key 134 is fully depressed the link 1007 (Fig. 42*a*) is moved to its leftmost position, and in doing so an ear 1007*b* on link 1007 over-rides a fixed stud 1007*c* thus lifting the upper leg of slot 1006 out of engagement with stud 1004 so that link 1007 may return to its normal rearward position (Fig. 26) upon subsequent seating of the clutch dog 643 regardless of continued depression of the clear key.

Referring to Figs. 27 and 28, it will be recalled that the clear clutch 640 drives a gear 651 and a series of cams 652, 653, and 654 which become operative to control or effect the various clearance operations in a desired sequence.

*Selection set-up carriage restoration*

It will be recalled that during the setting of values into the selection storing mechanism and into the multiplier selection mechanism that the selection set-up carriage is escaped from its leftmost position toward the right (as seen in Figs. 9 and 10) by a spring drum mechanism 281 which drives the selection set-up carriage worm shaft 207. During such escapement the spring drum mechanism 281 becomes unwound; therefore, a drive from the clear clutch to the worm shaft 207 for returning the selection set-up carriage to normal leftmost position will first effect a rewinding of the spring drum before such a drive can be transmitted to the worm shaft. The spring drum 281 is adapted to be rewound and positively driven through a shaft 1013, bevel gearing 1014, shaft 1016, bevel gearing 1017, and shaft 1018. Shaft 1018 (Fig. 48) is adapted to be driven by the engagement of a clutch 1020. One element 1019 of clutch 1020 is slidable keyed to shaft 1018 and includes splines 1019*a* which are moved into engagement with splines 1021*a* of a clutch element 1021, the latter element being enmeshed with gear 651 driven by the clear clutch 640. Element 1021 is mounted for free rotation on the hub of element 1019 and is maintained in its proper lateral position by flanges on the gear 651. Upon operation of the clear clutch 642 and the engagement of the spline clutch 1020 as explained hereinafter a drive is established to rewind the spring drum 281 and then to drive the worm shaft 207 to effect return of the selection set-up carriage to its leftmost order. During such return movement of the selection set-up carriage, the escapement pawl 271, (Fig. 6) carried thereby engages the rearward camming surfaces of the teeth on respective racks 273 and 273*a* (Figs. 9 and 10) and yields to permit such return of the carriage without interference from the racks.

To control the engagement of the above described spline clutch 1020 (Figs. 10 and 48), the shaft 644 (Figs. 26 and 47) carrying both the clear clutch dog 643 and the bell crank 1009 has freely pivoted thereon a lever 1022 having an extension 1024 (Fig. 47) which upon clockwise movement of lever 1022 shifts the spline clutch element 1019 into engagement with the clutch element 1021. The lever 1022 (Fig. 26) is connected to the bell crank 1009 by a spring 1023 tensioned between the ear 1022*a* of lever 1022 and ear 1009*a* of bell crank 1009 to cause the arm 1022 to be spring-urged to follow clockwise movement of the bell crank 1009, and to be positively returned by counter-clockwise movement of the bell crank 1009.

Since the selection set-up carriage is advanced a variable number of orders during the entry of different factors into the machine, this carriage must pass through a variable number of orders in returning to its initial position; therefore, means are provided to maintain both the clear clutch 640 and the spline clutch 1020 in engagement for a variable number of cycles and cause disengagement thereof when the selection set-up carriage reaches its left end position. For this purpose the lever 1022 (Fig. 47) is rocked clockwise with the clear clutch dog 643 through the spring 1023 described hereinbefore and is latched in such position to thereby hold both the clutch element 1019 and the clear clutch dog 643 in their respective engaging positions throughout a plural cycle operation.

A latch 1031 (Fig. 26) for the lever 1022 is enabled in the following manner. When values are first set into the selection mechanism, the leftmost pawl 245 (Fig 25) fixed to shaft 243 is rocked clockwise as described hereinbefore and arm 1034 also fixed to said shaft is likewise rocked clockwise. Arm 1034 has pin and slot connection with arm 1033 so that the shaft 1029 is rocked counter-clockwise and remains in such position as long as the selection set-up carriage is out of its end position. A lever 1032 is fixed to shaft 1029 (Fig. 26) and carries a pin 1032*a* which is embraced by two arms 1031*a* and 1028*a* carried by a latch 1031 and a bell crank 1028 respectively. The arms 1031*a* and 1028*a* are yieldably connected by a spring 1030 to exert a scissor action upon the stud 1032*a*; therefore, when the shaft 1039 and arm 1032 are rocked counter-clockwise the bell crank 1028 is rocked toward the right and out of the path of the ear 1022*b*, the latter at this time blocking the latch 1031 and causing the spring 1030 to yield. When the clear key is depressed and the lever 1022 together with the clear clutch dog 643 are rocked clockwise the ear 1022*b* moves upwardly above the latching shoulder 1031*b* whereupon the latch moves underneath the ear 1022*b* and holds both the clear clutch 640 and the spline clutch 1020 in engagement.

When the selection set-up carriage 211 (Fig. 25) returns to its left end position during a clearance operation the shaft 1029 is rocked clockwise, and as explained hereinafter, in so doing, the pin 1032*a* engages the arm 1031*a* of the latch 1031 and rocks the same toward the left to release both the lever 1022 and the clear clutch dog 643 to cause disengagement of the spline clutch 1020 and the clear clutch 640 respectively. Downward movement of the lever 1022 in response to such clutch disengagement frees the bell crank 1028, which under urge of the spring 1030, moves toward the left to stand over the ear 1022*b* as shown in Fig. 26, thereby blocking movement of the lever 1022 so long as the carriage is in its leftmost position. Under such conditions, if a clear key is depressed for some other reason such as clearance of another part of the machine, the clear clutch may be engaged but the engagement of the spline clutch will be prevented by the bell crank 1028 blocking the ear 1022*b*, thus preventing upward movement of the arm 1024; therefore, the engagement of the clear clutch will be ineffective to drive the spline clutch and cause operation of the mechanism which returns the selection set-up carriage.

*Clearance of selection mechanisms*

When values are set into the multiplicand selection mechanism the slides 322 (Fig. 5) of the selection storing carriage 301 and the slides 260 of the multiplicand factor indicating mechanism are adjusted to their forward positions as explained hereinbefore. Similarly the slides 837 (Fig. 15) of the multiplier setting mechanism are adjusted in their forward positions by the setting of values in said mechanisms.

When a slide 322 (Fig. 21) is set in its forward position the selection set-up carriage is escaped toward the right and roller 324 (Figs. 21 and 22) mounted underneath the slide is projected into the return path of a nose 1026 formed on end plate 214 of the carriage. Similarly, rollers 263 and 838 (Figs. 5 and 15), respectively, carried by slides 260 and 837 of the multiplicand and multiplier selection mechanisms, are projected into the return path of a second nose 1027 formed on end plate 214 as values are entered in said mechanisms.

During a clearance operation and the return of the selection set-up carriage 211 to its normal leftmost position the camming noses 1026 and 1027 engage their respective rollers order by order to positively cam and return the slides 322, 260, and 837 to their normal rearward positions.

As a result of such return of the slides any blocking levers 310—319 (Fig. 6) and blocking interponents 250—259 and 820—829 (Fig. 15) adjusted by previous operation of the keyboard in either the multiplicand or multiplier selection mechanisms are returned to inactive positions.

As each of the slides 837 (Fig. 15) is returned to normal rearward position an extension 245 on the rearward end of the slide engages the lower portion of its related latch trip lever 839 and rocks said lever counterclockwise to normal position. Similarly, extensions 260*a* (Fig. 25) of slides 260 rock their respective latch trip levers 245 upon the return of slides 260 to rearward positions. In each case the respective latch 242 is urged by torsion spring 244 (Fig. 5) to follow trip lever 245 and lock the aligned latch arm 239 when that arm is rocked counter-clockwise by cam 652 as explained hereinafter.

*Clearance of factor indicators*

The cam 652 (Figs. 25, 27, and 28) is employed to restore the various adjusted orders of the factor indicators 102 and 103 to zero and this cam is engaged by a cam follower 1012 which is fixed to the rock shaft 240 (Fig. 25). The rock shaft 240 carries a series of ordinal arms 239 of the multiplicand and multiplier selection mechanisms, and as previously described, each of these arms has a lost motion keyed connection with the rock shaft 240 (Fig. 5). There is one of these arms 239 for each of the series of differential stop slides 237—237*a* and 831—831*a* (Figs. 5 and 15) associated with the factor indicators 102 and 103. The lost motion mounting of the arms 239 enables individual release thereof during the entry of values into the machine but provides for simultaneous return of all of the arms 239 together with the slides 237—237*a* and 831—831*a* associated therewith to the positions shown in Figs. 5, 15, and 25.

The arms 239 are reciprocated once for each cycle of operation of the clear clutch and as the latches 242 become enabled in seriatim by the return of the selection set-up carriage 211 to its normal leftward position the respective latches lock the arms 239 in normal clockwise position.

*Return shift control mechanism*

As previously described, the spring mechanism 584 (Fig. 31) is wound during the operation of the shift clutch in shifting the selection storing carriage, the counter interponent and a division sensing carriage. The clear clutch controls are so arranged as to enable the spring mechanism to return the above mentioned shifted parts to their normal leftmost position. The clear link 1007 carries an ear 1036 which controls the movement of a lever 1037 freely mounted on shaft 1038 and having its upper end disposed adjacent an ear 572*a* on the shift ratchet holding pawl 572. A torsion spring 1044 holds lever 1037 in contact with ear 572*a* of pawl but is not strong enough to overcome spring 573 (Fig. 31*a*) for said pawl. Upon movement of clearance link 1007 to the left as viewed in Fig. 31, the lever 1037 is rocked to move the bell crank pawl 572 out of engagement with the ratchet 571 (Fig. 31*a*) and such movement of pawl 572, through the pin 572*b* lifts the ratchet actuating pawl 569 out of engagement with the ratchet 571 so that this ratchet is free to rotate. The shaft 570 for the ratchet 571 is connected, as previously described, to the spring mechanism 584 (Fig. 32); therefore, when the ratchet 571 is released this spring mechanism becomes effective to restore the aforementioned elements to their respective highest order positions through the drive trains previously described in connection with power shifting of these elements.

*Actuator normalizing mechanism*

It will be recalled that the drive disengaging frame 430 (Fig. 7) is rocked toward the left and back during the setting clutch cycle so that fingers 436 may restore to disengaged position the numeral wheel clutch elements 408 and the multiplier collars 881—889 which were used in the previous machine operation and do not participate in the current operation. In like manner the counter clutch elements 704 (Fig. 38) are restored by fingers 773 carried by frame 731 as has been explained.

A similar operation of the drive engaging frames 430 and 731 after the counter interponent 716 (Fig. 5), the multiplier blocking interponents 821—829 (Fig. 15) and the blocking levers 310—319 (Fig. 6) have been restored to normal by the operation of the clear clutch as explained hereinbefore, will cause the last effective counter clutch element 704, the last effective multiplier collar 881—889, and all of the blocking levers 310—319 to be restored to normal ineffective position.

For this purpose the clear clutch driven cam 653 (Figs. 27 and 37) operates through follower lever 623, arm 624, and shaft 441 to operate the drive disengaging frames 430 and 731 and cause disengagement of the above described elements. In this manner the counter and accumulator clutches and the multiplier collars are normalized by operation of the clear clutch.

*Clearance of accumulator register*

The clearance of the accumulator register 100 is effected by bringing into play zero stops with respect to each numeral wheel mechanism and by applying a friction drive through the ordinal numeral wheel gear trains to drive the numeral wheels to zero against the stops.

It will be recalled that centralizer pawls 467 (Fig. 5) have a lost motion keyed connection with the shaft 568 and are rocked counter-clockwise thereby out of engagement with their respective ten-tooth gears 463 during actuation of the latter. It will be apparent from inspection of Fig. 5 that further rocking of a pawl 467 in a counter-clockwise direction from this position of disengagement will move its nose 467a into the path of a pin 464a carried by the ten-tooth gear 464, and the relation of these parts is such that when the gear 464 is rotated clockwise and the pin 464a engages the nose 467a, the dial 461 of the numeral wheel will stand in zero position.

To effect the rocking of the centralizer pawls 467 to active zero-stop positions and also to move the compensator arms 483 to inactive position during the clearing operation, the clear clutch cam 654 (Figs. 27 and 45) is provided with a cam follower 1041 pivoted on the shaft 489 adjacent a similarly mounted lever 1042 (Fig. 47). The cam follower 1041 has an ear 1041a lying in front of the arm 1042 to rock the latter and is also provided with a lost motion connection at 1041b (Fig. 45) with the link 487 previously described in connection with the disabling of the centralizer pawls and compensator arms by the setting clutch. The lever 1042 (Fig. 47) is connected by a link 1043 to an arm 486, the counter-clockwise movement of which arm, as previously described, rocks the shaft 468 and the centralizer pawls 467 to disengaged position. However, the operation through the link 1043 effects a further movement of arm 486 and the pawls 467 to dispose the noses 467a of pawls 467 into the path of the pins 464a. It will be noted that the right-hand end of link 1043 has a lost motion connection with the arm 1042 to permit independent actuation of the arm 486 during digitation operations.

Cam 654, through follower 1041 and link 487 (Fig. 23) rocks the centralizer pawls and the compensator arms out of centralizing and compensating positions respectively. At the same time, follower 1041, (Fig. 45) through ear 1041a, (Fig. 47) arm 1042, link 1043 and arm 486 effects a further rocking of the centralizer pawls to their zero stop position but does not effect further movement of the compensator arms. As seen in Fig. 23, link 485 connecting the link 487 with arm 486 has a lost motion connection with arm 486 so that the second increment of movement of arm 486 is ineffective to further rock the compensating arms.

The operation of the clear clutch and cam 654 together with the friction drive to the accumulator respective numeral wheels continues after the wheels are driven to their zero positions in order that the clear clutch may effect other clearing operations. Therefore, latching means are provided for maintaining the zero stops in zero stop position for plural cycle operations of the clear clutch, and for this purpose the arm 1042 (Fig. 47) has an ear 1042a for engagement by a spring-urged latch lever 1044. The lower end of the latch is engaged by an extension 643b of the clear clutch dog 643 to hold the latch in a disabled position. When the clear clutch dog is moved clockwise to clutch engaging position the latch is enabled to hold the arm 1042 in "zero stop" position after rocked to such position by cam 654. Latch 1044 is disabled when the clutch dog 643 moves in to disengage the clutch.

A latching means is also provided for maintaining the compensator arms 483 and 656 (Fig. 23) of the accumulator and revolutions counter respectively in disabled positions during the clearing operation. The cam follower 1041 (Fig. 45) controlling the arms 483 and 756 has an ear 1041c for engagement by a pivotally mounted spring-urged latch lever 1039. An ear on the lower arm of latch 1039 normally is engaged by bell crank lever 1040, which lever is pivotally connected by link 1045 to arm 1029a pinned to shaft 1029. When the selection set-up carriage is out of its highest order position, it will be recalled that the shaft 1029 is rocked counter-clockwise from the position shown in Fig. 45, so that the latch lever 1039 falls against the ear 1041c and is ready to effect latching engagement therewith when the clear clutch cam 654 operates the cam follower 1041. This latched relation of the parts remains until the selection setting carriage is returned to its highest order position at which time the shaft 1029 is restored and the latch lever 1039 is moved to inactive position.

It is to be noted that the compensator arms for both the accumulator and counter dials will be re-enabled before the zero stop pawls are moved from their zero stop position. For this purpose the release of the cam follower 1041 (Fig. 45) from the latch lever 1039 to allow re-enabling of the compensator arms is effected as the selection setting carriage 211 moves into its leftmost position and while the clear clutch 642 is still engaged. The zero stop pawls remain latched by latch 1044 (Fig. 47) in zero stop positions until the clear clutch dog rocks to clutch disengaging position as explained hereinbefore.

As previously stated, a friction drive is provided for the accumulator numeral wheels to move them to their "0" positions. It will be recalled that the gear train 390 through 399 (Fig. 5) is provided in each order of the actuating means for transmitting a differential drive to the gear 401 in the gear train of the digitation input gear for the numeral wheels. The end gear 399 of each train 390—399 (Fig. 54) meshes with a gear 386 which is freely mounted on the shaft 384. Adjacent each gear 386 (Figs. 1 and 55) is a friction drive element 388 pinned to the shaft 384. Shaft 384 carries a gear 387 which is in constant mesh with a wide gear 1051 carried by the armature shaft 1052 of a dividend entry magnet 1053. The gear 1051 normally has a splined clutch connection at 1054 with a gear 1056 which is driven through an idler 1057 (Fig. 54) by a gear 1058 on the clear clutch shaft 604. Thus, upon operation of the clear clutch, gear 1051 drives the gear 387 and shaft 384. Friction drive elements 388 drive the gear trains 390—399, and through the digitation gear trains previously described, the numeral wheels are returned to zero positions at the same time that the zero stops therefor are moved to their zero stop positions, a slight amount of overdrive being provided for the numeral wheels. As the numeral wheels are reset to zero during the first cycle of operation of the clear clutch, the numeral wheels and the gear trains to the gears 386 are locked against further movement and the friction discs 388 are idly driven thereafter until the clear clutch becomes disengaged. It will be noted that with the accumulator numeral wheels 461 (Fig. 5) in normal zero position that their respective compensation arms 483 lie on the high points of cams 482, while in the case of the counter numeral wheels 701 the arms 756 lie on the low points of their respective snail cams 724. In either case, the rocking of the compensation arms 483 and 756 to snail cam engaging positions during the latter part of the clearance operation as described hereinbefore tends to move the next higher numeral wheel stop pins 464*a* and 728, respectively, away from engagement with their respective stop levers; however, the friction drives to the counter and accumulator numeral wheels are still operative at this time and as soon as a respective stop pin tends to move away from its related stop lever the friction drive therefor becomes effective to drive and hold the pin in engagement with its stop lever.

*Clearance of revolutions counter*

The counter register clearing operation is similar to that described above in connection with the accumulator. Referring to Figs. 23 and 47, it will be seen that each of the counter centralizer pawls 755 on the shaft 752 is also provided with a nose 755*a* cooperating with a pin 1061 on a gear 720 of the counter drive train. As previously described, the shaft 752 is connected by arm 753 and link 754 to the arm 469 so that the zero stops for the numeral wheels of the counter are adjusted as described in connection with the accumulator.

The friction drive for the counter gear train includes the idler gear 1056 (Fig. 54) driven by the clear clutch, which gear drives through the idlers 1066 and 1067 to the gear 1068 secured to shaft 1047. As seen in Fig. 11, shaft 1047 provides a drive through friction drive elements 1048 and gears 1046 to each of the counter numeral wheel drive gears 703 which, as previously explained, drive the counter numeral wheels by means of the drive train 702 (Fig. 5). The numeral wheels of the counter register and the zero stops therefor are operated by the clear clutch mechanism to reset the numeral wheels to zero in the same manner as the accumulator numeral wheels are reset to zero, but inasmuch as the drive to the counter numeral wheels is taken from gear 1056 (Fig. 55) it will be noted that the energization of magnet 1053 as described hereafter, to disengage the spline clutch 1054 does not disable the clearance drive train to the counter wheels as it does the clearance drive for the accumulator numeral wheels.

This arrangement provides for simultaneous clearance of the accumulator and counter numeral wheels or for clearance of the counter numeral wheels alone during specific operations described hereinafter.

ADDITION AND SUBTRACTION

Addition and subtraction are performed in the instant machine, as previously stated, under control of the add key 121 (Fig. 1) and the subtract key 122, so that one cycle of operation of the actuating means is determined together with a restoration of the selection set-up and selection storing carriages to their initial highest order position with clearing of the values standing in the selection storing carriage.

Referring to Fig. 41, the keys 121 and 122 are mounted for vertical sliding movement in a conventional manner and are provided with respective ears 1101 and 1102 overlying the arms of similar bell cranks 1103 and 1103*a* pivoted respectively on studs 1104 and 1104*a* and connected by a link 1106 for parallel motion. A spring 1107 urges the bell cranks 1103 and 1103*a* clockwise and also urges the keys 121 and 122 to their raised positions.

In order to limit the main clutch to a single cycle of operation of the actuating mechanism the left-hand bell crank 1103 has pivotally mounted thereon a bell crank pawl 1111 which is urged clockwise by a spring 1112 and which normally engages an ear on a member 1113 secured on a control shaft 1114 so that this shaft is rocked clockwise upon depression of either the add or subtract keys 121 and 122. During rocking movement of the bell crank 1103, the arm 1111*a* of the bell crank pawl 1111 strikes the pivotal support stud 1104 of the left-hand bell crank 1103 and is rocked to inactive position with reference to the member 1113 toward the end of the effective stroke of movement of bell crank pawl 1111. The shaft 1114 carries an arm 1116 (Fig. 43) having a pin 1117 engaging a slot in a main clutch control link 1118. Also, the arm 1116 has an insulated finger 1119 overlying the upper arm of a pair of leaf spring contact arms of a switch 1121 the upper arm of which also carries an insulated pin to operate the lower set of contact arms of the switch 1122. By reference to Fig. 58 it will be seen that the contacts 1122 form a switch for energizing the number "1" buss of the multiplier circuit so that one cycle of operation of the actuator will occur upon operation of either of add or subtract keys 121 and 122.

In this manner the energization of the number "1" buss 921 controls the single entry of the addend or the subtrahend into the accumulator in the same way it does in a multiplication operation by a multiplier value of "1"; consequently, a shifting operation is initiated in a manner explained in the description of multiplication operations. This shifting operation is unnecessary in addition and subtraction, however, and could be eliminated in any well known way such as by disabling of the shift clutch control solenoid 559 during addition and subtraction but such mechanism has not been described.

Closure of switch 1121 effects energization of solenoid 1053 to disable the clearance drive train to the accumulator numeral wheels so that the accumulator will not be cleared during a clearance cycle which automatically follows an actuating operation when the add key 121, the subtract key 122 or the dividend entry key 126 is depressed, as is more fully explained hereinafter.

Upon rocking movement of the arm 1116 (Fig. 43) the downward movement of the link 1118 is effective to bring the live pawl 1134 on the link 1118 into operative relation with the ear 1136a of an arm 1136 of the clear controls as is later described. The link 1118 (Fig. 44) is pivotally connected to an arm 1123 on the main clutch dog shaft 508 and is adapted to be moved to the left when the main clutch dog is rocked to clutch-engaging position.

In order to effect the clearance operation and restore the selection setting and selection storing carriages to their highest order positions, the shaft 1114 (Fig. 42) carries a depending arm 1126 having a pin 1126a engaging the slotted end of a link 1127 which link is also provided with a pin and slot connection with an upstanding ear 1007a of the clearance link 1007. A spring 1128 is connected between the pin 1126a and the right end of the link 1127 to maintain the link 1127 in the relative position shown in Fig. 42 with an ear 1129 thereof engaged by a latch arm 1131. It will be seen that movement of arm 1126 operates to tension the spring 1128 so that when the link 1127 is released from latch 1131 the spring will cause movement of the link 1127 to operate the clearance link 1007. By virtue of the slotted connection between ear 1007a and link 1127 the clearance link 1007 can be operated by the clear key 134 independently of the shaft 1114.

At the time the shaft 1114 is rocked by depression of a key 121 or 122 the arm 1126 is rocked clockwise, and a pin 1126b on the arm 1126 is engaged by a spring-urged latch lever 1132 freely mounted on the shaft 1133 and spring-urged clockwise, so that the spring 1128 is placed under tension. When the main clutch dog shaft 508 (Fig. 44) is rocked clockwise by the setting clutch, link 1118 (Figs. 43 and 44) is moved to the left and the live pawl 1134 engages the ear 1136a of an arm 1136 fixed to the shaft 1133. In this way the control for the clearance cycle is cocked, but does not become effective until the main clutch dog 516 returns to clutch-disengaging position.

At the time the main clutch dog rocks to clutch disengaging position the arm 1136 will be rocked clockwise, as viewed in Fig. 43, to rock the shaft 1133 and the latch arm 1131 (Fig. 42) integral therewith so that the slide 1127 can become effective under the influence of the spring 1128 to move the clearance link 1007 to the left, as viewed in Fig. 42. Link 1007 carries a spring-urged latch pawl 1137 which is normally maintained disabled by a stationary finger 1138, but as the link 1007 moves to the left the spring becomes effective to move the latch pawl 1137 counter-clockwise to engage a pin 1132a of the latch lever 1132. In this way, latch pawl 1137 is conditioned to rock the latch lever 1132 counter-clockwise and release the arm 1126 upon the rightward movement of the link 1007 at the end of the clearing operation as previously described.

It will be noted that latch arm 1132 (Fig. 42) is effective upon depression of the add or subtract keys 121—122 to hold both the shaft 1114 and arm 1116 (Fig. 43) in their operative clockwise positions. In this position of arm 1116 the switch 1121 for the accumulator clearance disabling solenoid 1053 is held closed to energize said solenoid until the clearance operation is completed and latch 1132 is disabled. In this manner the accumulator clearance train is disabled during clearance operations in addition and subtraction.

Latching of arm 1116 in its clockwise position also holds closed the switch 1122 in the circuit of the number "1" multiplier buss 921, and in order to prevent re-energization of this buss during the operation of the main accumulator clutch or of the clearance clutch, the circuit of said buss is opened at switches 519 and 648 (Fig. 58) by the main clutch dog 516 and the clear clutch dog 643 respectively when these clutch control dogs are rocked to clutch engaging position. In this manner a second energization of the number "1" multiplier buss is prevented even though switch 1122 is held closed as explained above.

Spring 1128 is of such strength as to overcome spring 1011 (Fig. 26) and moves link 1007 and clear clutch dog 643 to cause engagement of the clear clutch as described above. In order to return dog 643 to clutch disengaging position after the required number of cycles of operation of the clear clutch, a means is provided which becomes effective during the operation of the clear clutch to overcome spring 1128 and aid spring 1011 in effecting such return. This means comprises a leaf spring 1011a fastened to a back frame plate in alignment with the clear clutch dog 643 so that when the latter is rocked clockwise and the clear clutch is engaged the driven disc 642 of the clutch 640 positively cams the dog clockwise against the leaf spring 1011a and compresses the spring; then when the selection setting carriage reaches its left end position and latch 1031 is tripped as described hereinbefore the clear clutch dog is free to return under urge of springs 1011 and 1011a to clutch disengaging position. In returning dog 643 to its clutch disengaging position spring 1011 needs but momentary aid from spring 1011a to overcome spring 1128 inasmuch as latch 1132 (Fig. 42) becomes disengaged during the first portion of the rightward movement of slide 1007 and releases arm 1126 and spring 1128 to follow the movement of link 1007 toward the right without tensioning spring 1128.

To provide for subtractive operation, the subtract key 122 (Fig. 41) has its ear 1102 overlying a contact control lever 1141 pivoted at 1104 and related to a control switch 1142 (Fig. 58) for energizing the main actuator reverse solenoid 533 (Fig. 59) upon depression of the subtract key 122. The parallel linkage 1103a, 1106, 1103 (Fig. 41) provides for operation of the same mechanism as described in connection with the add key 121 for initiating an appropriate operation of the machine.

A means not shown may be provided to maintain energization of the reverse solenoid 533 throughout the subtract operation in case the operator should release the key 122 immediately. This may be done either by a well known stick circuit for this solenoid or by mechanical means for holding the switch 1142 closed for the required time after the key release.

DIVISION

The division mechanism of the instant invention is of the general type disclosed in the copending application of Harold T. Avery, Serial No. 81,501, filed March 1, 1949, for Calculating Machine. In division, the dividend is entered into the machine by first entering the same into the selection storing carriage and then depressing the dividend key 126 (Fig. 1) to transfer the dividend into the register 100. The divisor is then set up or entered in the selection storing carriage and in the check dial register 102, so that the machine is properly conditioned for starting of the division operation.

As previously explained, the "equal" key 128 is the division start key, and is operated to initiate the dividing operation and cause registering of quotient digits in the revolutions counter or quotient register 101. As fully explained in the above noted Avery application, the division control is exercised in accordance with a process of pre-estimation division by means of which the divisor is compared with the dividend to obtain an estimated quotient digit which is either the correct quotient digit or one greater than the correct quotient digit. At the end of an ordinal division or subtracting operation, the remainder is sensed to determine whether an overdraft has occurred due to an over-estimation of the quotient digit. If the correct quotient digit was estimated, a relative shifting is effected between the current dividend value standing in the register 100 and the divisor, the latter being represented by the value standing in the selection storing carriage, while if the quotient figure has been over-estimated a corrective addition cycle occurs during which the shifting of the selection storing carriage is effected.

In the performance of division operations, the above described general control operations occur in determining each quotient digit until the capacity of the machine has been reached or until the division stop key 127 is operated to terminate the division operation at the end of a desired ordinal division.

The present type of machine differs from the machine shown in the above noted Avery application in that a "crawl type" tens transfer registering mechanism and a modification of the "proportional gear" actuating mechanism is used instead of the simultaneous transfer mechanism and the dial clutch actuators disclosed in said application. This modification of the transfer and actuating mechanisms permits of the simultaneous operation of the shifting and actuating mechanism described hereinbefore as well as the high cyclic speeds previously attained by such proportional gear actuating mechanisms but requires certain changes in the division sequence as will be described hereinafter.

*Dividend entry*

The dividend entry key 126 (Fig. 42) operates similarly to the add key 121. The stem 1201 of this key carries a three-arm bell crank 1202 which is urged clockwise by the spring 1203, while a second spring 1204 urges the key 126 to raised position. An ear 1202a of the bell crank 1202 normally engages an arm 1206 secured on the shaft 1114 so that the key 126 rocks this shaft and the same linkage previously described in connection with the add key 121 to operate the setting clutch and to energize the "1" buss 921 of the multiplier control circuit for entry of the value set in the selection storing carriage into the dividend register 100. It will be recalled also that this operation serves through the link 1007 (Figs. 26 and 42) to cause operation of the clearing mechanism in the same manner as described in connection with the add key 121. Depression of the dividend entry key 126 also serves through bell crank 1202, arm 1206, and shaft 1114 to close switch 1121 (Fig. 43) to energise the control solenoid 1053 so that the friction drive clearance train for the dividend register 100 is disabled during the clearing operation similarly as was described in operations of addition.

As a result of the above operation the dividend value stands in the register 100 and the machine is otherwise normalized. Subsequently, the keys 110 to 119 are operated to enter the divisor in the selection storing carriage and the division start key or equal key 128 (Fig. 44) is operated to initiate the division operation.

*Division start or equal key*

The operation of the division start or equal key 128 serves several functions including the enabling of the division control mechanism, the disabling of a portion of the multiplication control mechanism and the conditioning of the division control mechanism for stopping the machine at the end of the division operation.

Referring to Fig. 44, the stem 1251 of the key 128 is urged to raised position by a spring 1252 and carries an ear 1251a overlying an arm 1253 pinned to a shaft 1254. Also associated with the ear 1251a is a spring-urged latch pawl 1256 carried by a shaft 1257 and which pawl serves to latch the key 128 in depressed position as disclosed hereinafter.

The arm 1253 (Fig. 44) and the shaft 1254 form part of a division setting control linkage including a depending arm 1255 fixed to the shaft 1254 and which arm 1255 is pivotally connected to a rearwardly extending division control link 1258. The latter is slotted at its rearward end to engage a support stud 1262 and is urged to the right as viewed in Fig. 44 by a spring 1259 connected between the link and a suitable frame bracket 1261.

To enable latching of the division start key in depressed position and to enable the division control mechanism and simultaneously disable the multiplication control mechanism, the slide 1258 carries an auxiliary control slide 1266 which is mounted by pin and slot connections on the slide 1258 for limited movement relative thereto. Slide 1266 is urged to the right as viewed in Fig. 44 by a spring 1267. At its forward end the slide 1266 has a laterally extending ear 1266a lying in front of an arm 1268 pinned to the shaft 1257 for the key latch 1256, so that when the slide 1266 is moved to the left, arm 1268 and the latch 1256 can move under the influence of the latch spring 1663 to overlie the ear 1251a of the key 128. When key 128 is latched in depressed position, slide 1258 is locked in its leftmost position through ear 1251a and arms 1253 and 1255.

A bell crank 1288 is freely mounted for limited rocking movement on a stud 1265 carried near the rightmost end of slide 1258 and a spring 1289 urges the bell crank 1288 clockwise against an ear 1264 of the slide. An ear 1288a on the leftmost arm of the bell crank is laterally bent and lies adjacent an ear 1266c (Fig. 49) of slide 1266 so that upon the leftward movement of slide 1258, slide 1266 will be moved therewith. It will be noted that ear 1288a is also operatively related to respective ears on levers 1291 and 1286d as is more fully described hereinafter.

Slide 1266 controls the enabling and disabling, respectively, of the division and multiplication control mechanisms through an insulated depending arm 1266b (Fig. 44), which, upon movement of the slide to the left, is adapted to open the normally closed switch 912 (Figs. 44 and 58) of the multiplier control circuit and close the normally opened switch 1269 of the division control mechanism, the closure of switch 1269 causing energization of the bias windings of a plurality of division bridge relays later described. At such time, the arm 1266b also opens the normally closed switch 1271 which is in the multiplication control circuit of the shift clutch solenoid 559 and closes the switch 1272 in an alternate circuit of this solenoid for control thereof during division. Thus the respective control circuits for the multiplication and division mechanisms are isolated from each other and are enabled selectively, depending upon the position of the auxiliary control slide 1266.

Figure 51:
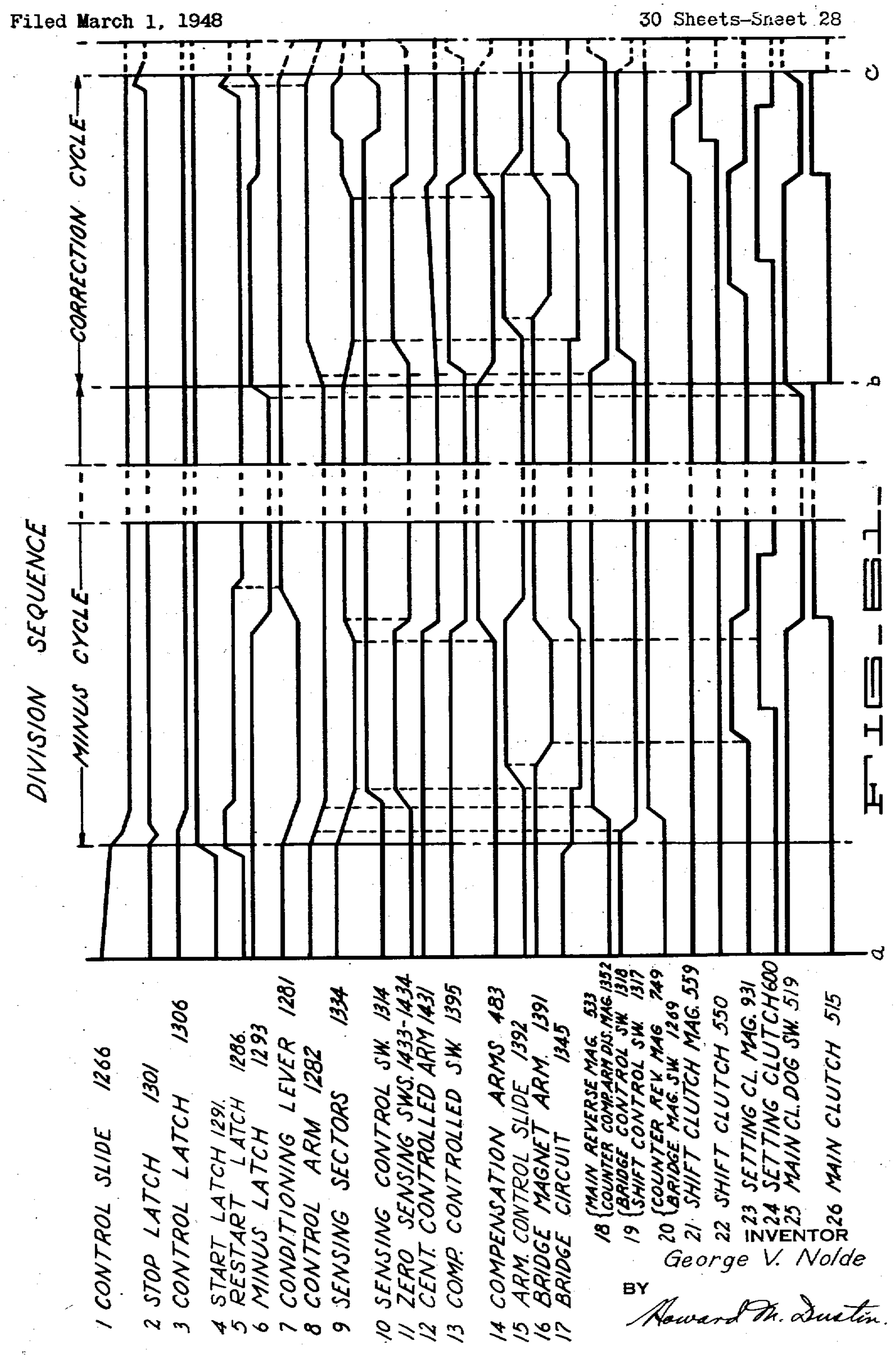

The leftward movement of the division control slide 1258 is operative to control the setting of a division control means including a division conditioning or setting lever 1281 (Fig. 53) and a division control arm 1282 (Fig. 51). The lever 1281 (Fig. 53) is pinned to a control shaft 1283 while the division control arm 1282 (Fig. 51) is freely pivoted thereon. The lever 1281 and the arm 1282 have respective opposed ears 1281a and 1282a which are connected by a spring 1284 (Fig. 50) so that either arm is spring-urged to follow movement of the other. The division setting lever 1281 (Fig. 53) is urged counter-clockwise by a spring 1280 but is normally latched in the disabled position shown in Fig. 51 by a pair of latch members including a three-armed bell crank restart latch 1286 and a start latch lever 1291 (Fig. 53) both freely pivoted on the support shaft 1287. Restart latch 1286 (Fig. 51) is urged counter-clockwise by spring 1279 and the horizontal leftwardly extending arm 1286a thereof is notched to engage the ear 1281a to maintain the division setting lever 1281 in the normal disabled position shown. A downwardly extending arm 1286d secured to the hub of bell crank restart latch 1286 is abutted by the ear 1288a of the previously mentioned bell crank 1288 (Fig. 44) pivoted on the control slide 1258. Latch lever 1291 (Fig. 53), previously mentioned, is freely pivoted on the shaft 1287 and is biased counter-clockwise by a spring 1292. An ear 1291a on the lower arm of the latch lever 1291 abuts the ear 1288a of the bell crank 1288. Both of the latches 1286 and 1291 for the division setting lever 1281 are moved to release said lever upon movement of the division control slide 1258 and bell crank ear 1288a to the left as viewed in Fig. 44. Cam 1285 (Fig. 50) is related to an arm 1281b on the hub of lever 1281 and is driven by the main clutch to restore the lever 1281 to the position shown as explained hereinafter. The upper arm 1286b of the restart latch 1286 (Fig. 51) is operatively related to the cam 566 driven by the shift clutch as is more fully explained hereinafter.

Associated with the division control arm 1282 is a normally ineffective latch lever 1293 (Fig. 50) freely pivoted on the shaft 1287 and urged counter-clockwise by a spring 1294 against an arm 1295 pinned to the main clutch dog control shaft 508. When arm 1282 is released from latches 1286 and 1291 to rock counter-clockwise, as described above, then a subsequent rocking of the main clutch dog shaft 508 to clutch engaging position enables latch 1293 to lock the arm 1282 in its counter-clockwise position. In such position arm 1282 controls negative division operations through the operation of a plurality of switches 1317, 1318, 1319, and 1320 shown in Figs. 44 and 58 and which switches are more fully described hereinafter.

With further reference to Fig. 44, it will be noted that upon movement of the division setting slide 1258 to the left, i. e., to active position, that the bell crank 1288, after performing its function of moving the slide 1266 and the latches 1286 and 1291 to the above described positions, engages a stud 1296 and is rocked to and held in an inactive position against the urgency of its associated spring 1289 as long as slide 1258 is held in its leftmost position as described hereinbefore.

The division control arm 1282, after its original release from the latches 1286 and 1291, is automatically reciprocated under the control of various cams, described hereinafter, to open and close the above mentioned switches and thereby control division operations.

Means are provided for latching the auxiliary division control slide 1266 in its leftmost position and this means includes the latches 1301 and 1306 (Figs. 44 and 49). Latch 1301 is freely mounted on a shaft 1308 and is urged clockwise by the spring 1302 to normally lie on top of the ear 1266c (Fig. 49) of the auxiliary division slide 1266. Latch 1301 is provided with a laterally extending ear 1303 (Figs. 44 and 51) which, upon operation of the cam 563 (Fig. 51), is engaged by the depending arm 1286c of the bell crank latch 1286 to rock said latch counter-clockwise as is more fully explained hereinafter. The second latching means for the division control slide 1266 is the broadfaced latch 1306 (Fig. 49) which is pinned to shaft 1308 and is urged clockwise to active position by the spring 1307. Latch 1306 normally lies on top of the ear 1266c of the auxiliary division slide 1266 previously referred to and also on top of an ear 1291a (Fig. 53) of the start latch 1291. Upon depression of the division start key 128 (Fig. 44), ear 1266c of link 1266 and ear 1291a of latch 1291 are moved to the left as described hereinbefore at which time the latches 1301 and 1306 rock clockwise to active locking positions, the latch 1306 having its latching edge displaced to the left of the similar latching edge of the latch 1301 so that when the latch 1306 becomes effective with regard to the auxiliary division slide 1266, the latter is held spaced from the latch 1301 although the latch 1301 is in position to engage the slide 1266 if it is released from the latch 1306. Because of the width of the face of latch 1306 it is also effective to engage and hold the latch 1291 (Fig. 53) inactive when the latter is moved to its disabled position. Latch 1301 is employed at the end of a division operation as later described to insure a correct quotient figure by what is known in the art as "digit completion."

The movement of the start latch 1291 to its disabled position with respect to lever 1281 causes enabling of a divident sensing mechanism hereinafter described. Simultaneously with the enabling of the division sensing mechanism, certain means for comparing the dividend with the divisor are also enabled, as will now be described. The latch lever 1291 (Fig. 53) is provided with a suitable hub 1291b carrying an auxiliary latch arm 1297 (Fig. 52) normally engaging an ear 1309a of a lever 1309. The latter lever is freely pivoted on the shaft 1283 and is urged counter-clockwise by a spring 1310. The upper end of the lever 1309 is pivotally connected to a control link 1311 (Fig. 44) the opposite end of which is pivotally connected at 1312 to an arm 1313 of the dividend sensing carriage generally designated at 1321 and which carriage is described hereinafter. Associated with the lever 1309 is a spring-urged bell crank 1315 having ears 1315a and 1315b. Ear 1315a is operatively related to division conditioning lever 1281 (Fig. 50) and ear 1513b is operatively related to lever 1309 (Fig. 52). Bell crank 1315 cooperates with a cam 565 driven by the shift clutch to restore the levers 1291 and 1309 to the positions shown as will appear later.

The link 1311 (Fig. 44) is provided with an ear 1311a of insulating material adjacent the normally opened contacts of a switch 1314 which is in the circuit of the electrical division control circuit described more particularly hereinafter. The timing of the closing of switch 1314 by leftward movement of link 1311 is such that the switch is closed during the last portion of such movement.

Further conditioning of the machine for division is effected by the division control arm 1282 upon counter-clockwise movement from the position shown in Fig. 51 together with the division conditioning lever 1281, as previously described. Referring to Fig. 44, the division control lever 1282 is provided with a depending insulated arm 1282b which is positioned adjacent the extended arm 1316, one arm of a series of arms for switches 1317, 1318, 1319, and 1320. Referring to Figs. 44 and 59, it will be seen that with the division control mechanism in inactive condition and lever 1282 in clockwise position shown, the switch 1317 of the shift clutch solenoid circuit is closed and the double throw switch 1318 which is in the division control bridge circuit is in its left-hand position. Also, the switch 1319 which controls a counter compensation arm disabling magnet 1352 is open and the switch 1320 which controls the main reverse magnet 533 is also open. Upon counter-clockwise movement of the division control arm 1282 however, the condition of these switches will all be changed so that the shift conditioning switch 1317 is open, the division bridge switch 1318 is moved to the right to enable the division control circuit for quotient digit estimation and the counter compensation disabling switch 1319 and the main reverse switch 1320 are closed.

The counter compensation arm disabling magnet 1352 (Figs. 23a and 59) has a spring-urged armature 1353 (Figs. 23a and 23b) carrying a key 1354 extending through a slotted portion of the compensator arm shaft 757 and engaging the bottom leg of a T-shaped slot 1355 (Fig. 23) in the hub 758a of the operating arm 758 for the shaft 757. The key 1354 (Figs. 23a and 23b) and the slot 1355 form a clutch connection which is normally engaged as shown, but which is disengaged by the energization of magnet 1352 so that the counter compensator arms are not affected by a rocking movement of arm 758 and remain enabled as long as switch 1319 is closed.

With the machine conditioned as described above division operations are carried out under control of certain division control mechanisms, as will now be described.

*Dividend sensing carriage*

The dividend sensing mechanism comprises a dividend sensing carriage of the character disclosed in the above-identified application of Harold T. Avery, Serial No. 81,501 (issued as Patent No. 2,538,826 on January 23, 1951), to which reference is made for a disclosure of mechanism not described herein. In general this dividend sensing mechanism comprises a carriage or frame 1321 (Figs. 5 and 11) which is slidably mounted on three shafts 1322, 1323 and 1324 and which has a hub and pin engagement with a worm shaft 1335. The gears 1325, 1326, and 1327 are keyed to the shafts 1322 to 1324, respectively, and slide on these shafts with the carriage. The gears are ordinally spaced with respect to each other and each meshes with a respective one of the sensing gear segments 1328, 1329, and 1330. These gear segments are freely pivoted on the worm shaft 1335. Rotation of shaft 1335 effects ordinal shifting of the division sensing carriage. As seen in Figs. 31 and 32, shaft 1335 is driven through gears 1356, and 1357, and 722 by the previously described step by step movement of ratchet 571. Gears 1325, 1326, and 1327 (Fig. 5) are yieldably driven through the respective shafts 1322 to 1324 by gears 1331, 1332, and 1333 (Figs. 32 and 44) which have respective spring drive connections 1331a, 1332a, and 1333a, as described in said Avery application, to each of the shafts 1322 through 1324, respectively, at the right-hand ends thereof. Gears 1331, 1332, and 1333 in turn mesh with and are driven by a common gear segment 1334 (Fig. 44), freely mounted on worm shaft 1335 and which gear segment is operated by the arm 1313 and the link 1311, as previously described.

As described in the above Avery application, the result of leftward movement of link 1311 is to drive the segments 1328, 1329, and 1330 (Fig. 5) yieldably until they are stopped by engagement with the respective aligned compensator arms 483 of the dividend register so that the position of these segments and correspondingly the respective positions of the shafts 1322 to 1324 will be representative of the positions occupied by the three aligned compensator arms. The compensator arms are positioned by their associated snail cams during the dividend value sensing operation and therefore the positions to which shafts 1322 to 1324 are rotated are representative of the values standing in the aligned numeral wheels of the dividend register. At their left-hand ends, the respective shafts 1322 to 1324 (Fig. 55a) carry respective contact arms or brushes 1336, 1337, and 1338 cooperating with respective series of contacts 1339, 1340, and 1341 which form taps of respectivs variable resistors 1342, 1343, and 1344 (Fig. 59) and forming part of a multiple Wheatstone bridge circuit indicated generally at 1345, all as is described in said Avery application.

From the above description it is seen that setting of the division sensing carriage operates in the manner disclosed in the above mentioned Avery application to enter the values standing in the three highest possible orders of the dividend into the bridge circuit for comparison with the values standing in the aforementioned two orders of the divisor.

*Divisor sensing mechanism*

Referring to Fig. 5, the two highest order numeral wheels 231 of the divisor factor indicator 102 have each integral therewith a contact arm 1346 (Fig. 5a) cooperating with a series of contacts 1347 forming taps connected to respective variable resistors 1348, and 1349 (Fig. 59) so that these resistors will be adjusted to represent the two highest order digits of the divisor.

*Quotient estimation—Wheatstone bridge*

As previously stated, the division control circuits and more particularly the bridge circuits of the instant disclosure are identical in all respects to the similar circuits disclosed in the above noted Avery application, therefore, these circuits will only be briefly described here. The Wheatstone bridge illustrated in Fig. 59, as previously mentioned, includes two series of variable resistors R*dv* and R*dr*. The three variable resistors 1344, 1343, and 1342 of the series R*dv* are selectively set in accordance with the three leftmost or highest order digits of the dividend or current remainder, while the two variable resistors 1348 and 1349 of the series R*dr* are selectively set in accordance with the two leftmost orders of the divisor as previously described.

The two series of resistors R*dv* and R*dr* are connected at point X which is, in turn, connected across the bridge to ten taps 0 to 9 on resistor R by ten parallel leads respectively numbered 0 to 9 in Fig. 59. The points of connection at the above taps are established by mathematical formulae disclosed fully in said Avery application and thus establish a plurality of different potentials at the taps on resistor R. The adjustments of the series of resistors R*dv* and R*dr* on the other hand etablish a selected potential at point X which is representative of the ratio of the resistances in the two series of resistors. By means of the ten parallel leads and related instrumentalities the selected potential at point X is compared with a plurality of potentials on resistor R, and causes energization of a series of electro-magnets including the one which is representative of the approximate value of the quotient of dividend and divisor, all as fully described in said Avery application.

The energization of this representative electromagnet in turn controls the number of cycles of operation of the actuating mechanism which subtracts the divisor from the dividend a number of times determined by the pre-estimated quotient digit.

Sensing for an overdraft is controlled in the following manner: A resistor 1351 having a fixed resistance corresponding to a numeral value of approximately 900 is connected in parallel with the divisor resistors 1348 and 1349, as explained in said Avery application, and the switch 1318 switches the resistors 1348 and 1349 out, and the fixed resistor 1351 into the bridge circuit so as to compare the fixed resistance of resistor 1351 with the value of the remainder of the dividend to determine whether an overdraft has occurred and corrective additive cycle is required, or whether the estimated quotient figure was correct and an ordinal shift is to be performed. Following an overdraft, the potential established at point X, by comparison of the R*dv* with the fixed resistor 1351 will energize the number one bridge magnet to control a single cycle of operation of the actuating means while in case of non-overdraft the potential established at point X will determine energization of the zero magnet, which in turn energizes the shift solenoid 559 to cause shifting of the dividend remainder relative to the divisor.

In the arrangement of the multiple Wheatsone bridge embodied in the machines disclosed in the prior Avery application and also in the present disclosure, a series of bridge magnets are energized in a rapid sequence or wave starting with the highest, namely, the #9 magnet, down to and including the one corresponding to the quotient digit.

In said Avery application the bridge magnets directly control the setting of a multiplier quotient selection mechanism, and are so arranged that the lowest numbered magnet of the series which is energized controls the quotient selection mechanism, the others above that one being ineffective even though their armatures are ejected.

The bridge magnets of the present machine, on the other hand, are purely relays which are energized in the wave exactly as in said Avery machine, and include relay switches which are effective to cause energization of one magnet of the separate series of multiplier electro-magnets, which one of the magnets so energized corresponds to the lowest one of the series of bridge relays energized and becomes effective to set one of the quotient selection elements which correspond to the estimated quotient digit.

*Division control circuit*

The normally closed switches 1240 (Fig. 58) correspond to the switches of the same number in said Avery application and are opened upon operation of each of the respective relays 1360—1368. Each switch, when so opened, opens the circuit to the next higher relay and in so doing cuts out of the bridge circuit all the relays above the one which is representative of the selected quotient digit as described in said Avery application.

The switches which control selective energization of one of the multiplier magnets mentioned above, each include a double throw switch associated with and operated by each respective bridge relay magnet. Each switch includes a normally closed pair of contacts such as those designated 1387*a* and a normally open pair of contacts 1387. The contacts 1387*a* are connected to the #8 buss 928, but the circuit including this buss is open at the contact 1388 of the #8 relay and also at the contact 1389 of the #9 relay.

When the Wheatstone bridge is adjusted and set into operation, (and assuming the quotient digit to be estimated is an 8), only the #9 and #8 relays become energized as described in the above mentioned Avery application. Upon such energization the contacts 1389 and 1388 are closed by their respective relay magnets and complete the circuit from the main power supply line 911, switch 1269, and lead 1402, to the closed contacts 1387*a* and the #8 buss line 928, and therefrom through the actuating winding 858*b* of the #8 multiplier magnet, the setting clutch solenoid 931, switches 519 and 648 to ground.

The similar circuit of the #9 multiplier magnet is not closed because at the time the contacts 1388 were closed the contacts 1388*a* were open. Similarly, the circuit for the #7 to #1 multiplier magnets are not closed because the #7 relay 1367 was not energized and its contacts 1387 remained open. Thus, only the #8 multiplier magnet becomes energized under these conditions and controls the cyclic operation of the machine as described fully hereinbefore in the section entitled "Multiplication Operation."

The bridge relays described above with reference to the wiring diagram are shown in Figs. 33 to 35 and have bias windings which are all energized by a common lead 1359 (Fig. 58) and actuating windings which are included in and selectively energized by the bridge circuits described hereinbefore. The windings, armature and other parts of these relays are of the same construction as the multiplier magnets described hereinbefore and also include an extension of each armature 1370 (Figs. 34 and 35) which carries an insulation member 1390. This member carries the movable contacts of the three pairs of contacts 1240, 1380, and 1380a, the zero relay being shown in Figs. 34 and 35 for illustration. When the relay is energized, the armature 1370 is moved toward the left as viewed in Fig. 35 and in so doing closes contacts 1380 and opens contacts 1240 and 1380a to close and open the circuits of the wiring diagram described above.

As in the case of the multiplier magnets, the armatures of the bridge relays are normally held in the position shown in Fig. 33 by an armature holding slide 1391 which is brought to the position shown either by the setting clutch cam 614 (Fig. 17) or by the shift clutch cam 564, and latched in such position by a latch 1392. This latch is released by the energization of a solenoid 1394, the operation and purpose of which is described hereinafter. When the holding slide is released by the latch 1392 and moves toward the left, the actuating windings of the division bridge relays which are energized by the bridge circuit as described hereinbefore overcome the bias windings and cause counter-clockwise movement of the armatures, whereas the armatures of those relays whose actuating windings are not energized will remain in the illustrated position after release thereof by the holding slide. In the case of a relay whose armature is rocked and the contact 1240 is opened, the circuit of the actuating windings of the next higher relays are opened; however, the armatures of these higher relays will remain in their rocked position even though their actuating windings are no longer energized because of the urge of the armature springs 867 and also because these armatures are out of the effective magnetic field created by the continuous energization of their bias windings. The circuits controlled by the other two pair of contacts of these relays are therefore not disturbed.

*Delay of sensing operations*

It will be recalled that a compensating mechanism becomes operative upon completion of each actuating operation to align the numeral wheels. During division the compensating mechanism normally operates to align the numeral wheels before a sensing operation is initiated. In case of an overdraft, however, a carry wave results during which the numeral wheels are changed from zeros to nines in the manner described in U. S. Patent No. 2,222,164 issued to Harold T. Avery and which carry wave delays the alignment of the numeral wheels. A mechanism is therefore provided for delaying each sensing operation for a period of time sufficient to allow any possible carry wave to be completed. In many cases, however, there will be no overdraft to delay the alignment of the numeral wheels; therefore, a second mechanism is provided to supersede the delay mechanism and initiate a sensing operation when the values standing in certain orders of the dividend register indicate that a carry wave through those orders is not possible.

Sensing for either quotient pre-estimation or overdraft is controlled by the energization of solenoid 1394 (Figs. 17 and 59). As long as this solenoid is de-energized the armature holding slide 1391 is latched by latch 1392 and the armatures 1370—1379 are held in inactive position; therefore, the armatures cannot operate the switches associated therewith to start the next machine operation. This condition prevails even though the bias and actuating windings of the division bridge magnets may be energized as described hereinbefore.

With the machine conditioned for division as described hereinbefore, solenoid 1394 (Fig. 59) may be energized by the closure of any one of the three switches 1432, 1433, or 1434. Switch 1432 is under the control of a centrifugally operated brake mechanism which is provided for delaying the return of the numeral wheel centralizer levers until sufficient time has passed for the compensating mechanism to align the numeral wheels after an overdraft. This delay mechanism is operated as follows:

The shaft 468 (Fig. 5) for the centralizer levers 467 of the dividend register has journalled thereon a ratchet 1411 (Figs. 56 and 57) which is operated by a pawl 1412 carried by an arm 1413 secured to the shaft 468. The ratchet 1411 is secured to a gear 1414 meshing with a pinion 1415 which is integral with a gear 1416, (Fig. 57) these being journalled on the shaft 1417. The gear 1416 meshes with a pinion 1418 having its hub journalled on a stub shaft 1419 and carrying a gear 1420 which in turn meshes with a pinion 1421 freely mounted on the stub shaft 1417 and carrying a gear 1422 meshing with a pinion 1423. The pinion 1423 is journalled on the shaft 1419 and its hub carries a gear 1424 meshing with a pinion 1425 on the stub shaft 1417. The hub of the pinion 1425 carries a pair of oppositely disposed support arms 1426 having pivotally mounted thereon a pair of brake members or brake shoes 1427 (Fig. 56) adapted to engage within a brake drum 1428 secured to the stationary shaft 1417. The above gear train provides a stepped up drive for the brake shoes 1427 so that upon slight return movement of the centralizer shaft 468 and correspondingly of the compensator arms which are connected to this shaft, the pawl and ratchet drive 1412 and 1411 will drive through the above gear train to revolve the brake shoes 1427. The latter will revolve about the axis of shaft 1417 at a greatly increased speed and by centrifugal force will cause a braking action against the drum 1428, thereby retarding the return of the centralizer arms. The gear train is designed to provide a suitable delay in the return of the centralizer arms to allow time for a maximum carry wave to occur.

Also, in order to control the division operation, the arm 1413 has an extension 1431 of insulating material adapted, in the position of rest of the centralizers, to close switch 1432 (Figs. 56 and 59) to thereby energize solenoid 1394 and release the armature holding slide 1391. During an actuating operation, the centralizer arms are rocked out of engagement with their respective numeral wheel gears and switch 1432 is opened by such rocking movement.

The switches 1433 and 1434 (Fig. 55a) are in parallel with switch 1432 (Fig. 59) and are controlled by the contact arms 1337 and 1338 of the second ("tens") and third ("units") orders of the active dividend comparing orders. The two switches 1433 and 1434 (Figs. 55a and 59) are opened when the second and third active dividend comparing orders stand at zeros. If a value of other than zero stands in either or both of these orders, however, the respective switch or switches 1433 and 1434 are immediately closed by the dividend sensing operation to complete the circuit to solenoid 1394. It will be seen that when a value of other than zero stands in either of these two orders that a carry wave of mines cannot occur and, therefore, there is no need to wait for the centrifugally controlled switch 1432 to close before energizing solenoid 1394. When these second and third orders both stand at zero, these zeros may be true values, or the zeros may be changed to nines by an overdraft carry wave. In either case the machine has no way of knowing whether or not an overdraft has occurred; therefore, the delaying mechanism shown in Fig. 56 holds the switch 1432 open for a length of time sufficient to allow a possible overdraft to occur. If and when such overdraft does occur the switch arms 1337 or 1338 will be moved from their "0" to "9" positions and complete the circuit to solenoid 1394 whereas if the overdraft does not occur these switch arms will not move from their zero positions and the solenoid 1394 will not be energized until the centrifugally controlled delaying mechanism closes switch 1432. The timing of the operation of the centrifugally controlled switch 1432 may be altered to meet the requirements of the individual machine, but in the preferred embodiment disclosed herein the time required for the closure of this switch is slightly greater than the time required for the completion of a maximum carry wave which is one in which the carry wave originates in that order of the dividend in alignment with the lowest order of the eight-order divisor and from this point of origin passes through the highest currently sensed order of the dividend.

The above described delay mechanism has been described with particular reference to delaying the operation of the machine when zeros appear in the second and third controlling orders of the dividend remainder after subtractive digitation. It will be seen, however, that the delay mechanism is equally effective with respect to delaying the operation of the machine when zeros appear in the controlling orders of the dividend remainder after a corrective plus stroke. On the other hand, in those cases where there is no overdraft and a corrective plus stroke is not initiated the numeral wheels are aligned at the latest during the shifting operation which follows the sensing of a non-overdraft condition and the centrifugally controlled switch 1132 is closed during such shifting to condition the machine for initiation of the next sensing operation as soon as the shift is completed.

It should also be noted that it is possible to eliminate the switch 1434 of the "units" order of the dividend remainder sensing mechanism and use only the single switch 1433 of the "tens" order for control of the solenoid 1394. In the latter case the delays caused by the use of a single order control would be increased nine fold. For example, the machine would be delayed when a zero appeared in the "tens" order regardless of whether or not the value in the units order were zero or a value from one to nine.

The above described mechanism for delaying a machine operation until the numeral wheels are properly aligned is disclosed as applied to a machine having a crawl type carry register such as that disclosed in the Avery Patent 2,222,164 in which an overdraft is indicated by the passage of the numeral wheels from "0" to "9" during alignment of the numeral wheels, but the invention is also applicable to a machine having a crawl type carry register in which a carry wave is indicated by the similar passage of the numeral wheels from "9" to "0." In this latter case the operation of the switches 1433 and 1434 (Fig. 59) would be such that they would be held open when the controlling orders thereof registered extreme settings of "9" and would be closed by the aligning movement of the numeral wheels from "9" to "0."

It will be understood that the centrifugally controlled delay of the centralizer arms is of general utility in registers embodying spring-driven tens transfer mechanism to insure a correct reading of the values when a carry wave occurs in any operation. This is true because a premature return of the centralizer arms can interrupt the spring-driven overdraft carry wave and cause an erroneous registration.

In machines employing "crawl type" tens carry mechanisms in the dividend register, sensing operations are dependent upon the proper alignment of the numeral wheels of this register; therefore, all of such sensing operations normally are delayed until the numeral wheels are properly aligned. From the foregoing description of the delay mechanism and related switches operated by such mechanism it will be seen that in the machine of the present disclosure there are no unnecessary delays for numeral wheel alignment except when zeros appear in the second and third highest orders of the dividend register, and in those cases where zeros do appear and then change to nines the length of time of such delays is reduced to a minimum by mechanisms responsive to such a change.

In order to determine whether or not a delay control mechanism comprising three orders of the above described delay control switches would appreciably decrease the number of delays caused by the appearance of zeros in certain orders of the register, it is necessary to determine what remainder values may appear in the dividend register during the course of division operations. In the following analysis of remainder values the parenthesis (– – –) are used to indicate the three orders of the dividend register which are sensed during a pre-estimating operation and the brackets [– –] are used to indicate the two orders of the divisor which are also sensed at such time. It will be noted that the relationship of the three sensed dividend orders to the two sensed divisor orders invariably is the same, i. e., [– –], the two sensed divisor orders being aligned with the second and third sensed dividend orders.

The proportioning of the Wheatstone bridge as described in said Avery application No. 81,501, determines the point at which the different ratios of the dividend to the divisor cease to be pre-estimated as one quotient digit and are pre-estimated as the next higher or lower value quotient digit. Such proportioning, as shown hereinafter, has a limited effect upon the remainder values which may result from non-overdraft and overdraft actuation and also from a corrective plus stroke.

The following table of values shows the limits within which a given respective quotient digit will be estimated and beyond which limits the next higher or lower digit will be estimated, each estimation being dependent upon both the ratio of the dividend and divisor values selected and the proportioning of the resistors of the Wheatstone bridge. The specific proportioning may be altered or modified in any desired manner in which case the values shown in this table would be changed in accordance with such modification. It is obvious therefore that the table is only illustrative of the embodiment shown.

TABLE I

| Quotients Pre-Estimated | Limits of Ratios of $\frac{Dvd}{Dvr}$ for each quotient | | Difference between quotient and lower limit | Difference between upper limit and quotient |
|---|---|---|---|---|
| | Lower Limit | Upper Limit | | |
| Column A | Column B | Column C | Column D | Column E |
| 0 | 0 | 0.95 | 0 | 0.95 |
| 1 | 0.96 | 1.91 | 0.04 | 0.91 |
| 2 | 1.92 | 2.92 | 0.08 | 0.92 |
| 3 | 2.93 | 3.88 | 0.07 | 0.88 |
| 4 | 3.89 | 4.79 | 0.11 | 0.79 |
| 5 | 4.80 | 5.65 | 0.20 | 0.65 |
| 6 | 5.66 | 6.45 | 0.34 | 0.45 |
| 7 | 6.46 | 7.40 | 0.54 | 0.40 |
| 8 | 7.41 | 8.29 | 0.59 | 0.29 |
| 9 | 8.30 | 9.999999+ | 0.70 | 0.999999+ |

The above table is used in deriving the remainder values which are possible in division, and from which remainder values the frequency of the appearance of zeros in any given number of delay control orders may be determined. It should be understood, however, that the remainder values so derived may be changed by any variation of the limits shown in the above table but that the effect of such changes does not alter the underlying principle of the delay mechanism.

It will be seen from the above table that, with the exception of a zero pre-estimation, the estimated quotient digit may be somewhat less or somewhat greater than the actual ratio of the dividend or remainder to the divisor, for example, a quotient of 2 (column A) is pre-estimated even though the ratio of $$\frac{Dvd}{Dvr}$$

is as small as 1.92 (column B) or as great as 2.92 (column C).

When the ratio $$\frac{Dvd}{Dvr}$$

is smaller than the pre-estimated quotient digit then an overdraft actuation will occur, and when the ratio $$\frac{Dvd}{Dvr}$$

is greater than the quotient pre-estimated then non-overdraft actuation will occur.

Since any remainder less than zero constitutes an overdraft, the minimum remainder value that may result when there is no overdraft is (000) 00---0. On the other hand, the least possible amount of overdraft that may occur is caused by subtracting (from the current dividend) a divisor which exceeds the aligned dividend value only by a value of "1" in the lowest order thereof. In the latter case, the remainder has a value of −1, which is shown as a complementary value in a dividend register, or as (999) 99--, which is the maximum possible overdraft remainder.

*Maximum remainder after non-overdraft actuation*

The maximum remainder which may occur after non-overdraft actuation is a product of two factors:

(1) The maximum amount by which any ratio of $Dvd:Dvr$ may exceed its respective estimated digital quotient before the next higher quotient is pre-estimated, and, (2) The value of the divisor.

It will be noted that the greater the ratio between the dividend and the divisor without causing the next higher quotient digit to be pre-estimated, the greater the remainder will be; therefore, the greater the divisor, the greater will be the maximum possible remainder for any given non-overdraft actuation.

From Table I, column E, it will be seen that the greatest amount by which any given ratio of $$\frac{Dvd}{Dvr}$$

exceeds its respective quotient pre-estimation without pre-estimating a higher quotient occurs for a quotient of "9" in which the upper limit may exceed the quotient estimated by a value of 0.9999+. It will be noted that a "9" is the highest possible quotient pre-estimation regardless of how high said ratio may be.

The greatest possible divisor in the present machine is [99]999999, there being eight divisor orders.

Therefore, if factor, above, (1) times factor (2) is the greatest theoretical remainder after non-overdraft actuation, then the value of the same is .999999+ times [99]999999=[99]999---, which appears in the dividend register as (099) 999--.

*Minimum remainder after overdraft actuation*

The maximum amount of overdraft which may occur results in a minimum overdraft (negative) remainder which is a product of two factors:

(1) The maximum amount by which any pre-estimated quotient digit exceeds its lower limiting ratio of $$\frac{Dvd}{Dvr}$$

and below which ratio value the next lower quotient digit is pre-estimated.

(2) The value of the divisor. It will be noted that the maximum possible amount of overdraft is caused by a maximum divisor value.

As seen from Table I, column D, the greatest difference between a quotient and its limiting lower ratio of $$\frac{Dvd}{Dvr}$$

occurs for a quotient of "9" in which said difference is 0.70. As seen in column B the lower limiting ratio for a quotient of 9 is 8.3. With a sensed divisor of [99] the least possible dividend value which may be compared therewith to obtain a quotient pre-estimation of "9" is $$99 \times 8.3 = 821.7$$

or, when expressed as a rounded out whole number, it becomes (822). Therefore assume:

Dividend value=(822) 000000
Divisor value= [99] 000000

| | |
|---|---|
| A quotient of "9" is pre-estimated and if the dividend value=__ | (822) 000000 |
| and the value 99×9 is subtracted therefrom__________ | − 891 |
| the remainder | = 999 (931) 000 |

It will be noted that the actual values of both the dividend and divisor may exceed the respective values that are sensed by the respective sensing mechanisms. Assuming that the unsensed orders of the divisor each stand at a maximum value of "9" while the unsensed orders of the dividend remain at "0" then in the above example, the remainder may be somewhat less than the value (931). For example:

Dividend=(822) 000000
Divisor = [99]999999

| | |
|---|---|
| A quotient of "9" is pre-estimated and | (822) 000000 |
| −(9×99999999) = | − 899 999991 |
| Remainder= | 9(922) 000009= |

which is the minimum possible remainder after an overdraft.

The maximum values standing in the unsensed orders, of either the dividend or divisor, are at most equal to approximately a value of "1" in the lowest sensed orders thereof. For example: The values (−−−) 9999−−− and [−−]999 are equal to approximately (001) and [01] respectively. Such a small difference between the actual and the sensed dividend causes no error in the final quotient because, at worst, it will only result in a higher remainder value standing in the dividend register after actuation, while an error of "1" between the actual and the sensed divisor will, at worst, cause an overdraft which is subsequently sensed and corrected as previously described.

*Remainders after corrective plus stroke*

With regard to remainder values after a corrective plus stroke, it will be seen that the conditions which produce the least amount of overdraft also produce the greatest remainder value after a corrective plus stroke; and conversely, the conditions which produce the greatest amount of overdraft also produce the smallest remainder value after a corrective plus stroke.

The least amount of overdraft, as described above, is caused by subtracting a divisor from the current dividend of a value of only "1" more than the dividend.

For example assume:

| | |
|---|---|
| A dividend value of | (080) 006972 |
| And a divisor value of | [80]006973 |

In this case a "1" is pre-estimated to cause a single subtractive cycle and a remainder of a value of −1 results, which, as seen in the dividend register, reads 9(999) 999999. After the corrective plus stroke, the remainder value reads as (080) 006972 again. From this example it will be seen that the larger the divisor which will cause an overdraft by −1, the larger the remainder will be.

Therefore, assume:

| | |
|---|---|
| A dividend of | (099) 999998 |
| and | |
| A maximum divisor of | [99]999999 |

and by following through an overdraft and a corrective plus stroke as shown in the previous example, the maximum remainder possible is (099) 999998.

The minimum overdrafted remainder as shown hereinbefore, is approximately 9(922) 00−−− and by adding the divisor value which was used in deriving this overdraft to the overdraft remainder, the minimum remainder after a corrective plus stroke is determined:

| | |
|---|---|
| Maximum overdraft remainder= | 9(922) 000009 |
| Maximum divisor | + 99 999999 |
| Minimum remainder= | (022) 000008 |

The range of remainders after a corrective plus stroke therefore extends from (022) 00−− to (099) 99−−. However, the machine effects an ordinal shift during the corrective plus stroke so that this range of values reads 0(220) 0−− to 0(999) 9−− at the time the next ordinal sensing operation for quotient pre-estimation is initiated.

It will be recalled that, whenever necessary, division operations are delayed after an actuation until the numeral wheels are aligned, but if some digit other than zero appears in either or both the second and third sensed orders of the dividend a switch 1433 or 1434 (Fig. 59) is closed and such delay is eliminated.

The foregoing derivation of remainder values is significant in determining the advisability of placing a third switch (such as switches 1433 and 1434) under the control of the highest sensed order of the dividend in view of eliminating some of the delays caused by a two order control mechanism. To facilitate an analysis of the results caused by such a third delay switch, the remainder values possible in the course of division operation have been grouped as follows:

GROUP A.—AFTER NON-OVERDRAFT ACTUATION

Maximum remainder=(099) 99−−−
Minimum remainder=(000) 00−−−

GROUP B.—AFTER OVERDRAFT ACTUATION

| | |
|---|---|
| Maximum remainder (expressed as a complementary value) = | 9(999) 999−− |
| Minimum remainder (expressed as a complementary value) = | 9(922) 00−−− |

GROUP C.—AFTER CORRECTIVE PLUS STROKE (AND SHIFT)

Maximum remainder=(999) 99−−−
Minimum remainder=(220) 00−−−

Group A includes only 100 possible remainders within the sensed orders of the dividend (−−−) and of these remainders, zeros appear in the two disclosed sensing delay orders only when: (*a*) a minimum remainder value of (000) occurs, or (*b*) a maximum remainder value of (099) is followed by some digit great enough to change the "9's" to some intermediate values between "9" and "0" which are sensed as zeros. In such a case, the value (099) 9 would read (100) before numeral wheel alignment. With the arrangement of the present embodiment, in which there are only two delay control switches, the operation of the machine thus is delayed by only two remainders of the hundred remainders possible in Group A namely (000) and (100) and even if a third order delay switch were added to the present arrangement the operations of the machine would still be delayed upon the occurrence of the value (000).

In Group B the range of remainder values extends from 9(922) 00−− to 9(999) 9, and of these values, zeros appear in the two delay control orders of the present embodiment only when some digit following the value (9(999) is large enough to change this value to 0(000) −−. In the latter case, a zero also appears in the highest sensed order of the dividend; therefore, the provision of an additional delay control switch in the highest sensed order of the dividend would not afford the elimination of any delays which are possible with the two order switch arrangement of the preferred embodiment.

In Group C the range of remainders extends from (220) 00−− to (999) 99−−, or a total of 780 possible remainders. These remainders include the values (299) 9, (300), (399) 9, (400), (499) 9, (500), (599) 9, (600), (699) 9, (700), (799) 9, (800), (899) 9, (900), and (999) 9 in all of which remainders zeros stand in the two delay control orders before alignment of the numeral wheels. The remainders of (300), (400), etc., up to (900) invariably cause the two ordinal switches 1433 and 1434 (Fig. 59) to remain open and delay machine operations until the centrifugal brake control switch 1432 is closed. Such delays could be eliminated with a three order switch control. In the case of remainders (299) 9, (399) 9, etc. to (899) 9 which read (300) 9, (400) 9 etc. up to (900) 9 before numeral wheel alignment, the zeros are changed to "9's" by the alignment of the numeral wheels.

In this respect it should be noted that the time required after an actuating operation to close switch 1395 (Figs. 23 and 59) in the circuit of the aforementioned delay control circuit is sufficient to allow alignment of the numeral wheels including a two order alignment of a series of "0's" to "9's". For example, with a dividend value of (299) 90, the value displayed before numeral wheel alignment is (300) 9. Then during the aligning process the "9" in the value (300) 9 directly causes the adjacent leftward "0" to be backed up to a "9."

The second leftmost "0," however, is not changed to a "9" until the first "0" is changed to a "9" by the aligning process. Therefore, there is a slight delay in aligning the leftmost "0" to the value "9," and which delay may be termed a "one order carry over."

Inasmuch as the values (099) 9 etc. to (899) 9 are aligned by a one order carry over within the time prescribed for the closure of the aforementioned switch 1395 (Fig. 59), no delays are caused by the occurrence of the last described remainders (099) 9 etc. to (899) 9. On the other hand, if a series of "9's" stand in the lower orders of the remainders adjacent the sensed orders, for example: (099) 99999, (199) 99999, etc. to (899) 99999, then these values read (100) 00009, (200) 00009 etc. to (900) 00009 before numeral wheel alignment and such alignment is delayed for a length of time corresponding to the number of orders of zeros which must be changed to nines by a carry wave. In any case, however, the time required to change a series of "0's" to "9" is less than that required to close the centrifugal brake controlled switch 1432.

After a corrective plus stroke, therefore it will be seen that with the exception of the delays caused by the value (999) 999-- which reads (000) before numeral wheel alignment, all the delays shown in the preceding examples may be eliminated by a three order delay control mechanism. The elimination of such delays after a corrective plus stroke may in some cases, cause sensing of dividend values while the numeral wheels are in the process of alignment. For example: With the positive remainder of (099) 9 after a corrective plus stroke, this value reads (100) 9 before numeral wheel alignment. Sensing of a value of (100) rather than (099) does not cause a miscalculation as shown hereinbefore, but if the dividend and divisor sensing operations determine the quotient estimation while the numeral wheels are in the process of alignment then a value such as (109) may be sensed and thereby determine an overestimation of the quotient, the term "overestimation" being an estimated quotient digit which is greater than the ratio of the dividend to the divisor. In such a case, an overdraft would occur, the correction of which requires more time than the time that could be saved by the provision of a three order delay mechanism.

An alternative manner in which a third delay control switch may be provided is to place a switch under the control of the value standing in the first order to the right of the three sensed dividend register orders. A third delay control switch in such a location would reduce the number of delays but the same objection that applied to a third delay control switch in the highest sensed order also applies to an additional control switch in the first order to the right of the sensed orders, namely: a dividend sensing operation occurring during alignment of the numeral wheels might cause an overestimation of the quotient and thus result in more overdrafts than normally result.

Therefore, regardless of whether a third order sensing delay control switch be provided and responsive to the values standing in the highest sensed order of the dividend register, or responsive to the value standing in the first order to the right of the third sensed order of said register, the saving in time due to the number of delays eliminated by such provision is small compared to the number of remainders which do not cause delays. Also, in consideration of the objections to a third order delay mechanism, as presented above, the two order delay control mechanism has been selected as the preferred embodiment for illustrating the present invention.

*Division stop control*

A division stop mechanism is provided for stopping the operation of the machine at the conclusion of quotient determination. The operation of this stop mechanism may be initiated by a division stop solenoid which automatically becomes energized during the last ordinal division operation, or it may be initiated by the depression of a division stop key during any ordinal operation.

A stop solenoid 1450 (Fig. 44) is suitably mounted adjacent the stop key 127 and is provided with a plunger-type armature 1452 which is ejected when the solenoid is energized. The armature 1452 overlies an insulated ear 1453*a* of an arm 1453 fixed to a shaft 1454. Shaft 1454 carries a depending arm 1456 which is pivoted to one end of a division stop link 1457. Link 1457 extends rearwardly of the machine and has a slotted connection with an arm 1458 (Figs. 44 and 49). Arm 1458 is fixed to shaft 1308 which is integral with the previously described latch 1306.

When the solenoid 1450 is energized, the latch 1306 (Fig. 53) is moved counter-clockwise to inactive position to release the latch 1291 and also to release ear 1266*c* of the division slide 1266 (Fig. 49). Upon such release ear 1266*c* moves into engagement with and is held by the latch 1301. Meanwhile, start latch 1291 (Fig. 53) and arm 1297 (Fig. 52) integral therewith rock counter-clockwise for locking the division conditioning lever 1281 (Fig. 53) and the dividend sensing carriage control lever 1309 (Fig. 52) respectively, in the positions shown in Figs. 50 and 52, when these levers are restored to these positions by the respective cams 1285 and 565. Cam 1285 (Fig. 50) is driven by the main actuator drive clutch and normally restores the division conditioning lever 1281 to the position shown in Fig. 50; however, when a "0" is pre-estimated in a given order the main clutch is not operated and lever 1281 is restored through ear 1315*a* of bellcrank 1315 which is operated by cam 565 during the shift cycle. Cam 565 and bell crank 1315 operate through ear 1315b (Fig. 52) to restore control lever 1309 to the latched position shown.

Operation of the cam 566 (Fig. 51) during the last shift cycle rocks bell crank arm 1286b so that arm 1286c engages ear 1303 of latch 1301 (Fig. 49) and rocks the latch 1301 to inactive position, thus releasing slide 1266 from restraint of the lever latch. Slide 1266 (Fig. 44) moves under the urgency of its spring 1267 to its rightmost position and releases the latch 1256 from the division start key 128 which, in turn, allows return of the division control slide 1258 to normal position. In this way all of the parts are restored to their inactive positions as illustrated in Figs. 49 to 53.

It will be noted that latch 1301 (Fig. 49) is rocked counter-clockwise during each ordinal operation of the shift mechanism but that it does not exercise any control over slide 1266 until after that slide has been released from latch 1306.

The control of the solenoid 1450 (Fig. 44) at the end of a complete division operation is exercised by a set of normally opened contacts 1455 (Figs. 38, 38a, and 59) and a cooperating cam 1460, the hub of which is pinned to shaft 570 driven by the advance of the shift ratchet 571. The cam 1460 is angularly positioned on shaft 570 so that it will become effective to close switch 1455 during the shift cycle following the last ordinal division operation. In this way solenoid 1450 is energized and the automatic stopping of the division mechanism is effected after a complete division operation.

If it is desired to terminate a division operation before the full capacity quotient figure is determined, the division stop key 127 (Fig. 44) is operated. The key 127 is urged to raised position by a spring 1461 and has an ear 1462 overlying the arm 1453 previously described in connection with the automatic division stop control mechanism. Thus, upon depression of the division stop key 127, the same train of parts previously described, including the arms 1453 and 1456, the link 1457 and the latch 1306, are operated to bring the operation of the machine to an end after the shift clutch cycle following the ordinal division operation during which the stop key is depressed.

DIVISION OPERATION

In describing the operation of the machine in performing division problems, it will be assumed that the dividend has been entered as described in connection with the dividend key 126 and that the divisor has been entered in the selection storing carriage as described previously and that the actual division operation is initiated by depression of the division start or equal key 128.

Referring to Fig. 44, it will be recalled that depression of the equal key 128 operates through the arms 1253 and 1255 to draw the division control link or slide 1258 together with the auxiliary division control link or slide 1266 forwardly or to the left as viewed in Fig. 44 and that the latch arm 1256 becomes operative to hold the equal key 128 in depressed position.

The operation of the division key 128 to set the slides 1258 and 1266 sets in operation a train of timed sequential actions of the division control mechanism which can best be understood by reference to the division timing chart shown in Figs. 61 and 62. In this chart the most important elements of the division control mechanism are indicated at the left-hand slide of Fig. 61 with the timing of the operation of these mechanisms being shown on the chart as proceeding from the left side of the sheet toward the right. The portion included between lines "a" and "b" indicates the operation of the division mechanism in effecting subtraction of the divisor from the dividend.

Referring to line 1 of the chart, it will be seen that operation of the division control slides 1258 and 1266 (Figs. 44 and 63) momentarily move the latch 1301 (line 2) into latching engagement with the slide 1266 and thereafter bring into play the latch 1306 (line 3) which holds the slide 1266 to the left of the position in which it would be held by the latch 1301. As later described, the latch 1301 becomes effective again only during the last ordinal division operation to insure the last quotient digit completion.

The leftward movement of the auxiliary division control slide 1266 (Figs. 44 and 58) closes the main division control switch 1269 at the same time that it opens the main multiplier control switch 912. The closing of the switch 1269 through leads 1402 and 1359 energizes the bias windings 1360b—1369b (Fig. 58) and through leads 1402 and 1404 it energizes the temporarily inactive bridge circuit 1345. The switch 1269 also closes a circuit through leads 1402 and 1403 to energize the counter reverse solenoid 749 and operates also connects the following switches to the line 911: (1) the temporarily open switch 1320 (Fig. 59) for the main reverse solenoid 533, (2) the temporarily open switch 1319 for the counter compensation arm disabling solenoid 1352, (3) the temporarily closed shift circuit switch 1317, and (4) the temporarily open switch 1314 of the delay control circuit including the switches 1432, 1433, and 1434. This movement of the slide 1266 (Figs. 44 and 58) also serves to open the multiplier control switch 1271 and to close the switch 1272. The latter switch conditions the circuit of the shift clutch solenoid 559 for control thereof by means of switch 1317 (Fig. 59) and switch 630 (Fig. 58).

The leftward movement of the division control slides 1266 and 1258 (Fig. 44) also serves to disable the latches 1291 and 1286, as seen in lines 4 and 5, of Fig. 61 and thereby release the division conditioning lever 1281 (line 7). The latter moves counter-clockwise from the position shown in Fig. 51 and through ear 1281a carries with it the division control arm 1282 (line 8, Fig. 61). As later described, this movement of the control arm 1282 operates switches which control various operations of the machine in division.

The disabling of latch arm 1297 (Fig. 52) integral with the start latch 1291 (line 4 of Fig. 61) releases the sensing control lever 1309 to move counter-clockwise. Link 1311 (Figs. 52 and 44) connected to lever 1309 is moved to the left to operate the division sensing gear sector 1344 (line 9) and to close switch 1314 (line 10, Fig. 61) of the sensing delay circuit. The gear sector 1334 (Fig. 44) drives the ordinal sensing control gears 1331—1333 and moves the gear sectors 1328, 1329, to 1330 (Fig. 5) against the compensator arms 483 and thereby sense the values of the three highest orders of the dividend, the compensator arms being engaged with their associated cams at this time.

The division control arm 1282, in setting the machine for division, as indicated in line 8 of Fig. 61, operates the switches 1317, 1318, 1319, and 1320 (Figs. 44 and 59) to close the circuit including switch 1320, for the main reverse magnet 553 (line 18, Fig. 61), to close the circuit including switch 1319 for the counter compensator arm disabling magnet 1352 (line 18), to shift the bridge circuit control switch 1318 (line 19) and thereby enable the bridge circuit for comparison of dividend and divisor values, and to open the shift circuit switch 1317 (line 19).

At this time the bridge circuit 1345 (Fig. 59) is active to compare the three highest dividend digits with the two highest divisor digits to obtain a pre-estimated quotient digit and when the switch 1314 of the sensing delay control circuit (line 10, Fig. 61) is closed, a circuit is completed through the centrifugally controlled switch 1432 (Fig. 59) which is closed at the start of division, and the normally closed switch 1395 (Figs. 23 and 59) so that solenoid 1394 is energized and the latch 1392 (Fig. 17) for the armature holding slide 1391 is disabled, the slide 1391 moving to the left to released position as seen in line 16 (Fig. 61) to release the armatures for the series of bridge magnets. The release of the bridge magnet armatures controls energization of one of the multiplier busses 920—929 (Fig. 58) as previously described.

Assuming that the No. 9 buss 929 of the multiplier circuit is energized, such energization energizes the setting clutch solenoid 931 (line 23, Fig. 61) to cause operation of the clutch as described in connection with the multiplication mechanism and to cause utilization of the multiplier control circuit to effect nine cycles of subtractive operation, the main reverse solenoid 533 being energized at this time as described above. Since the counter reverse solenoid 749 (Fig. 25) is energized throughout division operations, a count of nine is positively entered into the highest order of the quotient register during nine subtractive cycles of operation of the differential actuators.

The setting clutch 600 operates as shown in line 24 of Fig. 61, through the cam 618 (Fig. 23), follower 488, and link 487 as previously described, to move the compensation arms 483 (line 14, Fig. 61) out of engagement with their cooperating snail cams to permit movement thereof and the associated numeral wheels 461 without restraint by the compensation arms.

It will be recalled that upon operation of the main clutch the follower 488 and link 487 are locked in this compensation arm disabling position by a latch 491 which is enabled by engagement of the main clutch and remain so locked until the main clutch becomes disengaged. In this locked rearward position of the link 487 the switch 1395 (line 13, Figs. 61 and 59) is held open thus breaking the circuit to the armature release solenoid 1394 so that this solenoid cannot be energized again during the operation of the main clutch.

The setting clutch operates through cam 614 (Fig. 17) to restore the bridge magnet armature control slide 1391 into latched relation with its latch 1392 so that the bridge magnet armatures are held in their normal inoperative position prior to the next sensing operation.

The operation of the setting clutch also operates through the cam 613 (Fig. 23) to rock the main clutch dog shaft 508 clockwise to engage the main clutch 514 (line 26, Fig. 61). The clockwise movement of the main clutch dog shaft 508 (Fig. 50) moves the arm 1295 clockwise thereon to trip the latch 1293 and release the division control arm 1282 for movement to the position shown shortly before the cam 1285 operates through the arm 1281*b* to move the division conditioning lever 1281 clockwise and back into position to be latched by the restart latch 1286 (Fig. 51). The latching of arm 1282 and the clockwise movement of lever 1281 tensions the spring 1284 (Fig. 50) and places the division control arm 1282 under spring tension to follow the division conditioning lever 1281 to normal plus position shown. When the main clutch dog moves to clutch disengaging position at the end of the pre-estimated nine cycles of operation, the latch 1293 for arm 1282 is rocked clockwise to inactive position by the arm 1295 on the main clutch dog shaft 508, and lever 1282 rocks clockwise to follow lever 1291. The condition of the machine at the end of the last actuating cycle is indicated at the vertical line "*b*" in Fig. 61 of the timing chart. Between lines "*b*" and "*c*" of the timing chart the sequence of operation is shown that occurs during the corrective plus stroke or cycle that follows an overdraft.

The return of the division control arm 1282 again closes the shift circuit switch 1317 (Fig. 59) and it throws the arm of the double throw switch 1318 to the left to enable the bridge circuit for a comparison of the value of the resistor 1351 with the resistors 1342 to 1344 which contain the remainder of the dividend. If an overdraft has occurred, as is assumed in this case for purpose of illustration, the highest orders of the remainder stand at nines, and due to the tens carry between adjacent dials, the second and third highest sensed order delay control numeral wheels will stand at approximately "0"; therefore, the energization of solenoid 1394 (Fig. 59) to release the armature holding slide 1391 is delayed as explained hereinbefore until the numeral wheel aligning mechanism changes the zeros to nines and closes switches 1433 and 1434 to energize solenoid 1394 and release the armature holding slide 1391. At such time the comparison of any overdraft remainder value between 922 and 999 in the resistors 1342—1344 with a value of 900 in resistor 1351 determines a ratio of approximately "1" and closes the circuit for the No. "1" buss 921 of the multiplier circuit, which causes operation of the setting clutch (lines 23 and 24 of Fig. 61). It will be recalled that at this time the switch 1320 (Fig. 59) is open and the main reverse magnet 533 is therefore de-energized so that a positive entry of the divisor value occurs and a single negative entry is made into the counter register to change the "9" previously registered therein to an "8." As the shift control switch 1317 is also closed the circuit of the shift clutch solenoid 559 (Fig. 58) is enabled and, when cam 619, driven by the setting clutch, closes switch 630, the shift clutch is operated to effect a one-step ordinal shifting movement of the selection storing carriage, the dividend sensing carriage, and the counter actuator interponent. This shifting operation will occur during the overdraft correction cycle to condition the three shiftable devices for the next lower ordinal division operation.

During the operation of the shift clutch, the shift clutch operated cam 566 (Fig. 51) rocks the arm 1286*b* of the restart latch 1286 to disable this latch to permit the division conditioning lever 1281 and the division control lever 1282 to again move, under tension of spring 1280, to the counter-clockwise position they assumed upon depression of the division start key 128. Also, the cam 565 (Fig. 52) becomes operative to rock the restoring bell crank 1315 for the control lever 1309 of the division sensing carriage immediately at the beginning of the shift cycle so that the sensing sectors are out of the way for the shifting operation. Furthermore, the shift clutch cam 564 (Fig. 17) operates through the arm 1398 to again restore the bridge magnet armature control slide 1391 into latched relation with its latch 1392 so that the parts are again conditioned as at the beginning of the division operation.

The portion of the timing chart between the vertical lines "c" and "d" (Fig. 62) illustrates the timing of the parts when a correct quotient figure is determined so that the bridge circuit 1345 (line 7) senses the value "0" during sensing for overdraft and initiates a shift operation by energization of the "0" multiplier buss 920 to energize the shift clutch solenoid 559 (line 21). The timing chart (Fig. 62) between the lines "d" and "e" illustrates the sequence of operations where a sensed quotient figure of "0" occurs and an ordinal shift is effected without any operation of the main clutch.

The above operations proceed order by order until the complete quotient figure is determined. The timing of the parts employed in stopping the division operation after a corrective plus stroke is illustrated in Fig. 63 between lines "b" and "c" which chart, in effect, forms a continuation of portion "a" to "b" of the timing chart shown in Fig. 61. When the cam 1460 (Fig. 38*a*) operated by the shifting mechanism becomes effective to close the associated contacts 1455, the division stop solenoid 1450 (Fig. 44) is energized to project its armature 1452 and operate the arm 1453 and the link 1457. In this way, the latch 1306 (line 3, Fig. 63) is moved to inactive position and the slide 1266 (line 1) can move into engagement with the auxiliary stop latch 1301 (line 2). At the same time the start latch 1291 (line 4) for the division conditioning lever 1281 is released from the control of latch 1306 to lock the lever 1281 (line 7) in the plus position shown in Figs. 50 and 53. Also, when the restart latch 1286 (line 5) is operated by the cam 566, (Fig. 51) the lower arm 1286*c* contacts ear 1303 of latch 1301 and trips that latch during the shift cycle to free the division control slides 1258 and 1266 so that the division mechanism is restored to normal condition.

FEATURES COVERED BY DIVISIONAL APPLICATIONS

*Multiplying mechanism*

The multiplying mechanism is claimed in a divisional application Serial Number 64,819, filed December 11, 1948 (issued as Patent No. 2,557,457 on June 19, 1951). This mechanism includes a plural order multiplicand storing device which controls the differential adjustment of the actuators previous to each actuation and which is shiftable relative thereto during the actuating operation. A plural order multiplier storing device receives the selected multiplier value and the successive orders thereof are enabled to control the successive ordinal multiplications by a member which is shifted from one to the next order of the multiplier storing device. This member is shifted one order during each ordinal multiplication and since the multiplicand storing device is also shifted one order at the same time, the machine is conditioned for initiation of the next ordinal multiplication as soon as a previous multiplication is completed.

In addition to shifting both the multiplicand storing device and the multiplier member simultaneously with actuation, the machine also shifts through a plurality of successive zero multiplier selections during actuation in any one order. For example, with a multiplier value of 60003, the machine multiplies by a "6" in the first order and during such multiplication, four ordinal shifting operations occur so that upon conclusion of the multiplication by "6," the machine is in condition to immediately multiply by the next significant digit "3."

*Division mechanism*

The division mechanism is claimed in a divisional application Serial Number 62,760, filed November 30, 1948 (issued as Patent No. 2,525,423 on October 10, 1950). This mechanism includes a shiftable selection storing carriage which adjusts the ordinal actuators in accordance with a selected divisor value and which carriage is shifted simultaneously with the actuating operation during a selective plus stroke.

After each numeral wheel actuation the value of the dividend is sensed to selectively determine and initiate the next dividing operation. Normally, the numeral wheels are moved from crawl carry to aligned positions before such sensing and initiation occurs. In some cases, however, the previous actuation causes an overdraft and the aligning movement is delayed by an overdraft carry wave of nines. A mechanism is therefore provided to delay the initiation of each succeeding division operation until sufficient time has elapsed for such a carry wave to occur. In many cases, however, an overdraft does not occur and therefore a mechanism is provided under the control of certain orders of the sensing mechanism to supersede the delay mechanism and initiate the next division operation when the values standing in those orders indicate that a carry wave is not possible.

I claim:

1. In a calculating machine having a register including a plurality of ordinal numeral wheels, a plurality of ordinal actuators differentially adjustable and effective upon operation thereof to actuate said numeral wheels, an ordinally shiftable carriage including ordinally arranged devices for receiving and representing the digits of a selected numeral value, control means operable with the devices in any shifted position thereof to cause the same to adjust one group of actuators in accordance with the value received, mechanism operable to shift said carriage relative to the actuators to enable the devices to adjust a different group of actuators in accordance with the value received, and initiating means controlled by a part of the control means and operable thereby following the adjustment of the actuators to initiate concurrent operation of said actuators and said shift mechanism.

2. In a calculating machine having a register including a plurality of ordinal numeral wheels, a plurality of ordinal actuators each associated with a respective numeral wheel and differentially adjustable to actuate said wheel in accordance with such adjustment, a numeral value storing carriage including control devices selectively settable to correspond to a selected multi-digit numeral value and ordinally shiftable into operative relation to certain groups of orders of the actuators to control the differential adjustment of the actuators associated therewith, operation control means including actuator adjusting mechanism controlled by the selectively settable devices of the carriage to adjust the orders of the actuators operatively related to the devices, means for maintaining the adjustment of the actuators throughout the operation thereof, shifting mechanism operable during the operation of the actuators to shift the carriage for bringing said devices into operative relation to a different group of ordinal actuators, and shift initiating mechanism operable by said control means to cause operation of said shift mechanism.

3. In a calculating machine having a register including a plurality of ordinal numeral wheels, a plurality of ordinal actuators differentially adjustable and cyclically operable to enter selected numeral values into said numeral wheels in accordance with such adjustment; the combination of, a shiftable carriage including a plurality of ordinal elements selectively set in accordance with the numeral values entered into the machine, mechanism brought into action in advance of the start of the cyclic operation of the actuators to cause engagement between said elements and said actuators to adjust the latter and to thereafter disengage said elements and actuators to permit relative ordinal shifting therebetween, and shift drive means operable during the cyclic operation of the actuators to shift said carriage.

4. In a calculating machine having a register including a plurality of ordinal numeral wheels, a plurality of ordinal actuators differentially adjustable and cyclically operable to enter selected numeral values into said numeral wheels in accordance with such adjustment; the combination of, a shiftable carriage including a plurality of ordinal elements selectively set in accordance with the numeral values entered into the machine, mechanism brought into action in advance of the start of the cyclic operation of the actuators to cause engagement between said elements and said actuators to adjust the latter in accordance with the setting of the elements and to thereafter disengage said elements and actuators to permit relative ordinal shifting therebetween, mechanism for shifting the carriage to change the ordinal relation between the elements and actuators, and means operable to initiate and complete the operation of the shifting mechanism during the cyclic operation of the actuators.

5. In a calculating machine having a register including a plurality of ordinal numeral wheels, a plurality of ordinal actuators differentially adjustable and cyclically operable to enter selected numeral values into said numeral wheels in accordance with such adjustment; the combination of, a plurality of ordinal elements arranged in a changeable ordinal relation to the actuators and selectively set in accordance with the numeral values entered into the machine, mechanism brought into action in advance of the start of the cyclic operation of the actuators to cause engagement between said elements and the actuators to adjust the latter and to thereafter disengage said elements and the actuators, with means for maintaining the adjustment of the actuators after such disengagement, and means operable during the cyclic operation of the actuators to change the ordinal relation between said elements and actuators.

6. In a calculating machine having a plural order register, a plurality of ordinal actuating means each differentially adjustable to control entry of values into respective orders of the register; the combination of, entering devices settable to control the adjustment of the actuating means which are in operative ordinal relation to the respective devices, and shift means operable to change the ordinal relationship between the devices and the actuating means during operation of the latter, with control means for initiating a machine operation including a first means for causing the entering devices to differentially adjust the actuating means for subsequent operation thereof, and a second means operable thereafter to cause concurrent operation of said actuating means and said shifting means.

7. In a calculating machine having a plural order register, a plurality of ordinal actuating means each differentially adjustable to control entry of values into respective orders of the register; the combination of, ordinally shiftable receiving devices selectively settable to control the adjustment of the actuating means which are in operative relation to the respective devices, and shift means operable to ordinally shift the devices relative to the actuating means during operation of the latter, with control means for initiating a machine operation including a first means for causing the receiving devices to differentially adjust the actuating means for subsequent operation thereof and a second means operable thereafter to cause concurrent operation of said actuating means and said shift means.

8. In a calculating machine having a plural order register, a plurality of ordinal actuating means each differentially adjustable to control entry of numeral values into respective orders of the register; the combination of, a plural order selection storing carriage for receiving a multi-digit numeral value and ordinally shiftable relative to said actuating means, actuator setting devices controlled by said carriage for adjusting the group of ordinal actuating means which are in operative ordinal relation with said carriage, and shift means operable to shift said carriage into operative relation with another group of ordinal actuating means, with control means for initiating a machine operation including a first means for causing operation of said actuator setting devices and a second means operable thereafter to cause concurrent operation of said actuating means and said shift means.

9. In a calculating machine having a plural order register, a plurality of ordinal actuators therefor each adjustable to one of the digital settings zero through nine, a plural order selection carriage for storing a multi-digit value and shiftable ordinally into operative relations with various groups of said actuators, actuator normalizing means for resetting all the actuators to zero including yieldable resetting elements associated with each respective actuator, actuator setting devices controlled by said carriage to overcome the yieldable element for that group of actuators which are in operative ordinal relation with said carriage and to adjust the last mentioned group of actuators to selected significant digit settings corresponding to the value stored in said carriage.

10. In a calculating machine having a plural order register, a plurality of ordinal actuators therefor each adjustable to one of the digital settings zero through nine, a plural order selection carriage for storing a multi-digit value and shiftable ordinally into operative relations with various groups of said actuators, actuator normalizing means for resetting all the actuators to zero including yieldable resetting elements associated with each respective actuator, actuator setting devices controlled by said carriage to overcome the yieldable element for that group of actuators which are in operative ordinal relation with said carriage and to adjust the last mentioned group of actuators to selected significant digit settings corresponding to the value stored in said carriage, means for maintaining the adjustment of said actuators throughout the operation thereof, and shifting mechanism operable to initiate and complete the shifting movement of the carriage during the operation of the actuators.

11. In a calculating machine having a register, selectively settable actuating means for entering values into the register including a plurality of ordinal series of normally ineffective drive connections for transmitting a drive corresponding to the value from one to nine selectively to the orders of the register, an ordinally adjustable plural order control means for selectively rendering the drive connections effective to select values and to determine the ordinal position of entry of the values into the register, ordinally arranged means for restoring any effective drive connection to ineffective condition, means for simultaneously bringing said ordinally adjustable means and said ordinally arranged means into play to effect a setting of said actuating means, and adjusting means operable concurrently with the entry of values into the register for placing said control means in a new ordinal controlling relation to the actuating means.

12. In a calculating machine having a register including a plurality of ordinal numeral wheels, a plurality of ordinal actuators each associated with a respective numeral wheel and differentially adjustable to actuate said wheel in accordance with said adjustment, a plural order storing device for receiving selected numeral values, shift mechanism for moving said storing device from one shifted position to another to change the operative alignment of said device from one group of orders of the ordinal actuators to another such group, means operable with the storing device in one shifted position to cause said device to differentially adjust one group of actuators currently aligned therewith and successively operable with said device in another shifted position to adjust a different group of actuators, means for maintaining said adjustment of the actuators throughout an ordinal actuating operation, and mechanism operable to cause concurrent operation of said actuating and shifting mechanisms.

13. In a calculating machine having a revolutions counter, actuating means for entering increments into the counter including an ordinal series of normally ineffective drive connections for transmitting an incremental drive selectively to the orders of the counter, an ordinally adjustable control means for selectively rendering the drive connections effective to determine the ordinal point of entry of the increments and adjusting means operable concurrently with the entry of an increment into the counter for placing said control means in a new ordinal controlling relation to the actuating means.

14. In a calculating machine having a revolutions counter, actuating means for entering increments into the counter including an ordinal series of normally ineffective drive connections for transmitting an incremental drive selectively to the orders of the counter, an ordinally adjustable control means, for selectively rendering the drive connections effective to determine the ordinal point of entry of the increments, ordinally arranged means for restoring any effective drive connection to ineffective condition, means for simultaneously bringing said ordinally adjustable control means and said ordinally arranged restoring means into play to effect a setting of said actuating means, and means operable concurrently with the entry of an increment into the counter for placing said control means in a new ordinal controlling relation to the actuating means.

15. In a calculating machine having a counter register including numeral wheels, drive mechanism therefor, a gear train between said drive mechanism and each respective numeral wheel, and a clutch in each gear train for connecting and disconnecting the drive mechanism and the respective numeral wheel; the combination of, an element ordinally shiftable relative to said clutches, mechanism operable to shift said element, and clutch engaging mechanism controlled by said element and operable with the element in any shifted position to engage the one of the clutches which corresponds to the current position of said element, with means for maintaining engagement of said clutch throughout the operation of said drivink mechanism, and means brought into play after operation of said clutch engaging mechanism to cause concurrent operation of said driving mechanism, and means 16. In a calculating machine having a revolution counter including a plurality of numeral wheels, actuators therefor, and drive means for said actuators; the combination of control means including mechanism operable in advance of said drive means for re-setting the actuators in a condition in which they are ineffective to drive their respective numeral wheels, devices for maintaining the actuators in said ineffective conditions, an element operable in a selected order to supersede said re-setting mechanism and render one actuator effective to drive its numeral wheel, and means for maintaining said one actuator in effective condition throughout the operation of said drive means, with mechanism for shifting said element from one ordinal position to another, and means operable by part of said control means to cause concurrent operation of said drive means and said shift mechanism.

GEORGE V. NOLDE.

REFERENCES CITED

The following references are of record in the file of this patent:

UNITED STATES PATENTS

| Number | Name | Date |
|---|---|---|
| 1,292,537 | Thieme | Jan. 28, 1919 |
| 1,508,762 | Bacon | Sept. 16, 1924 |
| 1,828,180 | Gardner | Oct. 20, 1931 |
| 1,913,983 | Gardner | June 13, 1933 |
| 1,915,037 | Suter | June 20, 1933 |
| 1,922,971 | Mez | Aug. 15, 1933 |
| 2,251,520 | Lagerman | Aug. 5, 1941 |
| 2,254,760 | Sundstrand | Sept. 2, 1941 |
| 2,294,083 | Friden | Aug. 25, 1942 |
| 2,327,981 | Friden | Aug. 31, 1943 |
| 2,329,649 | Pinyan | Sept. 14, 1943 |
| 2,339,616 | Chase | Jan. 18, 1944 |
| 2,374,333 | Crosman | Apr. 24, 1945 |
| 2,379,877 | Britten, Jr. | July 10, 1945 |
| 2,383,731 | Mathi | Aug. 28, 1945 |
| 2,459,862 | Avery | Jan. 25, 1949 |

Certificate of Correction

Patent No. 2,567,120 September 4, 1951

GEORGE V. NOLDE

It is hereby certified that error appears in the printed specification of the above numbered patent requiring correction as follows:

Column 14, line 53, for "designed" read *designated*; column 16, line 3, for "Patent No. 2,221,164" read *Patent No. 2,222,164*; column 22, line 56, for "typing" read *tying*; column 61, line 7, for "lever" read *latter*; column 62, line 64, for "to" read *and*; line 65, for "and" read *to*; column 69, line 72, after "means" strike out the comma; column 70, line 27, for "drivink" read *driving*; line 30, for "driving mechanism, and means" read *driving and shifting mechanisms.*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*